US012649959B2

(12) United States Patent   (10) Patent No.: US 12,649,959 B2
Mennell et al.   (45) Date of Patent: *Jun. 9, 2026

(54) BIOMASS PYROLYSIS INTEGRATED WITH BIO-REDUCTION OF METAL ORES, HYDROGEN PRODUCTION, AND/OR ACTIVATED-CARBON PRODUCTION

(71) Applicant: Carbon Technology Holdings, LLC, Oakdale, MN (US)

(72) Inventors: James A Mennell, Brighton, UT (US); Daren Daugaard, Newburg, MO (US); Dustin Slack, Gwinn, MI (US)

(73) Assignee: Carbon Technology Holdings, LLC, Oakdale, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/530,765

(22) Filed: Nov. 19, 2021

(65) Prior Publication Data

US 2022/0162725 A1 May 26, 2022

Related U.S. Application Data

(60) Provisional application No. 63/130,460, filed on Dec. 24, 2020, provisional application No. 63/116,403, filed on Nov. 20, 2020.

(51) Int. Cl.
*C22B 5/12* (2006.01)
*B01D 53/04* (2006.01)
(Continued)

(52) U.S. Cl.
CPC ............ *C22B 5/12* (2013.01); *B01D 53/0462* (2013.01); *B01D 53/047* (2013.01);
(Continued)

(58) Field of Classification Search
CPC ............ B01D 2256/16; B01D 53/0462; B01D 53/047; C01B 2203/0811; C01B 3/34;
(Continued)

(56) References Cited

U.S. PATENT DOCUMENTS

| 1,609,097 A | 11/1926 | Stafford |
| 1,662,357 A | 3/1928 | Barton et al. |

(Continued)

FOREIGN PATENT DOCUMENTS

| CA | 2740225 | 5/2010 |
| CA | 2806344 | 2/2012 |

(Continued)

OTHER PUBLICATIONS

Andi Supangat et al., "Method for producing activated carbon from combustion of e.g. bamboo, involves naturally removing and cooling furnace material which is separate module of furnace fuel, but closing exhaust holes, when burning process is not sufficient," ID 20121099A (publication date: Mar. 1, 2012).

(Continued)

*Primary Examiner* — Jie Yang
(74) *Attorney, Agent, or Firm* — O'Connor & Company; Ryan P. O'Connor

(57) ABSTRACT

Improved processes and systems are disclosed for producing renewable hydrogen suitable for reducing metal ores, as well as for producing activated carbon. Some variations provide a process comprising: pyrolyzing biomass to generate a biogenic reagent comprising carbon and a pyrolysis off-gas; converting the pyrolysis off-gas to additional reducing gas and/or heat; reacting at least some of the biogenic reagent with a reactant to generate a reducing gas; and chemically reducing a metal oxide in the presence of the reducing gas. Some variations provide a process for producing renewable hydrogen by biomass pyrolysis to generate a biogenic (Continued)

reagent, conversion of the biogenic reagent to a reducing gas, and separation and recovery of hydrogen from the reducing gas. A reducing-gas composition for reducing a metal oxide is provided, comprising renewable hydrogen according to a hydrogen-isotope analysis. Reacted biogenic reagent may also be recovered as an activated carbon product. Many variations are disclosed.

18 Claims, 4 Drawing Sheets

(51) Int. Cl.

| | |
|---|---|
| B01D 53/047 | (2006.01) |
| B01D 53/22 | (2006.01) |
| C01B 3/12 | (2006.01) |
| C01B 3/323 | (2026.01) |
| C01B 3/503 | (2026.01) |
| C01B 3/506 | (2026.01) |
| C01B 3/56 | (2006.01) |
| C01B 32/324 | (2017.01) |
| C01B 32/336 | (2017.01) |
| C10B 53/02 | (2006.01) |
| C21B 13/00 | (2006.01) |
| F23G 5/027 | (2006.01) |
| B01D 53/02 | (2006.01) |
| F25J 3/02 | (2006.01) |

(52) U.S. Cl.
CPC .............. *B01D 53/229* (2013.01); *C01B 3/12* (2013.01); *C01B 3/323* (2013.01); *C01B 3/503* (2013.01); *C01B 3/506* (2013.01); *C01B 3/56* (2013.01); *C01B 32/324* (2017.08); *C01B 32/336* (2017.08); *C10B 53/02* (2013.01); *C21B 13/00* (2013.01); *F23G 5/0273* (2013.01); *B01D 53/02* (2013.01); *B01D 2256/16* (2013.01); *C01B 2203/0233* (2013.01); *C01B 2203/0255* (2013.01); *C01B 2203/0283* (2013.01); *C01B 2203/0405* (2013.01); *C01B 2203/042* (2013.01); *C01B 2203/046* (2013.01); *C01B 2203/06* (2013.01); *C01B 2203/0811* (2013.01); *F23G 2201/302* (2013.01); *F25J 3/0252* (2013.01)

(58) Field of Classification Search
CPC ......... C01B 3/501; C01B 3/56; C01B 32/324; C01B 2203/0283; C01B 3/12; C21C 5/30; C21C 5/32; C21C 5/34; C21C 5/35; C21C 5/5217; F23G 2201/302; F23G 5/0273; F25J 3/0252; Y02E 50/10; Y02E 60/36; C21B 13/00; C21B 13/008; C21B 2005/005; C21B 5/001
USPC ........................................................ 75/433
See application file for complete search history.

(56) References Cited

U.S. PATENT DOCUMENTS

| | | | |
|---|---|---|---|
| 2,216,756 | A | 10/1940 | Scheffler |
| 2,245,579 | A | 6/1941 | Davis |
| 2,289,917 | A | 7/1942 | Lambiotte |
| 2,448,223 | A | 8/1948 | Lantz |
| 2,475,767 | A | 7/1949 | Williams et al. |
| 2,577,730 | A | 12/1951 | Benedict et al. |
| 2,973,306 | A | 2/1961 | Chick et al. |
| 2,988,442 | A | 6/1961 | Tanner |
| 3,088,983 | A | 5/1963 | Rosenthal |
| 3,235,374 | A | 2/1966 | Mahony |
| 3,290,894 | A | 12/1966 | Tsao |
| 3,298,928 | A | 1/1967 | Esterer |
| 3,650,711 | A | 3/1972 | Unick et al. |
| 3,852,048 | A | 12/1974 | Pyle |
| 3,853,498 | A | 12/1974 | Bailie |
| 3,928,023 | A | 12/1975 | Claflin |
| 4,002,565 | A | 1/1977 | Farrell et al. |
| 4,011,129 | A | 3/1977 | Tomlinson |
| 4,015,951 | A | 4/1977 | Gunnetman |
| 4,026,678 | A | 5/1977 | Livingston |
| 4,082,694 | A | 4/1978 | Wennerberg |
| 4,102,653 | A | 7/1978 | Simmons et al. |
| 4,149,994 | A | 4/1979 | Murty |
| 4,152,119 | A | 5/1979 | Schulz |
| 4,158,643 | A | 6/1979 | Sinha |
| 4,201,831 | A | 5/1980 | Slusarczuk et al. |
| 4,210,423 | A | 7/1980 | Yan |
| 4,236,897 | A | 12/1980 | Johnston |
| 4,246,024 | A | 1/1981 | Price-Falcon et al. |
| 4,248,839 | A | 2/1981 | Toomey |
| 4,255,129 | A | 3/1981 | Reed et al. |
| 4,308,033 | A | 12/1981 | Gunnennan |
| 4,310,334 | A | 1/1982 | Waldron |
| 4,317,703 | A | 3/1982 | Bowen et al. |
| 4,322,222 | A | 3/1982 | Sass |
| 4,324,561 | A | 4/1982 | Dean et al. |
| 4,385,905 | A | 5/1983 | Tucker |
| 4,395,265 | A | 7/1983 | Reilly et al. |
| 4,398,917 | A | 8/1983 | Reilly |
| 4,405,331 | A | 9/1983 | Blaustein et al. |
| 4,494,962 | A | 1/1985 | Christie et al. |
| 4,500,327 | A | 2/1985 | Nishino |
| 4,529,407 | A | 7/1985 | Johnston et al. |
| 4,532,227 | A | 7/1985 | Suggitt |
| 4,553,978 | A | 11/1985 | Yvan |
| 4,561,860 | A | 12/1985 | Gulley et al. |
| 4,632,731 | A | 12/1986 | Bodle et al. |
| 4,652,433 | A | 3/1987 | Ashworth et al. |
| 4,679,268 | A | 7/1987 | Gurries et al. |
| 4,810,255 | A | 3/1989 | Fay, III et al. |
| 4,810,446 | A | 3/1989 | Sylvest |
| 4,828,573 | A | 5/1989 | Jelks |
| 4,834,777 | A | 5/1989 | Endebrock |
| 4,855,276 | A | 8/1989 | Osborne et al. |
| 4,886,519 | A | 12/1989 | Hayes et al. |
| 4,891,459 | A | 1/1990 | Knight et al. |
| 4,935,099 | A | 6/1990 | Weiss et al. |
| 5,132,259 | A | 7/1992 | Curnutt |
| 5,141,526 | A | 8/1992 | Chu |
| 5,153,242 | A | 10/1992 | Timm et al. |
| 5,167,797 | A | 12/1992 | Ou |
| 5,187,141 | A | 2/1993 | Jha et al. |
| 5,231,063 | A | 7/1993 | Fukumoto et al. |
| 5,248,413 | A | 9/1993 | Stencel et al. |
| 5,336,835 | A | 8/1994 | McNamara |
| 5,338,441 | A | 8/1994 | LeViness |
| 5,342,418 | A | 8/1994 | Jesse |
| 5,346,876 | A | 9/1994 | Ichimura et al. |
| 5,352,252 | A | 10/1994 | Tolmie |
| 5,403,548 | A | 4/1995 | Aibe et al. |
| 5,431,702 | A | 7/1995 | Schulz |
| 5,458,803 | A | 10/1995 | Oehr |
| 5,513,755 | A | 5/1996 | Heavilon et al. |
| 5,584,970 | A | 12/1996 | Schmalfeld et al. |
| 5,643,342 | A | 7/1997 | Andrews |
| 5,725,738 | A | 3/1998 | Brioni et al. |
| 5,910,440 | A | 6/1999 | Grossman et al. |
| 5,916,826 | A | 6/1999 | White |
| 5,976,373 | A | 11/1999 | Trocciola et al. |
| 5,980,595 | A | 11/1999 | Andrews |
| 6,039,774 | A | 3/2000 | McMullen et al. |
| 6,057,262 | A | 5/2000 | Derbyshire et al. |
| 6,084,139 | A | 7/2000 | Van Der Giessen et al. |
| 6,114,280 | A | 9/2000 | Stephens |
| 6,342,129 | B1 | 1/2002 | Vaughn et al. |
| 6,395,926 | B1 | 5/2002 | Holtzapple et al. |
| 6,402,813 | B2 | 6/2002 | Monereau et al. |
| 6,447,437 | B1 | 9/2002 | Lee et al. |
| 6,506,223 | B2 | 1/2003 | White |
| 6,524,354 | B2 | 2/2003 | Sinha et al. |

(56)  References Cited

U.S. PATENT DOCUMENTS

| | | | |
|---|---|---|---|
| 6,698,724 B1 | 3/2004 | Traeger et al. | |
| 6,712,606 B2 | 3/2004 | Hagstrom et al. | |
| 6,719,816 B2 | 4/2004 | Barford | |
| 6,797,034 B2 | 9/2004 | Sugitatsu et al. | |
| 6,818,027 B2 | 11/2004 | Murcia | |
| 6,843,831 B2 | 1/2005 | Kleut et al. | |
| 6,901,868 B2 | 6/2005 | Hornung et al. | |
| 7,241,321 B2 | 7/2007 | Murcia | |
| 7,282,072 B2 | 10/2007 | Taulbee | |
| 7,314,002 B2 | 1/2008 | Dupuis | |
| 7,326,263 B2 | 2/2008 | Andersen | |
| 7,332,002 B2 | 2/2008 | Johnson et al. | |
| 7,354,566 B2 | 4/2008 | Okada et al. | |
| 7,357,903 B2 | 4/2008 | Zhou et al. | |
| 7,378,372 B2 | 5/2008 | Sylvester | |
| 7,404,262 B2 | 7/2008 | Jurkovich et al. | |
| 7,435,286 B2 | 10/2008 | Olson et al. | |
| 7,438,785 B2 | 10/2008 | Meier et al. | |
| 7,455,704 B2 | 11/2008 | Garwood | |
| 7,468,170 B2 | 12/2008 | Comrie | |
| 7,623,340 B1 | 11/2009 | Song et al. | |
| 7,691,182 B1 | 4/2010 | Muradov | |
| 7,708,806 B2 | 5/2010 | Wright et al. | |
| 7,749,359 B2 | 7/2010 | Flottvik | |
| 7,785,379 B2 | 8/2010 | Drisedelle et al. | |
| 7,794,601 B1 | 9/2010 | Lima et al. | |
| 7,799,544 B2 | 9/2010 | Schorken et al. | |
| 7,811,339 B2 | 10/2010 | Werner | |
| 7,879,136 B2 | 2/2011 | Mazyck | |
| 7,905,990 B2 | 3/2011 | Freel | |
| 7,931,783 B2 | 4/2011 | Dam-Johansen | |
| 7,932,065 B2 | 4/2011 | Medoff | |
| 7,942,942 B2 | 5/2011 | Paoluccio | |
| 7,943,014 B2 | 5/2011 | Berruti et al. | |
| 7,960,325 B2 | 6/2011 | Kluko | |
| 7,981,835 B2 | 7/2011 | Srinivasachar et al. | |
| 8,048,528 B2 | 11/2011 | Matviya | |
| 8,080,088 B1 | 12/2011 | Srinivasachar | |
| 8,105,400 B2 | 1/2012 | Bergman | |
| 8,150,776 B2 | 4/2012 | Comrie | |
| 8,237,006 B2 | 8/2012 | Stone et al. | |
| 8,308,911 B2 | 11/2012 | Cheiky | |
| 8,309,052 B2 | 11/2012 | Jones | |
| 8,328,887 B2 | 12/2012 | Yang et al. | |
| 8,361,186 B1 | 1/2013 | Shearer et al. | |
| 8,383,071 B2 | 2/2013 | Dillon et al. | |
| 8,404,384 B2 | 3/2013 | Feaver et al. | |
| 8,404,909 B2 | 3/2013 | Jadhav | |
| 8,425,633 B2 | 4/2013 | Banasiak | |
| 8,436,120 B2 | 5/2013 | Piskorz et al. | |
| 8,449,724 B2 | 5/2013 | Stromberg et al. | |
| 8,476,480 B1 | 7/2013 | Brown et al. | |
| 8,519,205 B2 | 8/2013 | Frey | |
| 8,541,637 B2 | 9/2013 | Babicki et al. | |
| 8,563,467 B2 | 10/2013 | Hashisho et al. | |
| 8,637,055 B2 | 1/2014 | Maor | |
| 8,669,404 B2 | 3/2014 | Shulenberger et al. | |
| 8,685,136 B2 | 4/2014 | Metius et al. | |
| 8,801,936 B2 | 8/2014 | Grass et al. | |
| 8,920,525 B2 | 12/2014 | Despen et al. | |
| 8,920,609 B2 | 12/2014 | Steele et al. | |
| 8,926,932 B2 | 1/2015 | Pfeifer et al. | |
| 8,993,478 B2 | 3/2015 | Fujii et al. | |
| 8,999,885 B2 | 4/2015 | Majmudar et al. | |
| 9,108,186 B2 | 8/2015 | Satterfield | |
| 9,121,606 B2 | 9/2015 | Srinivasachar | |
| 9,281,135 B2 | 3/2016 | Soneda et al. | |
| 9,388,046 B2 * | 7/2016 | Mennell | C10B 43/02 |
| 9,388,355 B2 | 7/2016 | Mennell et al. | |
| 9,475,031 B2 | 10/2016 | Mennell et al. | |
| 9,527,780 B2 | 12/2016 | Wilson et al. | |
| 9,724,667 B2 | 8/2017 | Mennell et al. | |
| 9,725,371 B2 | 8/2017 | Shearer et al. | |
| 9,752,090 B2 | 9/2017 | Despen et al. | |
| 9,845,440 B2 * | 12/2017 | Mennell | C10B 39/02 |
| 9,902,907 B2 | 2/2018 | Song et al. | |
| 10,167,437 B2 | 1/2019 | Mennell et al. | |
| 10,174,267 B2 | 1/2019 | Mennell et al. | |
| 10,332,226 B2 | 6/2019 | Block et al. | |
| 10,611,977 B2 * | 4/2020 | Mennell | C10B 57/02 |
| 10,961,459 B2 | 3/2021 | Seidner | |
| 10,982,161 B2 | 4/2021 | Mennell et al. | |
| 10,995,274 B2 | 5/2021 | Marsh | |
| 11,091,716 B2 | 8/2021 | Despen et al. | |
| 11,285,454 B2 | 3/2022 | Mennell et al. | |
| 11,286,440 B2 | 3/2022 | Mennell et al. | |
| 11,413,601 B2 | 8/2022 | Despen et al. | |
| 11,753,698 B2 * | 9/2023 | Mennell | C22B 1/005 |
| | | | 75/770 |
| 11,851,723 B2 | 12/2023 | Mennell et al. | |
| 11,987,763 B2 | 5/2024 | Slack et al. | |
| 12,103,892 B2 | 10/2024 | Mennell et al. | |
| 12,151,226 B2 * | 11/2024 | Mennell | B01J 20/20 |
| 2002/0048144 A1 | 4/2002 | Sugo et al. | |
| 2003/0154858 A1 | 8/2003 | Kleut et al. | |
| 2003/0221363 A1 | 12/2003 | Reed | |
| 2004/0045215 A1 | 3/2004 | Guilfoyle | |
| 2004/0178052 A1 | 9/2004 | Antal | |
| 2005/0095183 A1 | 5/2005 | Rehmat et al. | |
| 2005/0258093 A1 | 11/2005 | Cueman et al. | |
| 2005/0274068 A1 | 12/2005 | Morton et al. | |
| 2005/0279696 A1 | 12/2005 | Bahm et al. | |
| 2006/0048646 A1 | 3/2006 | Olson et al. | |
| 2006/0120934 A1 | 6/2006 | Lanier et al. | |
| 2006/0278040 A1 | 12/2006 | Harada et al. | |
| 2006/0280669 A1 | 12/2006 | Jones | |
| 2007/0006526 A1 | 1/2007 | Cullen | |
| 2007/0034126 A1 | 2/2007 | Chen et al. | |
| 2007/0078056 A1 | 4/2007 | Abe et al. | |
| 2007/0125228 A1 | 6/2007 | Alizadeh-Khiavi et al. | |
| 2007/0220805 A1 | 9/2007 | Leveson et al. | |
| 2007/0261295 A1 | 11/2007 | Tolmie | |
| 2008/0281673 A1 | 11/2008 | Davis et al. | |
| 2009/0031616 A1 | 2/2009 | Agblevor | |
| 2009/0056205 A1 | 3/2009 | Gauthier et al. | |
| 2009/0151251 A1 | 6/2009 | Manzer et al. | |
| 2009/0188160 A1 | 7/2009 | Liu | |
| 2009/0205546 A1 | 8/2009 | Kluko | |
| 2009/0272946 A1 | 11/2009 | Lu | |
| 2009/0314185 A1 | 12/2009 | Whellock | |
| 2010/0069507 A1 | 3/2010 | Tabata | |
| 2010/0115841 A1 | 5/2010 | Cork | |
| 2010/0139155 A1 | 6/2010 | Mennell et al. | |
| 2010/0228062 A1 | 9/2010 | Babicki et al. | |
| 2010/0257775 A1 | 10/2010 | Cheiky | |
| 2010/0273899 A1 | 10/2010 | Winter | |
| 2010/0281768 A1 | 11/2010 | Walty | |
| 2010/0289270 A1 | 11/2010 | Behrens et al. | |
| 2010/0300866 A1 | 12/2010 | van Aardt et al. | |
| 2011/0002086 A1 | 1/2011 | Feaver et al. | |
| 2011/0011721 A1 | 1/2011 | Champagne | |
| 2011/0071022 A1 | 3/2011 | Bandosz et al. | |
| 2011/0083953 A1 | 4/2011 | Horn | |
| 2011/0087470 A1 | 4/2011 | Hames et al. | |
| 2011/0099887 A1 | 5/2011 | Stinson et al. | |
| 2011/0099890 A1 | 5/2011 | Bohlig et al. | |
| 2011/0155019 A1 | 6/2011 | Albright et al. | |
| 2011/0172092 A1 | 7/2011 | Lee et al. | |
| 2011/0219679 A1 | 9/2011 | Budarin et al. | |
| 2011/0287991 A1 | 11/2011 | Dubois | |
| 2011/0287999 A1 | 11/2011 | Luc | |
| 2011/0296745 A1 | 12/2011 | Hilten et al. | |
| 2012/0021123 A1 | 1/2012 | Leveson et al. | |
| 2012/0023809 A1 | 2/2012 | Koch et al. | |
| 2012/0125064 A1 | 5/2012 | Joseph et al. | |
| 2012/0172216 A1 | 7/2012 | Böhringer et al. | |
| 2012/0174475 A1 | 7/2012 | Mennell et al. | |
| 2012/0174476 A1 | 7/2012 | Mennell et al. | |
| 2012/0238787 A1 | 9/2012 | Gruber et al. | |
| 2012/0282465 A1 | 11/2012 | Kadam et al. | |
| 2012/0285080 A1 | 11/2012 | Despen et al. | |
| 2012/0286211 A1 | 11/2012 | Cheiky et al. | |
| 2012/0289752 A1 | 11/2012 | Gosselink et al. | |
| 2013/0022771 A1 | 1/2013 | Malet et al. | |

(56) References Cited

U.S. PATENT DOCUMENTS

| | | | |
|---|---|---|---|
| 2013/0025190 A1 | 1/2013 | Cheiky et al. | |
| 2013/0133246 A1 | 5/2013 | Blieninger | |
| 2013/0145684 A1 | 6/2013 | Mennell et al. | |
| 2013/0152461 A1 | 6/2013 | Mennell et al. | |
| 2013/0152789 A1 | 6/2013 | Polshettiwar et al. | |
| 2013/0161563 A1 | 6/2013 | Jiang et al. | |
| 2013/0295628 A1 | 11/2013 | Retsina et al. | |
| 2013/0326935 A1 | 12/2013 | Kimball | |
| 2014/0075832 A1 | 3/2014 | Mennell et al. | |
| 2014/0075834 A1 | 3/2014 | Mennell | |
| 2014/0332363 A1 | 11/2014 | Durand et al. | |
| 2014/0338576 A1 | 11/2014 | Mennell et al. | |
| 2015/0024328 A1 | 1/2015 | Grill | |
| 2015/0090157 A1 | 4/2015 | Sniady et al. | |
| 2015/0114908 A1 | 4/2015 | Traxler et al. | |
| 2015/0126362 A1 | 5/2015 | Mennell et al. | |
| 2015/0139889 A1 | 5/2015 | Horn et al. | |
| 2015/0144831 A1* | 5/2015 | Mennell | B01J 20/3078 |
| | | | 252/62.51 R |
| 2015/0183961 A1 | 7/2015 | Talwar | |
| 2015/0196896 A1 | 7/2015 | Mennell et al. | |
| 2016/0002554 A1 | 1/2016 | Tumuluru | |
| 2016/0068759 A1 | 3/2016 | Ellens et al. | |
| 2016/0114308 A1 | 4/2016 | Despen et al. | |
| 2016/0145519 A1 | 5/2016 | Walter | |
| 2016/0215223 A1 | 7/2016 | Abhari et al. | |
| 2016/0244686 A1 | 8/2016 | Dickinson | |
| 2016/0280554 A1 | 9/2016 | Despen et al. | |
| 2016/0304787 A1 | 10/2016 | Aelion et al. | |
| 2017/0137294 A1 | 5/2017 | Marker et al. | |
| 2017/0137332 A1 | 5/2017 | Jarand et al. | |
| 2017/0145444 A1 | 5/2017 | Hill et al. | |
| 2017/0152440 A1 | 6/2017 | Wilson et al. | |
| 2017/0158967 A1 | 6/2017 | Reiner et al. | |
| 2017/0197192 A1 | 7/2017 | Malyala et al. | |
| 2017/0321139 A1 | 11/2017 | Despen et al. | |
| 2018/0118631 A1 | 5/2018 | Bontchev et al. | |
| 2018/0119040 A1 | 5/2018 | Waanders et al. | |
| 2018/0127672 A1 | 5/2018 | Mennell et al. | |
| 2018/0208852 A1 | 7/2018 | Marsh | |
| 2018/0291276 A1 | 10/2018 | Gangwal et al. | |
| 2018/0327329 A1 | 11/2018 | Bontchev et al. | |
| 2019/0002323 A1 | 1/2019 | Benedek et al. | |
| 2019/0194561 A1 | 6/2019 | Mennell et al. | |
| 2019/0264121 A1 | 8/2019 | China | |
| 2020/0055736 A1 | 2/2020 | Mennell et al. | |
| 2020/0056098 A1 | 2/2020 | Seidner | |
| 2020/0140901 A1 | 5/2020 | Foody et al. | |
| 2020/0255660 A1 | 8/2020 | McGolden | |
| 2020/0318018 A1 | 10/2020 | Germanaud et al. | |
| 2020/0346929 A1 | 11/2020 | Cagigas | |
| 2020/0381732 A1 | 12/2020 | Wagner et al. | |
| 2021/0009427 A1 | 1/2021 | Mennell et al. | |
| 2021/0040404 A1* | 2/2021 | Berends | C10B 57/02 |
| 2021/0155481 A1 | 5/2021 | Kim et al. | |
| 2021/0214617 A1 | 7/2021 | Seidner | |
| 2021/0220801 A1 | 7/2021 | Mennell et al. | |
| 2021/0395630 A1 | 12/2021 | Despen et al. | |
| 2022/0098700 A1 | 3/2022 | Mennell et al. | |
| 2022/0098701 A1 | 3/2022 | Mennell et al. | |
| 2022/0162077 A1* | 5/2022 | Mennell | C01B 3/56 |
| 2022/0204860 A1 | 6/2022 | Foidl | |
| 2022/0228080 A1 | 7/2022 | Mennell et al. | |
| 2022/0228082 A1 | 7/2022 | Mennell et al. | |
| 2022/0267869 A1 | 8/2022 | Mennell et al. | |
| 2022/0340818 A1 | 10/2022 | Mennell et al. | |
| 2022/0396529 A1 | 12/2022 | Mennell et al. | |
| 2023/0015387 A1 | 1/2023 | Slack et al. | |
| 2023/0020752 A1 | 1/2023 | Slack et al. | |
| 2023/0045385 A1 | 2/2023 | Mennell et al. | |
| 2023/0150873 A1 | 5/2023 | Mosher | |

FOREIGN PATENT DOCUMENTS

| | | | |
|---|---|---|---|
| CA | 2838571 | | 12/2012 |
| CN | 101693848 | A | 4/2010 |
| CN | 101775301 | | 7/2010 |
| CN | 101805626 | A | 8/2010 |
| CN | 101525118 | | 12/2010 |
| CN | 102208598 | | 10/2011 |
| CN | 103866072 | | 6/2014 |
| CN | 105498703 | | 4/2016 |
| CN | 108865195 | | 11/2018 |
| CN | 111172384 | | 5/2020 |
| CN | 110438335 | | 8/2020 |
| DE | 19606575 | | 8/1997 |
| DE | 202009010612 | | 10/2009 |
| DE | 102013015019 | | 7/2016 |
| EP | 0930091 | | 7/1999 |
| EP | 2199365 | | 6/2010 |
| GB | 1412407 | | 11/1975 |
| GB | 2460064 | | 11/2009 |
| JP | S47-013408 | | 4/1972 |
| JP | S54135666 | | 10/1972 |
| JP | S55136116 | | 10/1980 |
| JP | BS58-28203 | | 6/1983 |
| JP | S60-238144 | | 11/1985 |
| JP | H0564789 | | 3/1993 |
| JP | 06-88077 | | 3/1994 |
| JP | AH9-29236 | | 2/1997 |
| JP | 10-208985 | | 8/1998 |
| JP | 2000157832 | | 6/2000 |
| JP | 2000-212568 | | 8/2000 |
| JP | 2000-265186 | | 9/2000 |
| JP | 2001-239122 | | 9/2001 |
| JP | 2001-300497 | | 10/2001 |
| JP | 2002-211911 | | 7/2002 |
| JP | 2002-226865 | | 8/2002 |
| JP | 2002-255796 | | 9/2002 |
| JP | 2002-289683 | | 10/2002 |
| JP | 2003-038941 | | 2/2003 |
| JP | 2003-147370 | | 5/2003 |
| JP | 2003-213273 | | 7/2003 |
| JP | 2003-238136 | | 8/2003 |
| JP | 2003-251398 | | 9/2003 |
| JP | 2003-286021 | | 10/2003 |
| JP | 2004-912 | | 1/2004 |
| JP | 2004534641 | | 11/2004 |
| JP | 2005-263547 | | 9/2005 |
| JP | 2005230810 | | 9/2005 |
| JP | 2005-298602 | | 10/2005 |
| JP | 2005-334737 | | 12/2005 |
| JP | 2006-188366 | | 7/2006 |
| JP | 2006263513 | | 10/2006 |
| JP | 2006-315899 | | 11/2006 |
| JP | 2008-024984 | | 2/2008 |
| JP | 2008-037931 | | 2/2008 |
| JP | 2008-136558 | | 6/2008 |
| JP | 2008-222901 | | 9/2008 |
| JP | 2008-284520 | | 11/2008 |
| JP | 2009-125070 | | 6/2009 |
| JP | 2009-298967 | | 12/2009 |
| JP | 2010-194502 | | 9/2010 |
| JP | 2010-202298 | | 9/2010 |
| JP | 2010-222474 | | 10/2010 |
| JP | 2011516263 | | 5/2011 |
| JP | 2011161330 | | 8/2011 |
| JP | 2011-230038 | | 11/2011 |
| JP | 2011-240329 | | 12/2011 |
| JP | 2006-96615 | | 12/2012 |
| JP | 2013082588 | | 5/2013 |
| JP | 2015-196815 | | 11/2015 |
| KR | 101479906 | | 1/2015 |
| KR | 20190074075 | | 6/2019 |
| RU | 2425800 | C2 | 8/2011 |
| RU | 2662440 | | 7/2018 |
| RU | 2729810 | | 8/2020 |
| TW | 501939 | | 9/2002 |
| WO | WO 1990/01529 | | 2/1990 |
| WO | WO 2000/071936 | | 11/2000 |
| WO | WO 2002/069351 | | 9/2002 |

(56) References Cited

FOREIGN PATENT DOCUMENTS

| WO | WO 2005/049530 | 6/2005 |
| WO | WO 2005/061099 | 7/2005 |
| WO | WO 2006/122405 | 11/2006 |
| WO | WO 2007/147244 | 12/2007 |
| WO | WO 2008/022461 | 2/2008 |
| WO | WO 2008/076944 | 6/2008 |
| WO | WO 2008/144416 | 11/2008 |
| WO | WO 2009/018469 | 2/2009 |
| WO | WO 2009/105441 | 8/2009 |
| WO | WO 2009/158709 | 12/2009 |
| WO | WO 2010/110470 | 9/2010 |
| WO | WO 2010/128055 | 11/2010 |
| WO | WO 2010/129996 | 11/2010 |
| WO | WO 2010/132970 | 11/2010 |
| WO | WO 2011/045473 | 4/2011 |
| WO | WO 2011/053668 | 5/2011 |
| WO | WO 2011/065484 | 6/2011 |
| WO | WO 2011/081086 | 7/2011 |
| WO | WO 2011/093294 | 8/2011 |
| WO | WO 2011/119961 | 9/2011 |
| WO | WO 2011/162727 | 12/2011 |
| WO | WO 2012/142486 | 10/2012 |
| WO | WO 2012/142488 | 10/2012 |
| WO | WO 2012/142489 | 10/2012 |
| WO | WO 2012/142491 | 10/2012 |
| WO | WO 2012/164162 | 12/2012 |
| WO | WO 2013/019111 | 2/2013 |
| WO | WO 2013/169803 | 11/2013 |
| WO | WO 2013/169806 | 11/2013 |
| WO | WO 2013/169811 | 11/2013 |
| WO | WO 2013/172705 | 11/2013 |
| WO | WO 2013/187940 | 12/2013 |
| WO | WO 2015/061701 | 4/2015 |
| WO | WO 2015/109206 | 7/2015 |
| WO | WO 2015/127460 | 8/2015 |
| WO | WO 2016/065357 | 4/2016 |
| WO | WO 2017/002096 | 1/2017 |
| WO | WO 2017011912 | 1/2017 |
| WO | WO 2018/213474 | 11/2018 |
| WO | WO 2019/054869 | 3/2019 |
| WO | WO 2019/074431 | 4/2019 |
| WO | WO 2019200424 | 10/2019 |
| WO | WO 2020/219635 | 10/2020 |
| WO | WO 2020/243796 | 12/2020 |
| WO | WO 2021/084016 | 5/2021 |
| WO | WO 2023/283289 | 1/2023 |

OTHER PUBLICATIONS

Antal et al., "The Art, Science and Technology of Charcoal Production," Ind. Eng. Chem. Res., 42:1619-1640 (publication date: Mar. 14, 2003).

Ayanda et al., "Activated Carbon-Fly Ash-Nanometal Oxide Composite Materials:Preparation, Characterization, and Tributyltin Removal Efficiency," Journal of Chemistry. vol. 2013 (2013).

Baldock, "Chemical composition and bioavailability of thermally altered *Pinus resinosa*(Red pine) wood," Org. Geochem., vol. 33(9), pp. 1093-1109 (publication date: Sep. 2002).

Brodowski, "Morphological and Chemical Properties of Black Carbon in Physical Soil Fractions as Revealed by Scanning Electron Microscopy and Energy—Dispersive X-ray Spectroscopy," Geoderma, vol. 128, pp. 116-129 (publication date: Sep. 2005).

Cheng et al., "Oxidatin of black carbon by biotic and abiotic processes," Organic Geochemistry 37:1477-1488 (publication date: Nov. 2006).

Demirbas, "Effects of Temperature and Particle Size on Bio-Char Yield from Pyrolysis of Agricultural Residues," J. Anal. Appl. Pyrolysis, vol. 72, pp. 243-248 (publication date: Nov. 2004).

Di Felice et al., "Biomass Gasification with Catalytic Tar Reforming: A Model Study into Activity Enhancement of Calcium- and Magnesium-Oxide-Based Catalytic Materials by Incorporation of Iron," Energy Fuels vol. 24, pp. 4034-4045 (publication date: Jun. 25, 2010).

Du, "Some Thoughts on the Chemical Compositions of Fly Ash: ICAR's 17th Annual Symposium. The University of Texas at Austin," (2009).

Edgehill et al. "Adsorption Characteristics of Carbonized Bark for Phenol and Pentachlorophenol," (publication date: Mar. 26, 1999).

Freese et al. "Powdered Activated Carbon: Can This Be Effectively Assessed in the Laboratory," (publication date: May 28-Jun. 1, 2000).

Gupta et al., "Utilisation of bagasse fly ash (a sugar industry waste) for the removal of copper and zinc from wasterwater," Separation and Purification Technology Journal. vol. 18, Issue 2, pp. 131-140 (publication date: Mar. 2000).

Hamer, "Interactive Priming of Black Carbon and Glucose Mineralisation," Org. Geochem., vol. 35, Issue 7, pp. 823-830 (publication date: Jul. 2004).

Hardman et al., "Studies of Spontaneous Combustion in Beds of Activated Carbon,"Fuel, IPC Science and Technology Press, vol. 59, No. 3, pp. 151-156 (publication date: Mar. 1980).

Horst-Günter Brocksiepe et al., "Charcoal," Ullmann, 8:93-98 (epublication date: Jun. 15, 2000).

Hung, "The Production of Activated Carbon from Coconut Shells Using Pyrolysis and Fluidized Bed Reactors. A Thesis Submitted to the Honors College," The University of Arizona, May 2012, [retrieved on May 4, 2015] [retrieved from the internet] <URL: http://arizona/openrepository.com/arizona/bitstream/10150/243968/1/azuetdmr_2012_0079_sip1_m.pdf> Abstract, pp. 8, 9, 12, 31-33.

Hwang et al., "Characterization of char derived from various types of solid wastes fromthe standpoint of fuel recovery and pretreatment before landfilling," Waste Management 27(9):1155-1166 (epublication date: Aug. 22, 2006).

Iqbaldin et al., "Properties of coconut shell activated carbon," Journ. Tropical Forest Science, 25(4):497-503 (publication date: Oct. 2013).

Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 pp. 148-153 (publication date: Dec. 15, 2008, epublication date: Mar. 6, 2008).

Khan et al., "Removal of trace elements from Thar coal to minimize its hazardous effect on the environment," Journal of Himalayan Earth Sciences 49(1):50-57 (2016).

Kuzyakov, "Black Carbon Decomposition and Incorporation into Soil Microbial Biomass Estimated by 14C Labeling," Soil Bio & Biochem., vol. 4, pp. 210-219 (publication date: Feb. 2009).

Lakdawala et al., "The effect of low cost material Bagasse Fly ash to the removal of COD Contributing component of combined waste water of Sugar Industry," Scholars Research Library (publication date: Apr. 2012).

Lehmann, "Bio-energy in the black," Front. Ecol. Enviorn., vol. 5(7), pp. 381-387 (publication date: Sep. 1, 2007).

Mackay, "The Dependence of Char and Carbon Yield on Lignocellulosic Precursor Composition," Carbon, col. 20(2), pp. 87-94 (1982).

Martin et al., "Gasification and Production of Biochar from Wastewater Grown Algae," Water New Zealand Annual Conference, Sep. 22-24, 2010, XP055337229, Retrieved From the Internet: URL: https://www.waternz.org.nz/Attachment?Action=Download&Attachment_id=1127 [retrieved on Jan. 20, 2017].

Novack, "Impact of Biochar Amendment on Fertility of a Southeastern Coastal Plain Soil," Soil Sci., vol. 174(2), pp. 105-112 (publication date: Feb. 2009).

PCT/US2009/069133 International Search Report and Written Opinion dated Jul. 26, 2011.

PCT/US2009/069403 International Search Report and Written Opinion dated Jul. 26, 2011.

PCT/US2012/033624 International Search Report dated Sep. 17, 2012.

PCT/US2012/033627 International Search Report dated Jul. 13, 2012.

PCT/US2012/033628 International Search Report dated Jul. 6, 2012.

PCT/US2012/033630 International Search Report dated Aug. 21, 2012.

(56) References Cited

OTHER PUBLICATIONS

PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
PCT/US2015/57370 International Search Report dated Jan. 8, 2016.
Purnomo et al., "Preparation and characterization of activated carbon from bagasse flyash," Journal of Analytical and Applied Pyrolysis. vol. 91, Issue 1, pp. 257-262 (publication date: May 2011).
Saravanakumar et al., "Experimental investigations of long stick wood gasification in abottom lit updraft fixed bed gasifier," Fuel Processing Technology, 88(6):617-622 (publication date: Jun. 2007).
Shinogi et al., "Pyrolysis of plant, animal and human waste: physical and chemical characterization of the pyrolytic products," Bioresource Technology 90:241-247 (publication date: Dec. 2003).
Tay et al., "Preparation and characterization of activated carbon from waste biomass," Journal of Hazardous Materials ND 165(1-3):481-485 (publication date: Jun. 15, 2009).
Ueda, Shigeru et al., "Improvement of Reactivity of Carbon Iron Ore Composite with Biomass Char for Blast Furnace," ISIJ International (2009) 49(10):1505-1512.
Yan et al., "Thermal Pretreatment of Lignocellulosic Biomass," EnvironmentalProgress and Sustainable Energy, vol. 28, No. 3, pp. 435-440 (epublication date: Aug. 5, 2009).
Ikuo Abe, "Sumino Kyuchaku no Himitsu" (Secret of Adsorption of Charoal), Rinsan Shi Dayori, p. 5-9 (Dec. 1995) with English summary.
Kumar et al., "Effects of Carbonisation conditions on the Yield and Chemical Composition of *Acacia* and *Eucalyptus* Wood Chars," Biomass and Bioenergy 3(6):411-417 (1992).
Wretborn, "Pyrolysis of Wood Chips: Influence of Pyrolysis Conditions on Charcoal Yield and Charcoal Reactivity," Degree Project, Energy Engineering, masters level 2016.
Biermann et al., "Carbon Allocation in Multi-Product Steel Mills That Co-process Biogenic and Fossil Feedstocks and Adopt Carbon Capture Utilization and Storage Technologies," Frontiers in Chemical Engineering (publication date: Dec. 9, 2020).
Bronson, Benjamin, "The Effects of Feedstock Pre-treatment on the Fluidized Bed Gasification of Biomass," Thesis submitted to the Faculty of Graduate and Postdoctoral Studies in partial fulfilment of the requirements for M.A.Sc. In Chemical Engineering, University of Ottawa (2014).
Cleveland, Cutler J. and Morris, Christopher. Dictionary of Energy (Expanded Edition)—passive solar cooling (pp. 373). Elsevier. (2009).
De Mattos Carneiro-Junior et al., "Valorization of Prosopis juliflora Woody Biomass in Northeast Brazilian through Dry Torrefaction," Energies, Energies Jun. 11, 2021, 14, 3465.
Demirbas et al., "Estimating the Calorific Values of Lignocellulosic Fuels," Energy Exploration & Exploitation 22(2):135-143 (publication date: Apr. 1, 2004).
Gonzalez et al., "Pyrolysis of various biomass residues and char utilization for the production of activated carbons," J. Anal. Appl. Pyrolysis, 85:134-141 (epublication date: Dec. 3, 2008).
Gudka et al., A review of the mitigation of deposition and emission problems during biomass combustion through washing pre-treatment, Journal of the Energy Institute (Published May 2016), vol. 89, Issue 2, May 2016, pp. 159-171.
International Search Report and Written Opinion dated Apr. 1, 2022 for International Application No. PCT/US2022/013151.

International Search Report and Written Opinion dated Apr. 1, 2022 for International Application No. PCT/US2022/013156.
International Search Report and Written Opinion dated Feb. 8, 2022 for International Application No. PCT/US2021/60071.
International Search Report and Written Opinion dated Feb. 8, 2022 for International Application No. PCT/US21/60053.
International Search Report and Written Opinion dated Jul. 15, 2022 for International Application No. PCT/US2022/026591.
International Search Report and Written Opinion dated Jul. 19, 2022 for International Application No. PCT/US2022/026597.
International Search Report and Written Opinion dated Mar. 20, 2023 for International Application No. PCT/US2022/049237.
International Search Report and Written Opinion dated Mar. 29, 2023 for International Application No. PCT/US2022/049240.
International Search Report and Written Opinion dated Nov. 17, 2022 for International Application No. PCT/US2022/039119.
International Search Report and Written Opinion dated Oct. 11, 2022 for International Application No. PCT/US2022/036282.
International Search Report and Written Opinion dated Oct. 11, 2022 for International Application No. PCT/US2022/036292.
International Search Report and Written Opinion dated Oct. 19, 2022 for International Application No. PCT/US2022/039116.
International Search Report and Written Opinion dated Oct. 6, 2022 for International Application No. PCT/US2022/036294.
Keiluweit et al., "Dynamic Molecular Structure of Plant Biomass-Derived Black Carbon (Biochar)," Environ. Sci. Technol. 44:1247-1253 (epublication date: Jan. 25, 2010).
Phasee et al., "An investigation on mechanical property of MSW-derived fuel pellet produced from hydronthermal treatement," Journal of Material Cycles and Waste Management, 20:2028-2040 (publication date: Jun. 15, 2018).
Phyllis Database Phyllis2—ECN Phyllis classification https://phylis.nl/Browse/Standard/ECN-Phyllis#pyrolisis (2015).
Ruksathamcharoen et al., "Effects of hydrothermal treatment and pelletizing temperature on themechanical properties of empty fruit bunch pellets," Applied Energy, 113385 (epublication date: May 18, 2019).
Tanzer et al., "Can bioenergy with carbon capture and storage result in carbon negative steel?"100:1-15, International Journal of Greenhouse Gas Control (publication date: Jul. 24, 2020) (Abstract only).
Warnecke, "Gasification of biomass: comparison of fixed bed and fluidized bed gasifier," Biomass & Bioenergy, 18:489-497 (2000).
Yang et al., "Harmonized comparison of virgin steel production using biomass with carboncapture and storage for negative emissions," 112:1-33, International Journal of Greenhouse Gas Control (publication date: Nov. 23, 2021).
Anonymous et al., "BET specific Surface Area," (publication date: Jan. 1, 2021).
Barrett et al., "The Determination of Pore Volume and Area Distributions in Porous Substances. I Computations from Nitrogen Isotherms," Journal of American Chemical Society, 73:373-380 (publication date: Jan. 1, 1951).
Demiral et al., Surface properties of activated carbon prepared from wastes, Surface and Interface Analysis, 40(3-4):612-615 (publication date: Jan. 23, 2008).
Designation: D6556-14 Astb Standard Test Method for Carbon Black—Total and External Surface Area by Nitrogen Adsorption 1, pp. 1-5 (publication date: Jan. 1, 2014).
Du et al., "Determination of iodine number of activated carbon by the method of ultraviolet-visible spectroscopy," Materials Letters, 285:129137 (2021).
Gómez-Serrano et al., "Nitrogen adsorption isotherms on carbonaceous materials. Comparison of BET and Langmuir surface areas," Powder Technology, 116:103-108 (publication date: May 2001).
Gong et al., "Direct reduction of iron oxides based on stream reforming of bio-oil: a highly efficient approach for production of DRI from bio-oil and iron ores," Green Chemistry 11(12):2001-2012 (publication date: Jan. 1, 2009).
Guo et al., "Direct reduction of oxidized iron ore pellets using biomass syngas as the reducer," Fuel Process Technology 148:276-281 (epublication date: Mar. 22, 2016).

(56)                References Cited

OTHER PUBLICATIONS

International Search Report and Written Opinion dated Feb. 16, 2024 for International Application No. PCT/US2023/035676, 14 pages.

International Search Report and Written Opinion dated Mar. 19, 2024 for International Application No. PCT/US2023/085470, 9 pages.

International Search Report and Written Opinion dated Nov. 6, 2023 for International Application No. PCT/US2023/15148, 13 pages.

Nogueira et al., "Production of Self-Reducing Pellets From Organic Household Waste," Technical contribution at the 45th Seminar for Reduction of Iron Ore and Raw Materials, 16th Brazilian Symposium for Iron Ore, and 3rd Brazilian Symposium for Iron Ore Agglomeration, an integral part of ABM Week, held from Aug. 17, 2015 Rio de Janeiro, RJ, Brazil.

Wei et al., "Current status and potential of biomass utilization in ferrous metallurgical industry," Renewable and Sustainable Energy Reviews 68:511-524 (epublication date: Oct. 21, 2016).

Alzate et al., "CO-gasification of pelletized wood residues," Fuel 437-445 (epublication date: Nov. 6, 2008).

Chen et al., "Progress in biomass torrefaction: Principles, applications and challenges," Progress in Energy and combustion Science 82:100887 (epublication date: Oct. 26, 2020).

Faaij, Andre, et al., "Gasification of biomass wastes and residues for electricity production." Biomass and Bioenergy 12(6):387-407 (1997).

Haussinger et al., "Hydrogen, 3. Purification," Ullmann's Encyclopedia of Industrial Chemistry 18:309-333 (publication date: Oct. 15, 2011).

International Search Report and Written Opinion dated Apr. 12, 2024 for International Application No. PCT/US2023/085438, 12 pages.

Matthias Binder: "Hydrogen from biomass gasification," pp. 1-85 (publication date: Jan. 7, 2019).

Pallarés et al., "Production and characterization of activated carbon from barley straw by physical activation with carbon dioxide and steam," Biomass and Bioenergy, 115:64-73 (Publication date: Apr. 15, 2018).

Pronobis, "Evaluation of the influence of biomass co-combustion on boiler furnace slagging by means of fusibility correlations," Biomass and Bioenergy 28:275-383 (epublication date: Jan. 17, 2005).

Schiegl, W.W., et al., "Earth and Planetary Science Letters," North-Holland Publishing Comp., Amsterdam Deuterium Content of Organic Matter, pp. 307-313 (publication date: Aug. 25, 1969).

Wang et al., "Characteristics of maize biochar with different pyrolysis temperatures and its effects on organic carbon, nitrogen and enzymatic activities after addition to fluvo-aquic soil," Science of the Total Environment (epublication date: Aug. 22, 2015).

Wang et al., "Characterization of Acid-Aged Biochar and Its Ammonium Adsorption in an Aqueous Solution," Materials, 17 pages (publication date: May 14, 2020).

Zaid et al., "Coal Combustion Analysis Tool in Coal Fired Power Plant for Slagging and Fouling Guidelines," The 10th International Meeting of Advances in Thermofluids, AIP Conf. Proc. 2062, 020028 1-022028-7 (publication date: Jan. 25, 2019).

Arnold et al., "Slow pyrolysis of bio-oil and studies on chemical and physical properties fo the resulting new bio-carbon," Journal of Cleaner Production, 2748-2758 (2018).

Biogreen, "Example composition of syngas from different materials," https://www.biogreen-energy.com/syngas, Wayback machine (publication date: Dec. 12, 2018).

Dai et al., "Pelletization of carbonized wood using organic binders with biomass gasification residue as additive," Science Direct, Energy Procedia 158:509-515 (Aug. 2018).

Database WPI Week 201925, 2019 Thomoson Scientific, London, GB AN 2019-14659B, XP002812456, & CN 109294 A (Univ Fuyang Normal) (publication date: Feb. 1, 2019).

Fellner et al., "Abundance of 14C in biomass fractions of wastes and solid recovered fuels," Waste Management 29:1495-1503 (publication date: Jan. 20, 2009).

Houdremont et al., "Hydrogen as alloying element," XP002812498, Database Compendex [Online] Engineering Information, Inc., New York, NY, US (publication date: May 1941).

International Search Report and Written Opinion dated Dec. 10, 2024 for International Application No. PCT/US2024/049544.

International Search Report and Written Opinion dated Dec. 16, 2024 for International Application No. PCT/US2024/049538.

Roberts et al., "Life Cycle Assessment of Biochar Systems: Estimating the Energetic Economic, and Climate Change Potential," Environ. Sci. Technol. 44:827-833 (2010).

Sang-Woo et al., "Effects of pyrolisis temperature on changes in fuel characteristics of biomass char," Energy, 187-195 (epublication date: Feb. 21, 2015).

Suopajarvi et al., "Extensive review of the opportunities to use biomass-based fuels in iron and steelmaking process," Journal of Cleaner Production, 148:709-734 (Feb. 7, 2017).

Suopajarvi et al., "Use of biomass in integrated steelmaking—Status quo, future needs and comparison to other low-CO2 steel production technologies," Applied Energy, 213:384-407 (publication date: Jan. 28, 2018).

Yang et al., "Characteristics of hemicellulose, cellulose and lignin pyrolysis," Science Direct, 86:1781-1788 (epublication date: Jan. 10, 2007).

Zhang et al., "Comparison of Bio-Oil and Waste Cooking Oil as Binders during the Codensification of Biomass: Analysis of the Pellet Quality," BioEnergy Research, 12:558-569 (publication date: May 22, 2019).

* cited by examiner

BIOMASS PYROLYSIS INTEGRATED WITH BIO-REDUCTION OF METAL ORES, HYDROGEN PRODUCTION, AND/OR ACTIVATED-CARBON PRODUCTION

CROSS-REFERENCE TO RELATED APPLICATION(S)

This application claims the benefit of U.S. Provisional Patent Application No. 63/116,403 filed Nov. 20, 2020, and of U.S. Provisional Patent Application No. 63/130,460 filed Dec. 24, 2020, each of which is incorporated herein by reference in its entirety.

TECHNICAL FIELD

The present disclosure relates to processes, systems, and apparatus for the processing of metal ores to produce metals using carbon-containing reagents, and processes, systems, and apparatus for hydrogen production and activated-carbon production from carbon-containing reagents.

BACKGROUND

Carbon-based reagents are traditionally produced from fossil fuels. Carbonaceous materials include fossil resources, such as natural gas, petroleum, coal, and lignite, or renewable resources, such as lignocellulosic biomass and various carbon-rich waste materials. Converting renewable resources to carbon-based reagents poses technical and economic challenges arising from feedstock variations, operational difficulties, and capital intensity. The increasing economic, environmental, and social costs associated with fossil resources make renewable resources an attractive alternative to fossil resources in the production of carbon-based reagents.

Historically, slow pyrolysis of wood has been performed in large piles, in a simple batch process, with no emissions control. Traditional charcoal-making technologies are energy-inefficient as well as highly polluting. There are economic and practical challenges to scaling up such processes for continuous commercial-scale production of high-quality carbon, while managing the energy balance and controlling emissions.

SUMMARY

Herein disclosed are processes. In the processes disclosed herein, the processes can comprise:
  providing a biomass feedstock;
  pyrolyzing the biomass feedstock, thereby generating a biogenic reagent, wherein the biogenic reagent comprises carbon, and a pyrolysis off-gas;
  reacting the biogenic reagent with a selected reactant, thereby generating a reducing gas; and
  chemically reducing a selected metal oxide in the presence of the reducing gas, thereby generating a reduced form of the selected metal oxide.

The pyrolysis off-gas can be oxidized, thereby generating heat. In some embodiments, the process can further comprise recovering the biogenic reagent continuously or periodically during the reacting or ultimately after the reacting, thereby generating a recovered biogenic reagent, wherein the recovered biogenic reagent is activated carbon.

The pyrolyzing can be conducted at a pyrolysis temperature in the range of from or any number in between about 250° C. to about 1250° C., in the range of from or any number in between about 300° C. to about 700° C. The pyrolyzing can be conducted for a pyrolysis time in the range of from or any number in between about 10 seconds to about 24 hours.

The reacting can be conducted at a reaction temperature in the range of from or any number in between about 300° C. to about 1200° C., such as in the range of from or any number in between about 400° C. to about 1000° C. The reacting can be conducted for a reaction time in the range of from or any number in between about 1 second to about 1 hour.

The chemically reducing can be conducted at a reduction temperature in the range of from or any number in between about 500° C. to about 2000° C., such as in the range of from or any number in between about 700° C. to about 1800° C. The chemically reducing can be conducted for a reduction time in the range of from or any number in between about 30 minutes to about 48 hours.

In some embodiments, the biomass feedstock can be softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, railroad ties, lignin, animal manure, municipal solid waste, municipal sewage, or a combination thereof.

The biogenic reagent can comprise in the range of from or any number in between about 50, 55, 60, 65, 70, 75, 80, 85, 90, or 95 wt % carbon. Such carbon is total carbon, which is fixed carbon plus volatile carbon. The biogenic reagent can comprise in the range of from or any number in between about 50, 55, 60, 65, 70, 75, 80, 85, 90, or 95 wt % fixed carbon.

The selected metal oxide can be iron oxide, copper oxide, nickel oxide, magnesium oxide, manganese oxide, aluminum oxide, tin oxide, zinc oxide, cobalt oxide, chromium oxide, tungsten oxide, molybdenum oxide, or a combination or a derivative thereof. The selected metal oxide can be iron ore, which can be hematite, magnetite, limonite, taconite, or a combination or a derivative thereof.

The reduced form of the selected metal oxide can be a fully reduced metal. The reduced form of the selected metal oxide can be a second metal oxide having a lower oxidation state than the selected metal oxide. Mixtures of a fully reduced metal and a second metal oxide can also be produced from a starting metal oxide.

In some embodiments, the process further comprises oxidizing the pyrolysis off-gas, thereby generating heat, and the heat is utilized for heating in the pyrolyzing. Alternatively, or additionally, the heat can be utilized for heating in the reacting. Alternatively, or additionally, the heat can be utilized for heating in the chemically reducing.

In some embodiments, the reducing gas comprises in the range of from or any number in between about 10 mol % to about 25 mol % hydrogen. In certain embodiments, the reducing gas comprises at least 25 mol % hydrogen.

In some embodiments, the reducing gas comprises in the range of from or any number in between about 10 mol % to about 25 mol % carbon monoxide. In certain embodiments, the reducing gas comprises at least 25 mol % carbon monoxide.

In some embodiments, in the range of from or any number in between about 50 wt % to about 90 wt % the volatile carbon within the biogenic reagent generated is directed to the reducing gas. In some embodiments, essentially all of the volatile carbon within the biogenic regent generated is directed to the reducing gas.

The process can further comprise hydrogen content of the reducing gas using the water-gas shift reaction. In some embodiments, whether or not water-gas shift is performed, the process can further comprise separating hydrogen from the reducing gas and recovering the hydrogen. Hydrogen can be separated from the reducing gas using a separation technique. In some embodiments, the separation technique can comprise pressure-swing adsorption, molecular-sieve membrane separation, or cryogenic distillation.

In some embodiments, the selected reactant in the reacting the biogenic reagent is water. In other embodiments, the selected reactant in the reacting is oxygen, wherein the oxygen is present comprised within air, pure oxygen, enriched oxygen, ozone, or a combination thereof. In some embodiments, the selected reactant in the reacting is or comprises a combination of water (e.g., steam) and oxygen.

In some embodiments, the reacting utilizes a fixed-bed reactor or a rotary kiln. In some embodiments, the reacting utilizes a fluidized-bed reactor.

The pyrolysis off-gas can be partially oxidized, thereby generating additional reducing gas and heat. In some embodiments, the chemically reducing further comprises chemically reducing the selected metal oxide in the presence of the additional reducing gas. When the pyrolysis off-gas is converted to additional reducing gas, the additional reducing gas can comprise in the range of from or any number in between about 20 mol % to about 40 mol % hydrogen. The additional reducing gas can comprise in the range of from or any number in between about 20 mol % to about 40 mol % carbon monoxide.

In some embodiments, the process further comprises recovering the reduced form of the selected metal oxide.

The process can be co-located at a metal-oxide mine or at a metal-oxide processing plant, such as a steel mill, a taconite plant, or a direct reduced-iron plant, for example.

In some embodiments, the chemically reducing is conducted in a metal ore furnace. In some embodiments, the chemically reducing is conducted upstream of a metal ore furnace. A metal ore furnace can be a blast furnace, a direct-reduced-metal furnace, a top-gas recycling blast furnace, a shaft furnace, a reverberatory furnace, a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, or a combination thereof.

In some embodiments, the pyrolyzing of the biomass feedstock and the chemically reducing are conducted at the same site. In certain embodiments, all process steps are conducted at a single site.

When activated carbon is a desired product, the process can further comprise recovering the biogenic reagent continuously or periodically during the reacting or after the reacting, thereby generating a recovered biogenic reagent, wherein the recovered biogenic reagent is activated carbon. In some embodiments, in the range of from or any number in between about 1 wt % to about 99 wt %, such as at least about 10 wt %, at least about 50 wt %, or at least about 90 wt % of the biogenic reagent generated in the pyrolyzing is recovered as the activated carbon. In some embodiments, essentially all of the biogenic reagent generated in the pyrolyzing is recovered as the activated carbon. In some embodiments, in the range of from or any number in between about 50 wt % to about 99 wt % of the fixed carbon within the biogenic reagent generated in the pyrolyzing is recovered as the activated carbon. In some embodiments, essentially all of the fixed carbon within the biogenic reagent generated in the pyrolyzing is recovered as the activated carbon.

The activated carbon can be characterized by an Iodine Number in the range of from or any number in between about 500 to about 2000. The activated carbon can be characterized by an Iodine Number of at least about 750, at least about 1000, at least about 1500, or at least about 2000.

The activated carbon can be characterized by a renewable carbon content in the range of from or any number in between about 90% to about 100% as determined from a measurement of the $^{14}C/^{12}C$ isotopic ratio of the activated carbon. In some embodiments, the activated carbon is characterized as fully renewable activated carbon as determined from a measurement of the $^{14}C/^{12}C$ isotopic ratio of the activated carbon.

Also disclosed herein are systems. The systems disclosed herein can comprise:

a first reactor configured to pyrolyze a biomass feedstock to generate a biogenic reagent, wherein the biogenic reagent comprises carbon, and a pyrolysis off-gas;

a second reactor configured to react the biogenic reagent with a selected reactant to generate a reducing gas; and a third reactor configured to chemically reduce a selected metal oxide in the presence of the reducing gas to generate a reduced form of the selected metal oxide.

In some embodiments, the second reactor is configured to continuously, periodically, or ultimately remove activated carbon from the second reactor.

In some embodiments, the system further comprises one or more heating units in thermal communication with the first reactor, the second reactor, or the third reactor, and the one or more heating units are configured for oxidizing the pyrolysis off-gas to generate heat.

In some embodiments, the first reactor is configured to operate at a pyrolysis temperature in the range of from or any number in between about 250° C. to about 1250° C., such as in the range of from or any number in between about 300° C. to about 700° C. The first reactor can be configured to operate at a pyrolysis time in the range of from or any number in between about 10 seconds to about 24 hours.

In some embodiments, the second reactor is configured to operate at a reaction temperature in the range of from or any number in between about 300° C. to about 1200° C., such as in the range of from or any number in between about 400° C. to about 1000° C. The second reactor can be configured for operating at a reaction time in the range of from or any number in between about 1 second to about 1 hour.

In some embodiments, the third reactor is configured to operate at a reduction temperature in the range of from or any number in between about 500° C. to about 2000° C., such as in the range of from or any number in between about 700° C. to about 1800° C. The third reactor can be configured for operating at a reduction time in the range of from or any number in between about 30 minutes to about 48 hours.

The first reactor can be configured to process a biomass feedstock, such as softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, railroad ties, lignin animal manure, municipal solid waste, municipal sewage, or a combination thereof.

The third reactor can be configured to reduce a metal oxide, such as iron oxide, copper oxide, nickel oxide, magnesium oxide, manganese oxide, aluminum oxide, tin oxide, zinc oxide, cobalt oxide, chromium oxide, tungsten oxide, molybdenum oxide, or a combination thereof. The metal oxide can be iron ore, such as hematite, magnetite, limonite, taconite, or a combination thereof. The reduced form of the selected metal oxide can be a fully reduced metal or a second metal oxide having a lower oxidation state than the selected metal oxide.

In some embodiments, there is a heating unit in thermal communication with the first reactor. In some embodiments, there is a heating unit in thermal communication with the second reactor. In some embodiments, there is a heating unit in thermal communication with the third reactor. There can be distinct heating units in thermal communication with each reactor, or there can be one or more integrated heating units in thermal communication with multiple reactors.

In some embodiments, the second reactor is configured to increase hydrogen content of the reducing gas using the water-gas shift reaction.

In some embodiments, the system further comprises an additional reactor in flow communication with the second reactor, wherein the additional reactor is configured to increase hydrogen content of the reducing gas via the water-gas shift reaction.

In some embodiments, the system further comprises a separation unit configured for separating hydrogen from the reducing gas. The separation unit can be selected from a pressure-swing adsorption unit, a molecular-sieve membrane, or a cryogenic distillation unit, for example.

The second reactor can be a fixed-bed reactor, a fluidized-bed reactor, a rotary kiln, or another type of reactor.

In some embodiments, the system further comprises an off-gas reactor configured to partially or fully oxidize the pyrolysis off-gas to generate additional reducing gas. The off-gas reactor can be in flow communication with the third reactor.

In some embodiments, the second reactor is further configured for receiving and converting the pyrolysis off-gas to additional reducing gas.

In some embodiments, there is an outlet from the third reactor configured for recovering the reduced form of the selected metal oxide.

In some embodiments, the system can be co-located at a metal-oxide mine. The system can be co-located at a metal-oxide processing plant, such as a steel mill, a taconite plant, or a direct reduced-iron plant.

In some embodiments, the third reactor is a metal ore furnace. In some embodiments, the third reactor is upstream of a metal ore furnace. The metal ore furnace can be selected from a blast furnace, a direct-reduced-metal furnace, a top-gas recycling blast furnace, a shaft furnace, a reverberatory furnace, a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, or a combination thereof.

In some embodiments, the first reactor and the third reactor are co-located at the same site. In some embodiments, the system is entirely located at a single site.

The second reactor can be configured for continuously or periodically removing activated carbon from the second reactor. Alternatively or additionally, the second reactor is configured for ultimately (at the conclusion of a period of operation) removing activated carbon from the second reactor. The activated carbon can be characterized by an Iodine Number of at least about 500. The activated carbon can be characterized as fully renewable activated carbon as determined from a measurement of the $^{14}C/^{12}C$ isotopic ratio of the activated carbon.

Also disclosed herein are metal products. The metal products can be produced by processes comprising:

providing a biomass feedstock;
   pyrolyzing the biomass feedstock, thereby generating a biogenic reagent, wherein the biogenic reagent comprises carbon, and a pyrolysis off-gas;
   reacting the biogenic reagent with a selected reactant, thereby generating a reducing gas;
   chemically reducing a selected metal oxide in the presence of the reducing gas, thereby generating a reduced form of the selected metal oxide; and
   recovering a metal product comprising the reduced form of the selected metal oxide.

In some embodiments, the process further comprises oxidizing the pyrolysis off-gas, thereby generating heat.

In some embodiments, the process further comprises recovering the biogenic reagent continuously or periodically during the reacting or after the reacting, thereby generating a recovered biogenic reagent, wherein the recovered biogenic reagent is activated carbon.

In some embodiments, the chemically reducing is conducted at a reduction temperature in the range of from or any number in between about 500° C. to about 2000° C., such as in the range of from or any number in between about 700° C. to about 1800° C. The chemically reducing can be conducted for a reduction time in the range of from or any number in between about 30 minutes to about 48 hours.

The selected metal oxide can be iron oxide, copper oxide, nickel oxide, magnesium oxide, manganese oxide, aluminum oxide, tin oxide, zinc oxide, cobalt oxide, chromium oxide, tungsten oxide, molybdenum oxide, or a combination thereof. An exemplary metal oxide is iron ore, e.g., hematite, magnetite, limonite, taconite, or a combination thereof. The reduced form can be a fully reduced metal or a second metal oxide having a lower oxidation state than the selected metal oxide.

The selected reactant in the reacting can be water, oxygen, or a mixture thereof. Oxygen can be present as comprised within air, pure oxygen, enriched oxygen, ozone, or a combination thereof.

In some embodiments, the reducing gas comprises in the range of from or any number in between about 10 mol % to at least about 25 mol % hydrogen. In some embodiments, the reducing gas comprises in the range of from or any number in between about 10 mol % or at least about 25 mol % carbon monoxide.

In some embodiments, the metal product is produced by a process further comprising increasing hydrogen content of the reducing gas using the water-gas shift reaction.

In some embodiments, the pyrolysis off-gas is partially or fully oxidized, thereby generating additional reducing gas and heat. In some embodiments, in the chemically reducing, the additional reducing gas can be utilized to chemically reduce the selected metal oxide.

In various embodiments, the metal product comprises iron, copper, nickel, magnesium, manganese, aluminum, tin, zinc, cobalt, chromium, tungsten, molybdenum, or a combination thereof.

Also disclosed herein are renewable hydrogen products. The renewable hydrogen products can be produced by processes comprising:

providing a biomass feedstock;

pyrolyzing the biomass feedstock, thereby generating a biogenic reagent, wherein the biogenic reagent comprises carbon, and a pyrolysis off-gas;

reacting the biogenic reagent with a selected reactant, thereby generating a reducing gas;

separating hydrogen from the reducing gas; and recovering a renewable hydrogen product comprising the hydrogen.

In some embodiments, the processes further comprises oxidizing the pyrolysis off-gas, thereby generating heat.

In some embodiments, the separating hydrogen from the reducing gas comprises separating the hydrogen using separation techniques such as pressure-swing adsorption, molecular-sieve membrane separation, or cryogenic distillation.

In some embodiments, the process further comprises recovering the biogenic reagent continuously or periodically during or after the reacting, thereby generating a recovered biogenic reagent, wherein the recovered biogenic reagent is activated carbon.

The hydrogen can be characterized in the range of from or any number in between about 50% to about at least about 99% renewable hydrogen according to a hydrogen-isotope $^2H/^1H$ analysis. In some hydrogen products, the hydrogen is characterized as at least 90% renewable hydrogen or at least 95% renewable hydrogen. In some hydrogen products, the hydrogen is characterized essentially fully renewable hydrogen.

The $^2H/^1H$ isotopic ratio of the hydrogen comprised within and separated from the reducing gas can be in the range of from or any number in between about 0.0002 to about 0.001, such as in the range of from or any number in between about 0.0002 to about 0.005.

In some embodiments, the hydrogen is characterized as fully renewable hydrogen, and any residual carbon contained in the hydrogen product is essentially fully renewable carbon as determined from a measurement of the $^{14}C/^{12}C$ isotopic ratio.

The selected reactant in the reacting can be water, oxygen, or a mixture thereof. Oxygen can be present as comprised within air, pure oxygen, enriched oxygen, ozone, or a combination thereof.

In some embodiments, the reducing gas comprises in the range of from or any number in between about 10 mol % or at least about 25 mol % hydrogen. In some embodiments, the reducing gas comprises in the range of from or any number in between about at least 10 mol % or at least about 25 mol % carbon monoxide.

In some embodiments, the hydrogen product is produced by a process further comprising increasing hydrogen content of the reducing gas using the water-gas shift reaction.

In some embodiments, the pyrolysis off-gas is partially or fully oxidized, thereby generating additional reducing gas and heat.

In some embodiments, the hydrogen is separated using pressure-swing adsorption, molecular-sieve membrane separation, cryogenic distillation, or a combination thereof.

The hydrogen product can comprise in the range of from or any number in between about 50 mol % to about 90 mol % hydrogen. In some embodiments, the hydrogen product comprises at least 90 mol % hydrogen.

In some embodiments, the hydrogen product comprises at most about 1 mol % nitrogen or is substantially free of nitrogen.

Further disclosed herein are reducing-gas compositions that can be utilized to reduce a metal oxide, wherein the reducing-gas composition comprises at least about 25 mol % hydrogen, wherein the hydrogen is at least about 50% renewable hydrogen according to a hydrogen-isotope $^2H/^1H$ analysis.

In some embodiments, the reducing-gas composition comprises in the range of from or any number in between about 50 mol % hydrogen to at least about 90 mol % hydrogen, such as in the range of from or any number in between about 75 mol % or at least about 90 mol % hydrogen.

In some embodiments, the hydrogen is characterized as in the range of from or any number in between about 80% to at least about 99% renewable hydrogen according to a hydrogen-isotope $^2H/^1H$ analysis. In certain embodiments, the hydrogen is characterized as at least about 90% renewable hydrogen according to a hydrogen-isotope $^2H/^1H$ analysis. In certain embodiments, the hydrogen is characterized as essentially fully renewable hydrogen according to a hydrogen-isotope $^2H/^1H$ analysis.

In some embodiments, the reducing-gas composition can further comprise carbon-containing gases comprising CO, $CO_2$, or $CH_4$, or the reducing-gas composition can further comprise carbon-containing gases consisting essentially of CO, $CO_2$, or $CH_4$. In some embodiments, the carbon-containing gases are in the range of from or any number in between about 50% to at least about 99% renewable, such as at least about 90% renewable, or essentially fully renewable as determined from a measurement of the $^{14}C/^{12}C$ isotopic ratio. When the reducing-gas composition comprises carbon-containing gases, the hydrogen can be characterized as at least 90% renewable hydrogen, or essentially fully renewable hydrogen, according to a hydrogen-isotope $^2H/^1H$ analysis.

In some embodiments, the reducing-gas composition further comprises carbon monoxide, and wherein the carbon monoxide is in the range of from or any number in between about 50% to about 99% renewable, such as at least 90% renewable, or essentially fully renewable as determined from a measurement of the $^{14}C/^{12}C$ isotopic ratio. In some embodiments, where the reducing-gas composition further comprises carbon monoxide, the hydrogen is characterized as at least 90% renewable hydrogen, or as consisting essentially of fully renewable hydrogen, according to a hydrogen-isotope $^2H/^1H$ analysis. In some reducing-gas compositions, the molar ratio of the hydrogen to the carbon monoxide is at least 2.

In some embodiments, the reducing-gas composition comprises at most about 1 mol % $N_2$, at most about 0.5 mol % $N_2$, at most about 0.1 mol % $N_2$, or is essentially free of $N_2$.

Further disclosed herein are activated carbon products. The activated carbon products can be produced by processes comprising:

providing a biomass feedstock;

pyrolyzing the biomass feedstock, thereby generating a biogenic reagent, wherein the biogenic reagent comprises carbon, and a pyrolysis off-gas;

reacting the biogenic reagent with a selected reactant, thereby generating a reducing gas; and recovering the biogenic reagent continuously or periodically during or after the reacting, wherein the recovered biogenic reagent is activated carbon.

In some embodiments, the activated carbon product is produced by the process further comprising oxidizing the pyrolysis off-gas, thereby generating heat.

In some embodiments, the activated carbon product is produced by the process further comprising chemically reducing a selected metal oxide in the presence of the reducing gas from the reacting, thereby generating a reduced form of the selected metal oxide.

In some embodiments, the pyrolyzing is conducted at a pyrolysis temperature in the range of from or any number in between about 250° C. to about 1250° C., such as in the range of from or any number in between about 300° C. to about 700° C. The pyrolyzing can be conducted for a pyrolysis time in the range of from or any number in between about 10 seconds to about 24 hours.

In some embodiments, the reacting is conducted at a reaction temperature in the range of from or any number in between about 300° C. to about 1200° C., such as in the range of from or any number in between about 400° C. to about 1000° C. The reacting can be conducted for a reaction time in the range of from or any number in between about 1 second to about 1 hour.

In some embodiments, the biogenic reagent generated in the pyrolyzing comprises in the range of from or any number in between about 50 wt % or at least about 99 wt % carbon, such as in the range of from or any number in between about 50 wt % or at least about 75 wt % carbon. This biogenic reagent can comprise in the range of from or any number in between about 50 wt % fixed carbon or at least about 99 wt % fixed carbon, such as in the range of from or any number in between about 50 wt % or at least about 75 wt % fixed carbon.

In some embodiments, the reducing gas comprises in the range of from or any number in between about 10 mol % hydrogen or at least about 25 mol % hydrogen.

In some embodiments, the reducing gas comprises in the range of from or any number in between about 10 mol % carbon monoxide or at least about 25 mol % carbon monoxide.

In some embodiments, the activated carbon product is produced by a process further comprising increasing hydrogen content of the reducing gas via the water-gas shift reaction.

In some embodiments, the selected reactant in the reacting is water, oxygen, or a mixture thereof. Oxygen can be present comprised within air, pure oxygen, enriched oxygen, ozone, or a combination thereof.

In some embodiments, in the range of from or any number in between about 10 wt % to 99 wt %, such as in the range of from or any number in between about 50 wt % or at least about 90 wt % of the biogenic reagent generated in the pyrolyzing is recovered as the activated carbon.

In some embodiments, in the range of from or any number in between about 50 wt % to at least about 99 wt % or essentially all of the fixed carbon within the biogenic reagent generated is recovered as the activated carbon.

The activated carbon can be characterized by an Iodine Number in the range of from or any number in between about 500 to about 2000. In some embodiments, the activated carbon is characterized by an Iodine Number of at least about 1000, at least about 1500, or at least about 2000.

The activated carbon can be characterized by a renewable carbon content of at least 90% as determined from a measurement of the $^{14}C/^{12}C$ isotopic ratio of the activated carbon. In certain embodiments, the activated carbon is characterized as essentially fully renewable activated carbon as determined from a measurement of the $^{14}C/^{12}C$ isotopic ratio of the activated carbon.

DETAILED DESCRIPTION

Figure 1:
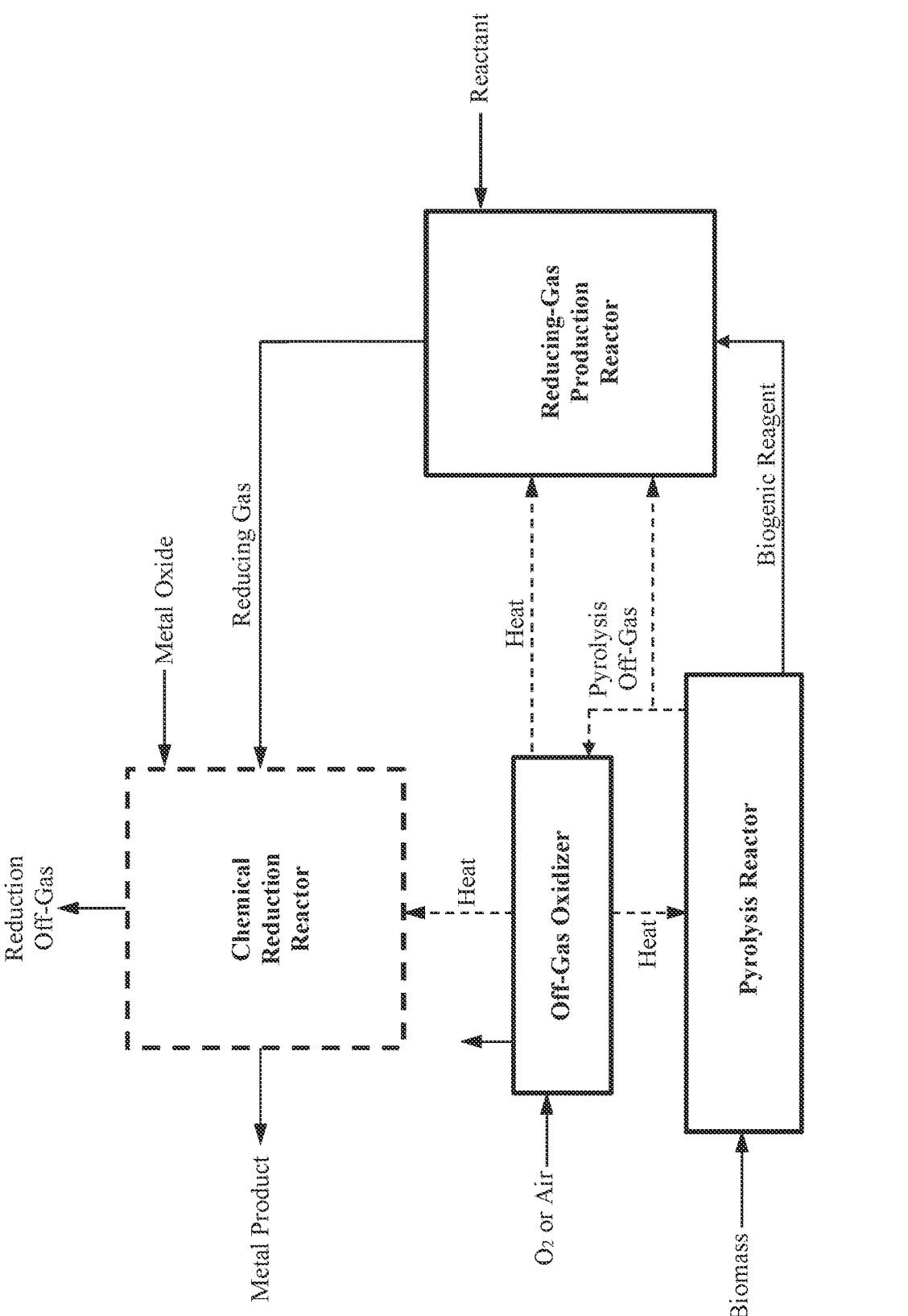
FIG. 1 is a simplified block-flow diagram of a process for converting a biomass feedstock into a reducing-gas composition that is optionally utilized for reducing a metal oxide into a metal product, in some embodiments. Dotted lines denote optional streams and units.

This description will enable one skilled in the art to make and use the disclosed disclosure, and it describes several embodiments, adaptations, variations, alternatives, and uses of the disclosure. These and other embodiments, features, and advantages of the present disclosure will become more apparent to those skilled in the art when taken with reference to the following detailed description of the disclosure in conjunction with the accompanying drawings.

For purposes of an enabling technical disclosure, various explanations, hypotheses, theories, speculations, assumptions, and so on are disclosed. The present disclosure does not rely on any of these being in fact true. None of the explanations, hypotheses, theories, speculations, or assumptions in this detailed description shall be construed to limit the scope of the disclosure in any way.

Further, headings provided herein are for convenience only and do not interpret the scope or meaning of the claimed embodiments.

There exist a variety of technologies to convert biomass feedstocks into high-carbon materials. Pyrolysis is a process for thermal conversion of solid materials in the complete absence of oxidizing agent (air or oxygen), or with such limited supply of oxidizing agent that oxidation does not occur to any appreciable extent. Depending on process conditions and additives, biomass pyrolysis can be adjusted to produce widely varying amounts of gas, liquid, and solid. Lower process temperatures and longer vapor residence times favor the production of solids. High temperatures and longer residence times increase the biomass conversion to syngas, while moderate temperatures and short vapor residence times are generally optimum for producing liquids. There is a need for pyrolysis processes that specifically target optimizing yield and quality of the solid pyrolysis product as carbon reagents.

Metal processing is an enormously important industry on a global basis. For example, with respect to steel (alloys of iron), the global steel market size is expected to reach $1 trillion USD by 2025, according to *Steel Market Size, Share & Trends Analysis* 2018-2025, Grand View Research, Inc. (2017). Growing inclination of contractors towards sustainable, low-cost, and durable building materials is driving steel demand in industrial infrastructure and residential projects. In pre-engineered metal buildings with high structural integrity, steel plays an essential function in stability, design flexibility, and aesthetic appeal. Stringent regulations promoting green and energy-efficient buildings are also contributing to steel demand, especially in industrial structures.

About 70% of all steel is made from pig iron produced by reducing iron oxide in a blast furnace using coke or coal before reduction in an oxygen-blown converter. The use of non-renewable coal or coal-derived coke causes non-renewable carbon dioxide to be emitted into the atmosphere, in addition to depleting fossil resources.

Oxygenated iron ores are mined globally. Iron ores can be taken through a beneficiation process to grind and concentrate the iron fraction, then rolled into pellets (with binders) and heated in an induration furnace, burning coal for heat, to harden the pellets for shipment to a blast furnace where coke is used to reduce the oxygenated ore to metallic iron. The induration and coking processes create massive amounts of $CO_2$ and other pollutants.

Metals processing causes significant global net $CO_2$ emissions annually. One of the biggest drawbacks of conventional blast furnaces is the inevitable $CO_2$ production as iron is reduced from iron oxides by carbon or by carbon monoxide (CO). Steelmaking is one of the largest industrial contributors of $CO_2$ emissions in the world today. There is a strong desire to make metal-making processes more environmentally friendly.

Hydrogen is used in various industrial applications, including metal alloying, glass production, electronics processing (e.g., in deposition, cleaning, etching, and reduction), and electricity generation (e.g., for corrosion prevention in pipelines).

Hydrogen is used to process crude oil into refined fuels, such as gasoline and diesel, and also for removing contaminants, such as sulfur, from these fuels. Hydrogen use in oil refineries has increased in recent years due to stricter regulations requiring low sulfur in diesel fuel, and the increased consumption of low-quality crude oil, which requires more hydrogen to refine. Refineries produce some byproduct hydrogen from the catalytic reforming of naphtha, but that supply meets only a fraction of their hydrogen needs. Approximately 80% of the hydrogen currently consumed worldwide by oil refineries is supplied by large hydrogen plants that generate non-renewable hydrogen from natural gas or other hydrocarbon fuels.

The direct reduction of iron ore using hydrogen could develop into an important industrial process in steel manufacturing. Large amounts of carbon dioxide are released in the traditional blast furnace. By replacing carbon or carbon monoxide with hydrogen to carry out metal oxide reduction into a metal product, the co-product shifts toward water rather than carbon dioxide. If the hydrogen used for iron ore reduction is renewable hydrogen, the environmental benefit would be even greater.

Definitions

As used herein, the singular forms "a," "an," and "the" include plural referents unless the context clearly dictates otherwise. For example, anywhere a product is produced, the process can be controlled so as to produce more than a singular product, such as where "a carbon-metal ore particulate," is produced, "a plurality of carbon-metal ore particulates" can be produced. This also applies to compositions comprising a single component. For example, where a composition comprises a carbon-metal ore particulate, the composition can comprise a plurality of carbon-metal ore particulates.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that can vary depending at least upon a specific analytical technique.

As used herein, the term "about" means ±20% of the indicated range, value, or structure, unless otherwise indicated.

As used herein, any concentration range, percentage range, ratio range, or integer range is to be understood to include the value of any integer within the recited range and, when appropriate, fractions thereof (such as one tenth and one-hundredth of an integer), unless otherwise indicated. Also, any number range recited herein is to be understood to include any integer within the recited range, unless otherwise indicated.

As used herein, "in the range of from or in between about," for example, "in the range of from or in between about X, Y, or Z," includes "at least X to at most Z."

As used herein, "biogenic" is a material (whether a feedstock, product, or intermediate) that contains an element, such as carbon, that is renewable on time scales of months, years, or decades. Non-biogenic materials can be non-renewable, or can be renewable on time scales of centuries, thousands of years, millions of years, or even longer geologic time scales. For example, traditional fuel sources of coal and petroleum are non-renewable and non-biogenic. A biogenic material can consist essentially of biogenic sources. It will be understood by one skilled in the art that biogenic materials, as natural sources or derived from nature, can comprise an immaterial amount of non-biogenic material. Further, the processes disclosed herein can be used with non-biogenic material, though the beneficial environmental impact may not be as great.

There are three naturally occurring isotopes of carbon, $^{12}C$, $^{13}C$, and $^{14}C$. $^{12}C$ and $^{13}C$ are stable, occurring in a natural proportion of approximately 93:1. $^{14}C$ is produced by thermal neutrons from cosmic radiation in the upper atmosphere, and is transported down to earth to be absorbed by living biological material. Isotopically, $^{14}C$ constitutes a negligible part; but, since it is radioactive with a half-life of 5,700 years, it is radiometrically detectable. Dead tissue does not absorb $^{14}C$, so the amount of $^{14}C$ is one of the methods used for radiometric dating of biological material.

Plants take up $^{14}C$ by fixing atmospheric carbon through photosynthesis. Animals then take $^{14}C$ into their bodies when they consume plants or consume other animals that consume plants. Accordingly, living plants and animals have the same ratio of $^{14}C$ to $^{12}C$ as the atmospheric $CO_2$. Once an organism dies, it stops exchanging carbon with the atmosphere, and thus no longer takes up new $^{14}C$. Radioactive decay then gradually depletes the $^{14}C$ in the organism. This effect is the basis of radiocarbon dating.

Fossil fuels, such as coal, are made primarily of plant material that was deposited millions of years ago. This period of time equates to thousands of half-lives of $^{14}C$, so essentially all of the $^{14}C$ in fossil fuels has decayed. Fossil fuels also are depleted in $^{13}C$ relative to the atmosphere, because they were originally formed from living organisms. Therefore, the carbon from fossil fuels is depleted in both $^{13}C$ and $^{14}C$ compared to biogenic carbon.

This difference between the carbon isotopes of recently deceased organic matter, such as that from renewable resources, and the carbon isotopes of fossil fuels, such as coal, allows for a determination of the source of carbon in a composition. Specifically, whether the carbon in the composition was derived from a renewable resource or from a fossil fuel; in other words, whether a renewable resource or a fossil fuel was used in the production of the composition.

Biomass is a term used to describe any biologically produced matter, or biogenic matter. Biomass refers to the mass of living organisms, including plants, animals, and microorganisms, or, from a biochemical perspective, cellulose, lignin, sugars, fats, and proteins. Biomass includes both the above- and belowground tissues of plants, for example, leaves, twigs, branches, boles, as well as roots of trees and rhizomes of grasses. The chemical energy contained in biomass is derived from solar energy using the natural process of photosynthesis. This is the process by which plants take in carbon dioxide and water from their surroundings and, using energy from sunlight, convert them into sugars, starches, cellulose, hemicellulose, and lignin. Biomass is useful in that it is, effectively, stored solar energy. Biomass is the only renewable source of carbon.

As used herein, the "combustion-stoichiometric amount of the oxygen" is the amount of oxygen, whether present in air, pure oxygen, or oxygen-enriched air, that completely oxidizes the carbon-comprising or hydrogen-comprising components to $CO_2$ or $H_2O$, respectively, without being in stoichiometric excess. When the pyrolysis off-gas is intentionally oxidized at less than stoichiometric for combustion, the oxygen utilized as a percentage of the combustion-stoichiometric amount of the oxygen can be at least about 10% to at most about 99%, at least about 25% to at most about 90%, or at least about 40% to at most about 80%. In various embodiments, this percentage is about, at least about, or at most about 15%, 20%, 25%, 30%, 35%, 40%, 45%, 50%, 55%, 60%, 65%, 70%, 75%, 80%, 85%, 90%, or 95%. These percentages are on a molar basis with oxygen in $O_2$ form.

As used herein, "comprising," which is synonymous with "including," "containing," or "characterized by," is inclusive or open-ended and does not exclude additional, unrecited elements or method steps. "Comprising" is a term of art used in claim language that indicates the named claim elements are essential, but other claim elements can be added and still form a construct within the scope of the disclosure. "Comprising" further provides basis for "consisting of" or "consisting essentially of." For example, where a formulation "comprises X, Y, Z" the formulation can consist of or consist essentially of X, Y, Z.

As used herein, "consisting of" excludes any element, step, or ingredient not specified. When the phrase "consists of" appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis of the claimed subject matter.

As used herein, a "derivative" is a compound, molecule, or ion that is derived from another substance by a chemical reaction. The substance from which the derivative is derived is an additive. A derivative is also an additive.

As used herein, "high-carbon," as in "high-carbon biogenic reagent," indicates the biogenic reagent has high carbon content relative to the feedstock used to produce the high-carbon biogenic reagent. A high-carbon biogenic reagent can comprise at least about half its weight as carbon. For example, a high-carbon biogenic reagent can comprise in the range of from or any number in between 55 to 99 wt % carbon, such as at least about 55, 60, 65, 70, 75, 80, 85, 90, 91, 92, 93, 94, 95, 96, 97, 98, or 99 wt % carbon.

As used herein, "high-carbon biogenic reagent" describes materials that can be produced by the disclosed processes and systems. Limitations as to carbon content, or any other concentrations, shall not be imputed from the term itself but rather only by reference to particular embodiments. For example, where a feedstock that comprises a low carbon content is subjected to the disclosed processes, the product is a high-carbon biogenic reagent that is highly enriched in carbon relative to the starting material (high yield of carbon), but nevertheless relatively low in carbon (low purity of carbon), including at most about 50 wt % carbon.

As used herein, the terms "include," "have," and "comprise" are used synonymously, which terms and variants thereof are intended to be construed as non limiting.

As used herein, "metal ore" is a metal-containing material in which a desired metal is not in pure, elemental form, but rather is present as a metal oxide, a metal sulfide, a metal nitride, a metal carbide, a metal boride, a metal phosphide, or another form of a metal.

Use of the word "or" in reference to a list of two or more items covers all of the following interpretations of the word: any of the items in the list, all of the items in the list, and any combination of the items in the list. Furthermore, the phrase "at least one of A, B, and C, etc." is intended in the sense that one having skill in the art would understand the convention (e.g., "a system having at least one of A, B, and C" would include, but not be limited to, systems that have A alone, B alone, C alone, A and B together, A and C together, B and C together, or A, B, and C together, etc.). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, or A, B, and C together, etc.).

As used herein, "pellet" is synonymous with "briquette" and reference can be made to pellet, briquette, pellet/briquette, or similar terms, all being references to an agglomerated object rather than a loose powder. For convenience, the term "pellet" will generally be used. The pellet geometry is not limited to spherical or approximately spherical. The pellet geometry can be spherical (round or ball shape), cube (square), octagon, hexagon, honeycomb/beehive shape, oval shape, egg shape, column shape, bar shape, bread shape, pillow shape, random, or a combination thereof.

As used herein, "pyrolysis" is the thermal decomposition of a carbonaceous material. In pyrolysis, less oxygen is present than is required for complete combustion of the material, such as at most about 10%, 5%, 1%, 0.5%, 0.1%, or 0.01% of the oxygen (02 molar basis) that is required for complete combustion. In some embodiments, pyrolysis is performed in the absence of oxygen.

As used herein, "reagent" is a material in its broadest sense. For example, a reagent can be a fuel, a chemical, a material, a compound, an additive, a blend component, or a solvent. A reagent is not necessarily a chemical reagent that causes or participates in a chemical reaction. However, a reagent can be a chemical reactant that can be consumed in a reaction. A reagent can be a chemical catalyst for a particular reaction. A reagent can cause or participate in adjusting a mechanical, physical, or hydrodynamic property of a material to which the reagent can be added. For example, a reagent can be introduced to a metal to impart certain strength properties to the metal. A reagent can be a substance of sufficient purity (which, in the current context, is typically carbon purity) for use in chemical analysis or physical testing.

As used herein, "renewable hydrogen" is determined by correlating the $^2H/^1H$ isotopic ratio with the renewability of the starting feedstock, without regard to the renewability of hydrogen contained in a water ($H_2O$) reactant that may be used to react with carbon or CO to form $H_2$. The $^2H/^1H$ isotopic ratio correlates with renewability of the hydrogen: higher $^2H/^1H$ isotopic ratios indicate a greater renewable hydrogen content.

As used herein, "total carbon" is fixed carbon plus non-fixed carbon that is present in volatile matter. In some embodiments, component weight percentages are on an absolute basis, which is assumed unless stated otherwise. In other embodiments, component weight percentages are on a moisture-free and ash-free basis.

As used herein, "zones" are regions of space within a single physical unit, physically separate units, or any combination thereof. For a continuous reactor, the demarcation of zones can relate to structure, such as the presence of flights within the reactor or distinct heating elements to provide heat to separate zones. Alternatively, or additionally, the demarcation of zones in a continuous reactor can relate to function, such as distinct temperatures, fluid flow patterns, solid flow patterns, or extent of reaction. In a single batch reactor, "zones" are operating regimes in time, rather than in space. There are not necessarily abrupt transitions from one zone to another zone. For example, the boundary between the preheating zone and pyrolysis zone can be somewhat arbitrary; some amount of pyrolysis can take place in a portion of the preheating zone, and some amount of "preheating" can continue to take place in the pyrolysis zone. The temperature profile in the reactor is typically continuous, including at zone boundaries within the reactor.

Processes and Systems

Disclosed herein are improved processes and systems to produce renewable hydrogen for reducing metal ores and for other industrial uses.

Some embodiments are predicated on processes and systems for producing a renewable reducing gas from biomass. The reducing gas can be utilized to reduce a metal oxide or can be utilized for production of renewable hydrogen.

In some embodiments, a first reactor is fed wood or another source of biomass. The first reactor is a pyrolysis reactor configured to generate carbon and a pyrolysis off-gas (also referred to as biogas) from the feedstock. A second reactor is configured to receive the carbon and a reactant, such as water or oxygen, to carry out reactions that form a reducing gas from the carbon. The reducing gas can comprise hydrogen and carbon monoxide. Optionally, a water-gas shift reaction is employed to convert $H_2O$ to $H_2$ (and CO to $CO_2$) to increase the hydrogen content of the reducing gas. The reducing gas can be sent to a separation unit to recover a hydrogen-rich product. Alternatively or additionally, a third reactor can be configured to directly or indirectly receive (a) reducing gas from the second reactor and (b) a metal oxide, operated at effective reduction conditions to convert the metal oxide to a reduced metal, and a reduction off-gas comprising at least $H_2O$, where the reduction off-gas can further comprise CO and $CO_2$. The pyrolysis off-gas is oxidized, thereby generating heat that can be utilized to heat the first reactor, the second reactor, or the third reactor. The process and system can be located on-site at a metal oxide mine, such as an iron mine, or at a metal oxide processing plant, such as a taconite processing plant. The process and system reduces or eliminates pollution and cost for induration, pelletizing, and shipping iron ore (or other metal oxides). The process and system also reduces pollution and costs of coking coal to make metallurgical coke or pollution and costs of shipping petroleum coke to blast furnaces. The process and system can also improve metal purity of the final product.

Variations of the disclosure will be described, including by reference to the accompanying drawings (FIGS. 1, 2, 3, and 4), which are not intended to be limiting but rather indicative of various embodiments.

FIG. 1 is a simplified block-flow diagram of a process and system for converting a biomass feedstock into a reducing-gas composition that is optionally utilized for reducing a metal oxide into a metal product, in some embodiments. Dotted lines denote optional streams and units.

Figure 2:
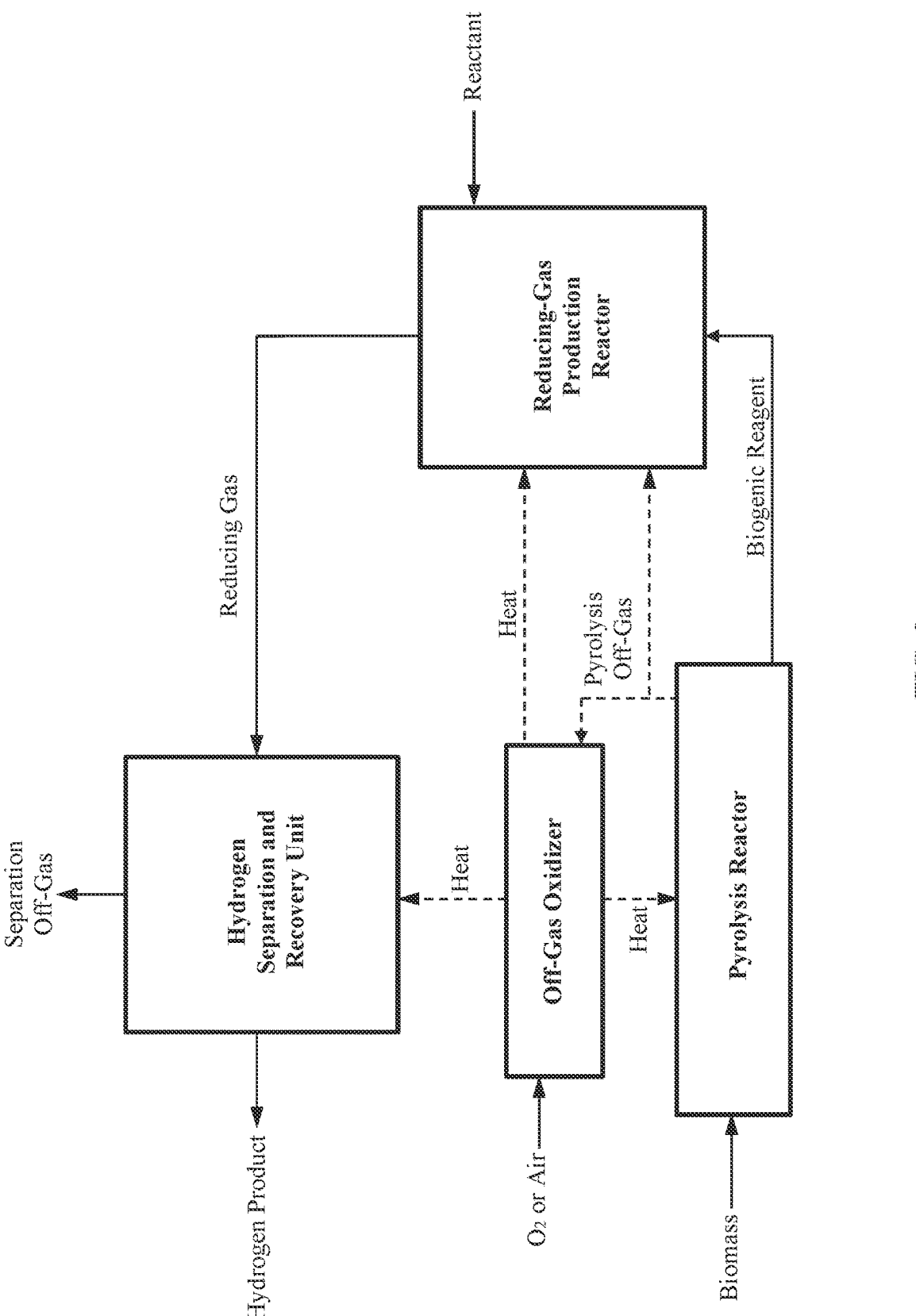
FIG. 2 is a simplified block-flow diagram of a process for converting a biomass feedstock into a reducing-gas composition that is utilized for producing renewable hydrogen, in some embodiments. Dotted lines denote optional streams and units.

FIG. 2 is a simplified block-flow diagram of a process and system for converting a biomass feedstock into a reducing-gas composition that is utilized for producing renewable hydrogen, in some embodiments. Dotted lines denote optional streams and units.

Figure 3:
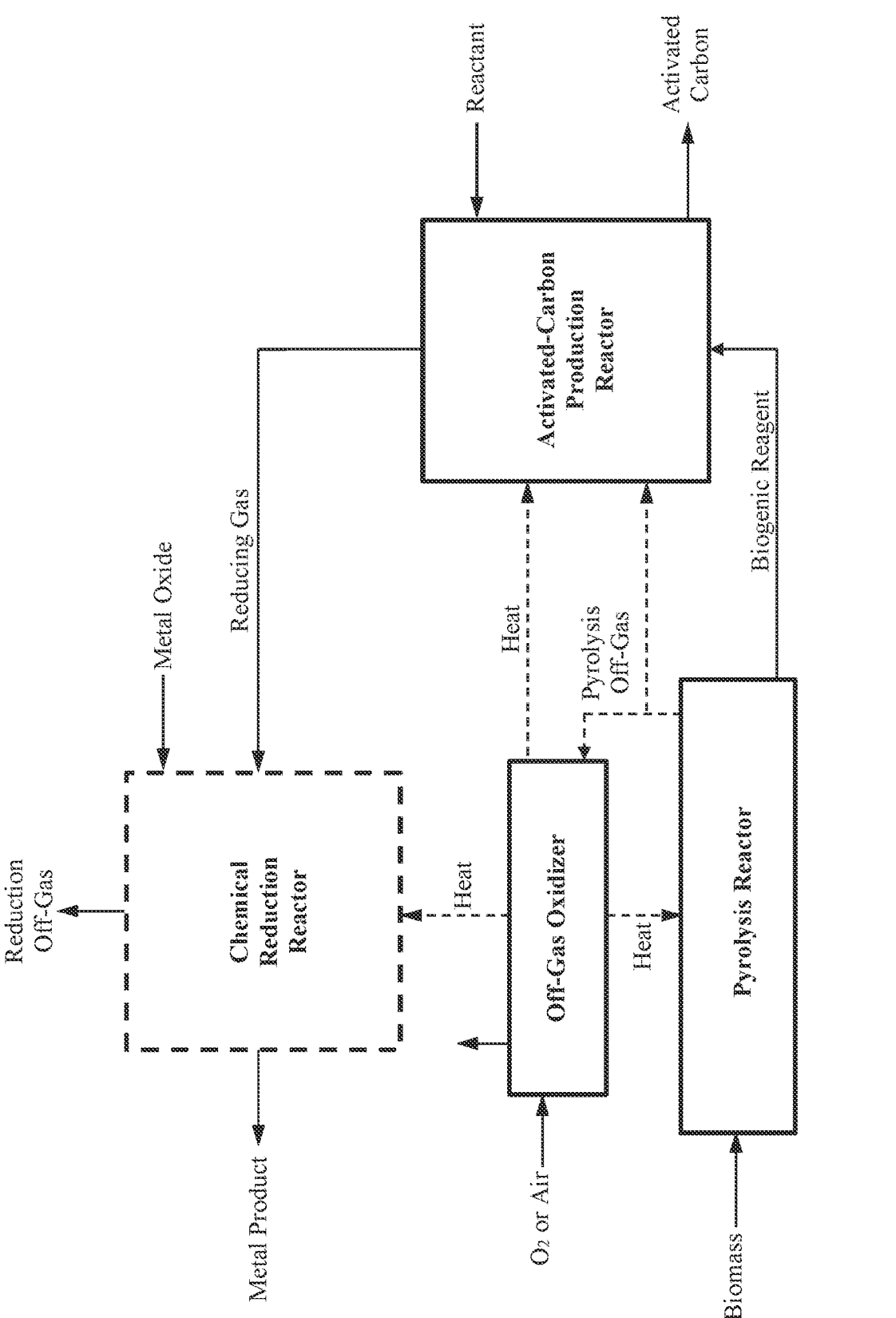
FIG. 3 is a simplified block-flow diagram of a process for converting a biomass feedstock into activated carbon as well as a reducing-gas composition, in some embodiments. Dotted lines denote optional streams and units.

FIG. 3 is a simplified block-flow diagram of a process for converting a biomass feedstock into activated carbon as well as a reducing-gas composition, in some embodiments. Dotted lines denote optional streams and units.

Figure 4:
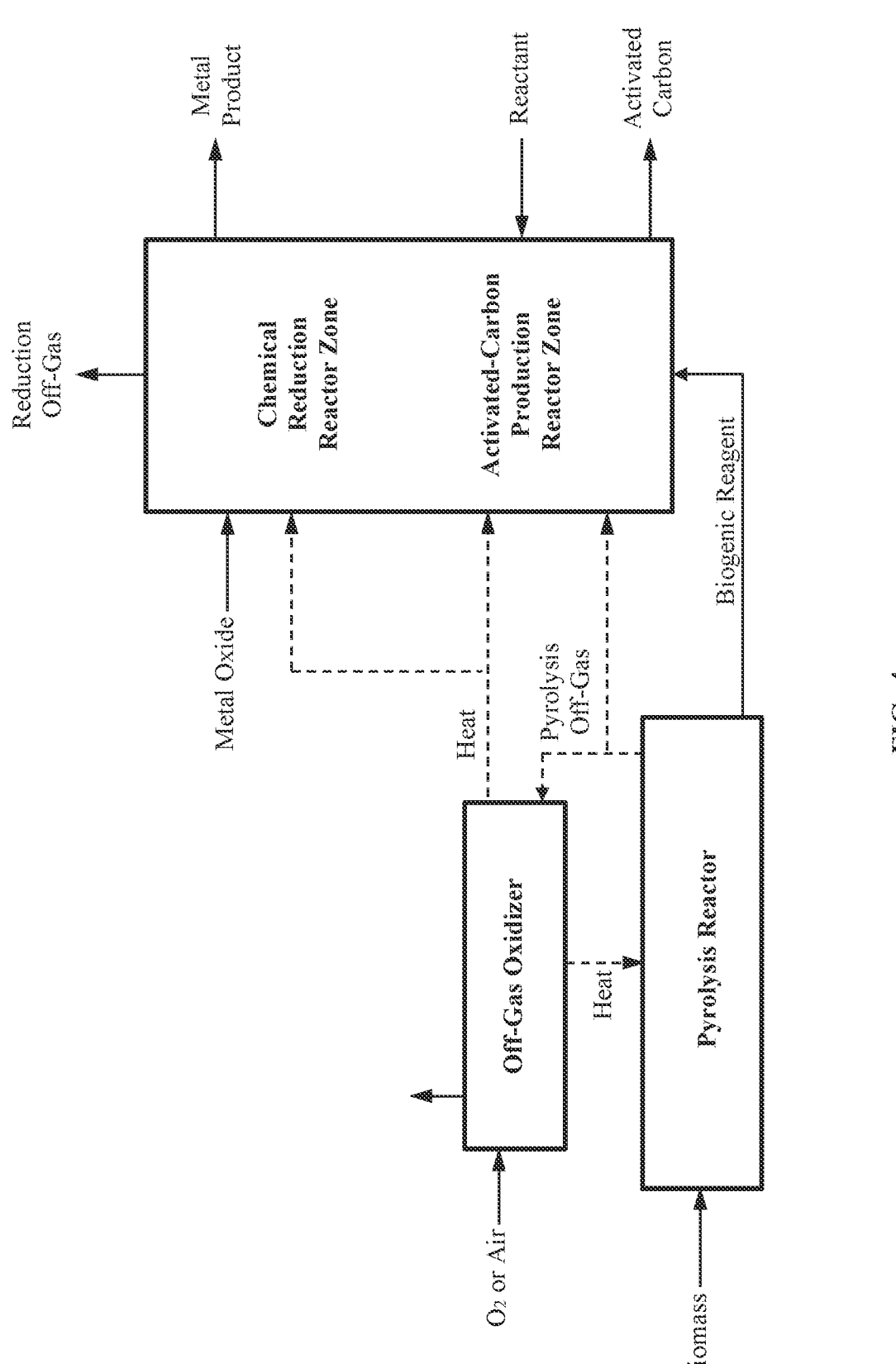
FIG. 4 is a simplified block-flow diagram of a process for converting a biomass feedstock into activated carbon as well as a reducing-gas composition utilized for reducing a metal oxide into a metal product, in some embodiments. Dotted lines denote optional streams and units.

FIG. 4 is a simplified block-flow diagram of a process for converting a biomass feedstock into activated carbon as well as an in situ reducing-gas composition for reducing a metal oxide into a metal product, in some embodiments. Dotted lines denote optional streams and units. The zones of the second reactor can be switched such that the carbon bed is physically above the bed of metal oxide.

Some variations provide a process comprising:

(a) providing a biomass feedstock;

(b) pyrolyzing the biomass feedstock, thereby generating a biogenic reagent, wherein the biogenic reagent comprises carbon, and a pyrolysis off-gas;

(c) optionally, oxidizing the pyrolysis off-gas, thereby generating heat;

(d) reacting the biogenic reagent with a selected reactant, thereby generating a reducing gas; and (e) optionally, chemically reducing a selected metal oxide in the presence of the reducing gas from step (d), thereby generating a reduced form of the selected metal oxide.

Some embodiments provide a process comprising:

(a) providing a biomass feedstock;

(b) pyrolyzing the biomass feedstock, thereby generating a biogenic reagent, wherein the biogenic reagent comprises carbon, and a pyrolysis off-gas;

(c) optionally, oxidizing the pyrolysis off-gas, thereby generating heat;

(d) reacting the biogenic reagent with a selected reactant, thereby generating a reducing gas;

(e) optionally, chemically reducing a selected metal oxide in the presence of the reducing gas from step (d), thereby generating a reduced form of the selected metal oxide; and (f) optionally, recovering the biogenic reagent continuously or periodically during step (d), or ultimately after step (d) (e.g., removing carbon from the reactor in a batch-wise fashion), wherein the recovered biogenic reagent is activated carbon.

In some embodiments, step (b) is conducted at a pyrolysis temperature selected from about 250° C. to about 1250° C., such as from about 300° C. to about 700° C., with specific reference made to those provided in the above summary. In these or other embodiments, step (b) is conducted for a pyrolysis time selected from about 10 seconds to about 24 hours or 48 hours, with specific reference made to those provided in the above summary. Generally, a lower pyrolysis temperature requires a longer pyrolysis time, while a higher pyrolysis temperature allows a shorter pyrolysis time.

In some embodiments, step (d) is conducted at a reaction temperature selected from about 300° C. to about 1200° C., such as from about 400° C. to about 1000° C., with specific reference made to those provided in the above summary. In these or other embodiments, step (d) is conducted for a reaction time selected from about 1 second to about 1 hour, with specific reference made to those provided in the above summary. Generally, the reaction temperature for forming the reducing gas is selected to accomplish the desired chemistry. The reaction time can be dictated by mass and heat transfer into and out of the reacting solids (a smaller particle can be converted in shorter reaction times).

In some embodiments, step (e) is conducted at a reduction temperature selected from about 500° C. to about 2000° C., such as from about 700° C. to about 1800° C., with specific reference made to those provided in the above summary. In these or other embodiments, step (e) is conducted for a reduction time selected from about 30 minutes to about 48 hours, with specific reference made to those provided in the above summary. Generally, a lower reduction temperature requires a longer reduction time, while a higher reduction temperature allows a shorter reduction time.

In some embodiments, the biomass feedstock is softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, railroad ties, lignin animal manure, municipal solid waste, municipal sewage, or a combination thereof. A biomass feedstock can comprise carbon, hydrogen, and oxygen.

The biogenic reagent produced in step (b) can comprise at least about 50 wt %, at least about 75 wt %, or at least about 90 wt % carbon (also known as total carbon), with specific reference made to those provided in the above summary. In various embodiments, the biogenic reagent comprises at least about 50, 55, 60, 65, 70, 75, 80, 85, 90, 95, or 99 wt % carbon, with specific reference made to those provided in the above summary. The total carbon is fixed carbon plus non-fixed carbon that is present in volatile matter. In some embodiments, component weight percentages are on an absolute basis, which is assumed unless stated otherwise. In other embodiments, component weight percentages are on a moisture-free and ash-free basis.

The biogenic reagent produced in step (b) can comprise at least about 50 wt %, at least about 75 wt %, or at least about 90 wt % fixed carbon, with specific reference made to those provided in the above summary. In various embodiments, the biogenic reagent comprises at least about 50, 55, 60, 65, 70, 75, 80, 85, 90, 95, or 99 wt % fixed carbon, with specific reference made to those provided in the above summary.

The carbon comprised within the biogenic reagent can be at least about 50 wt %, at least about 75 wt %, or at least about 90 wt % fixed carbon, with specific reference made to those provided in the above summary, with the remainder of the carbon being volatile carbon. In various embodiments, the carbon contains about, at least about, or at most about 50, 55, 60, 65, 70, 75, 80, 85, 90, 95, 99, or 100 wt % fixed carbon, with specific reference made to those provided in the above summary.

The conditions of step (b) can be varied widely, depending on the desired compositions for the biogenic reagent and pyrolysis off-gas, the starting feedstock, the type of metal oxide, the reactor configuration, and other factors (which are described in detail later). The pyrolysis temperature is an important parameter and should be controlled. Generally speaking, higher pyrolysis temperatures such as about 600° C. to about 850° C. create more hydrogen in the pyrolysis off-gas, leaving less hydrogen in the biogenic reagent. This is advantageous in embodiments that utilize hydrogen in the off-gas for reduction of metal oxides. On the other hand, lower pyrolysis temperatures such as about 400° C. to about 600° C. leave more hydrogen in the biogenic reagent and therefore less hydrogen in the off-gas. This can be advantageous in embodiments—such as injection of biogenic carbon into a metal-reduction furnace—that utilize hydrogen in the biogenic reagent for reduction of metal oxides. In either scenario, hydrogen can be utilized for metal oxide reduction, which is desirable because it avoids direct $CO_2$ generation, thereby improving the environmental footprint through reduced carbon intensity.

In some embodiments, the metal oxide is comprised within a metal ore, such as iron ore, copper ore, nickel ore, magnesium ore, manganese ore, aluminum ore, tin ore, zinc ore, cobalt ore, chromium ore, tungsten ore, molybdenum ore, or a combination thereof. In certain embodiments, the metal ore is iron ore, such as an iron ore selected from hematite, magnetite, limonite, taconite, or a combination thereof.

The metal oxide can be contained in a beneficiated metal ore, i.e. metal ore that was processed in one or more beneficiation units. The metal oxide can be contained in a particulate form, such as a powdered form, of metal ore.

When the reducing gas is utilized to chemically reduce the metal oxide, CO, $H_2$, or both CO and $H_2$ are chemically reacted with metal oxide in chemical reactions that reduce the metal oxide (e.g., $Fe_3O_4$) to the corresponding metal (e.g., Fe) or to a less-reduced metal oxide (e.g., FeO is less reduced than $Fe_2O_3$). Sensible heat that is comprised within the oxidized pyrolysis off-gas can be used to cause endothermic reactions to take place, whether thermodynamically, kinetically, or both. It will be recognized by a skilled chemical engineer that hot gas is useful for an endothermic reaction that requires heat. Optionally, the hot gas, from oxidation of pyrolysis off-gas, can be used to indirectly heat a reactor or be heat-exchanged with another stream prior to injection to a reactor. It can also be the case that a hot gas is at a lower temperature than a reaction into which the hot gas is injected. In that case, the hot gas can be regarded as actually being heated itself, rather than providing heat. However, in this case, the contents of the reactor will not cool as much as would happen with cool-gas injection, so that endothermic chemistry is still favored at a relatively low overall energy usage compared to conventional approaches.

In certain embodiments, heat is generated from partial oxidation but not complete oxidation (combustion) of pyrolysis off-gas, intentionally producing an additional reducing gas containing CO or $H_2$ rather than a combustion gas containing primarily $CO_2$ and $H_2O$. The heat can be used to increase the temperature of pyrolysis or for heating other reactors. While less heat is generated in partial oxidation versus complete oxidation, more reducing gas is generated, which is useful for metal oxide reduction or production of hydrogen.

In some embodiments, the biogenic reagent comprises heavy hydrocarbons obtained during step (b), wherein the heavy hydrocarbons can be converted to reducing gas in the second reactor. The heavy hydrocarbons can be derived from the pyrolysis off-gas or from volatile carbon remaining in the biogenic reagent.

The metal oxide can be iron oxide, copper oxide, nickel oxide, magnesium oxide, manganese oxide, aluminum oxide, tin oxide, zinc oxide, cobalt oxide, chromium oxide, tungsten oxide, molybdenum oxide, or a combination thereof, for example. In some embodiments, the metal oxide is iron ore, such as hematite, magnetite, limonite, taconite, or a combination thereof.

In some embodiments, the reduced form of the selected metal oxide is a fully reduced metal (e.g., fully reduced iron, $Fe^0$). In other embodiments, the reduced form of the selected metal oxide is a second metal oxide having a lower oxidation state than the selected metal oxide. For example, iron in FeO has a +2 oxidation state while iron in $Fe_2O_3$ has a +3 oxidation state.

In various embodiments, the heat is utilized for heating in step (b), or for heating in step (d), or for heating in step (e), or for at least two of these steps, or for all three of these steps.

In some embodiments, the process further comprises increasing hydrogen content of the reducing gas via the water-gas shift reaction. Whether or not hydrogen content is increased, the process can further comprise separating hydrogen from the reducing gas, followed by recovering the hydrogen. Hydrogen can be separated from the reducing gas via one or more separation techniques selected from pressure-swing adsorption, molecular-sieve membrane separation, or cryogenic distillation, for example.

In some embodiments, the selected reactant in step (d) is water. In some embodiments, the reactant in step (d) is oxygen, which can be present in a form selected from air, pure oxygen, enriched oxygen, ozone, or a combination thereof. Enriched oxygen refers to a gas composition comprising 02 at a concentration at least about 21 vol % along with $N_2$ or other gases. In certain embodiments, the selected reactant in step (d) comprises a combination of water and oxygen. Another possible reactant is $CO_2$, in a dry reforming process.

Step (d) can utilize a fixed-bed reactor or a fluidized-bed reactor, for example. When a fixed-bed reactor is employed, the fixed bed can comprise or consist essentially of the biogenic reagent. In some embodiments, step (d) utilizes a rotary kiln.

In some embodiments, in step (c), the pyrolysis off-gas is partially or fully oxidized, thereby generating additional reducing gas and heat. In these embodiments, step (e) can further comprise chemically reducing the selected metal oxide in the presence of some or all of the additional reducing gas, in addition to chemically reducing the selected metal oxide in the presence of the reducing gas from step (d).

In some embodiments, the reducing gas is also oxidized, thereby generating heat. This heat can be utilized for heating in step (b), or for heating in step (d), or for heating in step (e), or for at least two of these steps, or for all three of these steps.

In some embodiments, pyrolysis off-gas is converted to additional reducing gas during step (d). For example, some or all of the pyrolysis off-gas from a pyrolysis reactor can be directed to the reactor for converting biogenic reagent to reducing gas. The same reactant (e.g., steam or oxygen) that reacts with the biogenic reagent can react with pyrolysis off-gas, thereby generating additional reducing gas (e.g., CO or $H_2$). Alternatively, or additionally, the off-gas can be converted to additional reducing gas (e.g., CO or $H_2$) through water-gas shift or other equilibrium reactions. In these embodiments, the reactant that reacts with off-gas can be the same as the reactant that reacts with the biogenic reagent, or they can be different.

The pyrolysis off-gas, or additional reducing gas generated from the off-gas, can comprise at least 10 mol % hydrogen or at least 20 mol % hydrogen, with specific reference made to those provided in the above summary. Independently, the pyrolysis off-gas, or additional reducing gas generated from the off-gas, can comprise at least 10 mol % carbon monoxide or at least 20 mol % carbon monoxide. In some embodiments, the pyrolysis off-gas, or additional reducing gas generated from the off-gas, comprises in the range of from or in between about 1 mol %, 5 mol %, 10 mol %, 15 mol %, 20 mol %, 25 mol %, 30 mol %, 35 mol %, 40 mol %, 45 mol %, or 50 mol % hydrogen and at least 1 mol %, 5 mol %, 10 mol %, 15 mol %, 20 mol %, 25 mol %, 30 mol %, 35 mol %, 40 mol %, 45 mol %, or 50 mol % carbon monoxide.

In some processes, step (e) is not conducted. In other processes, step (e) is conducted. When step (e) is performed, the process can comprise recovering the reduced form of the selected metal oxide, such as via an outlet port of a reactor. Also, when step (e) is performed, step (b) and step (e) can be conducted at the same site.

In some embodiments, the process is co-located at a metal-oxide mine, such as an iron mine.

In some embodiments, the process is co-located at a metal-oxide processing plant, such as one selected from a steel mill, a taconite plant, or a direct reduced-iron plant.

In certain embodiments, the entire process is located at a single site, which can be a greenfield site or an existing site. In the case of an existing site, the site can include a biomass-handling plant, a pyrolysis plant, a coal plant, a metal-ore mine, a metal-ore processing plant, a gasification plant, a steam-reforming plant, or another type of plant.

In some embodiments, step (e) is conducted in a metal ore furnace or upstream of a metal ore furnace. The metal ore furnace can be selected from a blast furnace, a direct-reduced-metal furnace, a top-gas recycling blast furnace, a shaft furnace, a reverberatory furnace, a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, or a combination thereof.

Some variations provide a system comprising:

a first reactor configured for pyrolyzing a biomass feedstock, thereby generating a biogenic reagent, wherein the biogenic reagent comprises carbon, and a pyrolysis off-gas;

a second reactor configured for reacting the biogenic reagent with a selected reactant, thereby generating reducing gas; and optionally, a third reactor configured for chemically reducing a selected metal oxide in the presence of the reducing gas, thereby generating a reduced form of the selected metal oxide, wherein optionally the system further comprises one or more heating units in thermal communication with the first reactor, the second reactor, or (if present) the third reactor, and wherein the one or more heating units are configured for oxidizing the pyrolysis off-gas, thereby generating heat.

Some variations provide a system comprising:

a first reactor configured for pyrolyzing a biomass feedstock, thereby generating a biogenic reagent, wherein the biogenic reagent comprises carbon, and a pyrolysis off-gas;

a second reactor configured for reacting the biogenic reagent with a selected reactant, thereby generating reducing gas, wherein the second reactor is optionally configured for continuously, periodically, or ultimately removing activated carbon out of the second reactor; and optionally, a third reactor configured for chemically reducing a selected metal oxide in the presence of the reducing gas, thereby generating a reduced form of the selected metal oxide, wherein optionally the system further comprises one or more heating units in thermal communication with the first reactor, the second reactor, or (if present) the third reactor, and wherein the one or more heating units are configured for oxidizing the pyrolysis off-gas, thereby generating heat.

In some systems, the first reactor is configured for operating at a pyrolysis temperature in the range of from or in between about 250° C. to about 1250° C., such as in the range of from or in between about 300° C. to about 700° C. The first reactor can be configured for operating at a pyrolysis time in the range of from or in between about 10 seconds to about 24 hours or 48 hours, for example. Other pyrolysis times are possible, where the pyrolysis time will depend on the feedstock, desired product, and other reaction conditions. The pyrolysis time is material to the process and product, although the time can vary widely.

In some systems, the second reactor is configured for operating at a reaction temperature in the range of from or in between about 300° C. to about 1200° C., such as in the range of from or in between about 400° C. to about 1000° C. The second reactor can be configured for operating at a reaction time selected from about 1 second to about 1 hour, for example. Other reaction times are possible. As with pyrolysis time, reaction time can vary, but is material to the process and product.

In some systems, the third reactor is configured for operating at a reduction temperature in the range of from or in between about 500° C. to about 2000° C., such as in the range of from or in between about 700° C. to about 1800° C. The third reactor can be configured for operating at a reduction time in the range of from or in between about 30 minutes to about 48 hours, for example. Other reduction times are possible. As with pyrolysis time, reduction time can vary, but is material to the process and product.

In some systems, the biomass feedstock is selected from softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, railroad ties, lignin animal manure, municipal solid waste, municipal sewage, or a combination thereof.

In some systems, the biogenic reagent comprises in the range of from or in between about 50 wt % to about 99 wt % total carbon, such as at least 75 wt % carbon, or at least 90 wt % carbon. The biogenic reagent can comprise in the range of from or in between about 50 wt % to about 99 wt % fixed carbon, such as at least 75 wt % fixed carbon, or at least 90 wt % fixed carbon.

The metal oxide can be selected from iron oxide, copper oxide, nickel oxide, magnesium oxide, manganese oxide, aluminum oxide, tin oxide, zinc oxide, cobalt oxide, chromium oxide, tungsten oxide, molybdenum oxide, or a combination thereof. In some systems, the metal oxide is iron ore, such as hematite, magnetite, limonite, taconite, or a combination thereof.

The reduced form of the selected metal oxide can a fully reduced metal or can be a second metal oxide having a lower oxidation state than the selected metal oxide (i.e., in partial but not complete reduction of the starting metal oxide).

In some embodiments, the system comprises a heating unit in thermal communication with the first reactor, the second reactor, the third reactor, at least two of such reactors, or all three of such reactors.

In some systems, the second reactor is configured to increase hydrogen content of the reducing gas via the water-gas shift reaction. In these or other systems, the system can further comprise an additional reactor in flow communication with the second reactor, wherein the additional reactor is configured to increase hydrogen content of the reducing gas via the water-gas shift reaction. The system can further include a separation unit configured for separating hydrogen from the reducing gas. An exemplary separation unit is a pressure-swing adsorption unit, a molecular-sieve membrane, or a cryogenic distillation unit.

In some systems, the selected reactant is water, which can be in the form of steam. In some embodiments, the selected reactant is oxygen. The reactant can be a combination of water and oxygen.

The second reactor can be a fixed-bed reactor, a rotary kiln, or a fluidized-bed reactor, for example.

In some embodiments, the system further comprises an off-gas reactor configured to partially oxidize the pyrolysis off-gas, thereby generating additional reducing gas. In these embodiments, the off-gas reactor can be in flow communication with the third reactor.

In some embodiments, the second reactor is configured to receive some or all of the pyrolysis off-gas to enable its conversion to additional reducing gas. The same reactant (e.g., steam) that reacts with the biogenic reagent can react with pyrolysis off-gas, thereby generating additional reducing gas (e.g., CO or $H_2$). FIGS. 1-4 show the optional use of pyrolysis off-gas for making more reducing gas, which can be instead of or in addition to, combustion of pyrolysis off-gas for making heat.

In some embodiments, one or more heating units are configured for oxidizing the reducing gas, thereby generating heat. This heat can be used to heat the first reactor, the second reactor, or (if present) the third reactor.

The third reactor can be present. In some embodiments, the third reactor is present in the system and the system comprises an outlet from the third reactor configured for recovering the reduced form of the selected metal oxide. For example, a screw conveyer can be installed at or near the bottom of the third reactor, to continuously or periodically withdraw metal product (reduced form of metal oxide). When the third reactor is present, the first reactor and the third reactor can be co-located at the same site.

As used in this specification, a "reactor" can refer to a single reaction vessel or to a reaction zone contained within a reaction vessel. When a single reactor contains multiple reaction zones, the number of zones can be 2, 3, 4, or more.

The first reactor and second reactor can be physically contained in a single reactor, such that the first reactor is a first zone and the second reactor is a second zone within the same physical apparatus as the first zone. In these or other embodiments, the second reactor and third reactor can be physically contained in a single reactor, such that the second reactor is a first zone and the third reactor is a second zone within the same physical apparatus as the first zone (e.g., see FIG. 4). In certain embodiments, the first reactor, second reactor, and third reactor are all physically contained in a single reactor, such that the first reactor is a first zone, the second reactor is a second zone, and the third reactor is a third zone within a common physical apparatus.

It should also be noted that multiple physical apparatus can be employed for a reactor, in series or in parallel. For example, the first reactor can be two physical reaction vessels operated in series (sequentially), in parallel, or a hybrid thereof.

Likewise, the second reactor can be two physical reaction vessels operated in series (sequentially), in parallel, or a hybrid thereof. Multiple reaction vessels for the second reactor can be advantageous, for example, when it is desired to produce several different types of activated carbon or when it is desired to produce activated carbon from one vessel but not from another vessel. Stated another way, a primary second reactor can be configured for reacting biogenic reagent with a selected reactant, thereby generating reducing gas, wherein the primary second reactor is configured for continuously, periodically, or ultimately removing activated carbon out of the primary second reactor; while an ancillary second reactor is also configured for reacting biogenic reagent with a selected reactant, thereby generating reducing gas but is not configured for removing activated carbon out of the ancillary second reactor, for example.

In some embodiments, the system is co-located at a metal-oxide mine.

In some embodiments, the system is co-located at a metal-oxide processing plant, such as a steel mill, a taconite plant, or a direct reduced-iron plant.

In certain embodiments, the entire system is located at a single site, which can be a greenfield site or an existing site. In the case of an existing site, the site can include a biomass-handling plant, a pyrolysis plant, a coal plant, a metal-ore mine, a metal-ore processing plant, a gasification plant, a steam-reforming plant, or another type of plant.

In some embodiments, the third reactor is a metal ore furnace or is upstream of a metal ore furnace (or there is a third reactor that is upstream of a metal ore furnace and a fourth reactor that is the metal ore furnace). The metal ore furnace can be selected from a blast furnace, a direct-reduced-metal furnace, a top-gas recycling blast furnace, a shaft furnace, a reverberatory furnace, a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, or a combination thereof.

Other variations of the disclosure provide a metal product produced by a process comprising:

(a) providing a biomass feedstock;

(b) pyrolyzing the biomass feedstock, thereby generating a biogenic reagent, wherein the biogenic reagent comprises carbon, and a pyrolysis off-gas;

(c) optionally, oxidizing the pyrolysis off-gas, thereby generating heat;

(d) reacting the biogenic reagent with a selected reactant, thereby generating a reducing gas;

(e) chemically reducing a selected metal oxide in the presence of the reducing gas from step (d), thereby generating a reduced form of the selected metal oxide; and (f) recovering a metal product comprising the reduced form of the selected metal oxide.

Still other variations of the disclosure provide a renewable hydrogen product produced by a process comprising:

(a) providing a biomass feedstock;

(b) pyrolyzing the biomass feedstock, thereby generating a biogenic reagent, wherein the biogenic reagent comprises carbon, and a pyrolysis off-gas;

(c) optionally, oxidizing the pyrolysis off-gas, thereby generating heat;

(d) reacting the biogenic reagent with a selected reactant, thereby generating a reducing gas;

(e) separating hydrogen from the reducing gas, wherein optionally the hydrogen is separated via one or more separation techniques selected from pressure-swing adsorption, molecular-sieve membrane separation, or cryogenic distillation; and (f) recovering a renewable hydrogen product comprising the hydrogen.

Measuring the $^{14}C/^{12}C$ isotopic ratio of carbon (in solid carbon, or in carbon in vapor form, such as CO, $CO_2$, or $CH_4$) is a proven technique. A similar concept can be applied to hydrogen, in which the $^2H/^1H$ isotopic ratio is measured ($^2H$ is also known as deuterium, D). Fossil sources tend to be depleted in deuterium compared to biomass. See Schiegl et al., "Deuterium content of organic matter", *Earth and Planetary Science Letters*, Volume 7, Issue 4, 1970, Pages 307-313; and Hayes, "Fractionation of the Isotopes of Carbon and Hydrogen in Biosynthetic Processes", Mineralogical Society of America, National Meeting of the Geological Society of America, Boston, MA, 2001, which are hereby incorporated by reference herein.

In particular, the natural deuterium content of organically bound hydrogen shows systematic variations that depend on the origin of the samples. The hydrogen of both marine and land plants contains several percent less deuterium than the water on which the plants grew. Coal and oil is further depleted in deuterium with respect to plants, and natural gas is still more depleted in deuterium with respect to the coal or oil from which it is derived. In this disclosure, "renewable hydrogen" is determined by correlating the $^2H/^1H$ isotopic ratio with the renewability of the starting feedstock, without regard to the renewability of hydrogen contained in a water ($H_2O$) reactant that may be used to react with carbon or CO to form $H_2$. On average, water contains about 1 deuterium atom per 6,400 hydrogen ($^1H$) atoms. The ratio of deuterium atoms to hydrogen atoms in renewable biomass is slightly lower than 1/6,400, and the ratio of deuterium atoms to hydrogen atoms in non-renewable fossil sources (e.g., mined coal or mined natural gas) is even lower than the ratio for renewable biomass. Therefore, the $^2H/^1H$ isotopic ratio correlates with renewability of the hydrogen:higher $^2H/^1H$ isotopic ratios indicate a greater renewable hydrogen content. The $^2H/^1H$ isotopic ratio of hydrogen contained in a reducing-gas composition may be from about 0.0002 to about 0.001, such as from about 0.0002 to about 0.005, for example. The $^2H/^1H$ isotopic ratio of hydrogen contained in certain reducing-gas compositions disclosed herein is higher than an otherwise-equivalent reducing-gas composition that is obtained from a fossil resource rather than biomass. In some embodiments, the $^2H/^1H$ isotopic ratio of hydrogen contained in reducing-gas compositions is higher by in the range of from or any number in between about 1% to about 100%, such as in the range of from or any number in between about 1%, 5%, 10%, 25%, 50%, or 100%.

Renewable hydrogen can be recognized in the market in various ways, such as through renewable-energy standards, renewable-energy credits, renewable identification numbers, and the like. As just one example, an oil refinery utilizing renewable hydrogen in producing gasoline can be able to receive renewable-energy credit for such $H_2$ content. In a metal product such as steel, renewable hydrogen can be utilized during production of the metal (e.g., metal ore reduction with $H_2$) or renewable hydrogen can be a measurable alloy element in a final product.

In some embodiments of the present disclosure, the hydrogen product is characterized as at least 50% renewable hydrogen according to a hydrogen-isotope analysis. In various embodiments, the hydrogen product is characterized as at least 80%, at least 90%, at least 95%, or at least 99% renewable hydrogen. In certain embodiments, the hydrogen product is characterized as fully renewable hydrogen.

In some hydrogen products, the hydrogen is characterized as fully renewable hydrogen, and any residual carbon contained in the hydrogen product is essentially fully renewable carbon as determined from a measurement of the $^{14}C/^{12}C$ isotopic ratio.

The selected reactant in step (d) can be water, oxygen, or a mixture thereof, for example. Oxygen can be present in a form selected from air, pure oxygen, enriched oxygen, ozone, or a combination thereof.

In some embodiments, the reducing gas can contain at least 10 mol % or at least 25 mol % hydrogen. In some embodiments, the reducing gas can contain at least 10 mol % or at least 25 mol % carbon monoxide.

In some embodiments, the hydrogen product is produced by a process further comprising increasing hydrogen content of the reducing gas via the water-gas shift reaction.

In some embodiments, the pyrolysis off-gas is partially oxidized, thereby generating additional reducing gas and heat.

In various embodiments, the hydrogen is separated via pressure-swing adsorption, molecular-sieve membrane separation, cryogenic distillation, or a combination thereof.

The hydrogen product can comprises at least 50 mol % hydrogen. In some embodiments, the hydrogen product comprises at least 90 mol % hydrogen. In various embodiments, the hydrogen product comprises in the range of from or in between about 50, 55, 60, 65, 70, 75, 80, 85, 90, 95, 99, or 100 mol %.

In some hydrogen products, the hydrogen product comprises at most about 1 mol % nitrogen or is substantially free of nitrogen. In various embodiments, the hydrogen product comprises in the range of from or in between about 10, 9, 8, 7, 6, 5, 4, 3, 2, 1.5, 1, 0.9, 0.8, 0.7, 0.6, 0.5, 0.4, 0.3, 0.2, 0.1, 0.05, 0.04, 0.03, 0.02, or 0.01 mol % nitrogen. In this disclosure, a hydrogen product that is "substantially free of nitrogen" means that there is no detectable nitrogen in the product by ordinary analytical techniques.

Some variations provide a reducing-gas composition for reducing a metal oxide, the reducing-gas composition comprising hydrogen that is at least 50% renewable hydrogen according to a hydrogen-isotope analysis. In various embodiments, the reducing-gas composition comprises hydrogen that is characterized as at least 80%, at least 90%, at least 95%, or at least 99% renewable hydrogen. In certain embodiments, the reducing-gas composition comprises hydrogen that is characterized as fully renewable hydrogen.

The composition profile of the reducing-gas composition, regardless of whether the hydrogen is certified or characterized as renewable hydrogen, can contain about, or at least about, 50 mol %, 60 mol %, 70 mol %, 80 mol %, 85 mol %, 90 mol %, 95 mol %, 96 mol %, 97 mol %, 98 mol %, 99 mol %, 99.5 mol %, or 99.9 mol % $H_2$. The remainder of the reducing-gas composition can comprise CO, $CO_2$, $H_2O$, $CH_4$, $N_2$, or other components.

Some variations of the disclosure provide a reducing-gas composition for reducing a metal oxide, wherein the reducing-gas composition comprises at least 25 mol % hydrogen that is at least 50% renewable hydrogen according to a hydrogen-isotope $^2H/^1H$ analysis.

In some embodiments, the reducing-gas composition comprises at least 50 mol % hydrogen, at least 75 mol % hydrogen, or at least 90 mol % hydrogen. In various embodiments, the reducing-gas composition comprises in the range of from or in between about 50, 55, 60, 65, 70, 75, 80, 85, 90, or 95 mol % hydrogen.

In some reducing-gas compositions, the hydrogen is characterized as at least 80%, 81%, 82%, 83%, 84%, 85%, 86%, 87%, 88%, 89%, 90%, 91%, 92%, 93%, 94%, 95%, 96%, 97%, 98%, or 99% renewable hydrogen according to a hydrogen-isotope $^2H/^1H$ analysis. In some embodiments, the hydrogen is characterized as fully (100%) renewable hydrogen according to a hydrogen-isotope $^2H/^1H$ analysis.

The reducing-gas composition can further comprise carbon-containing gases comprising CO, $CO_2$, or $CH_4$, or the reducing-gas composition can further comprise carbon-containing gases consisting essentially of CO, $CO_2$, or $CH_4$ The carbon-containing gases can be at least 50% renewable, at least 90% renewable, or essentially fully renewable as determined from a measurement of the $^{14}C/^{12}C$ isotopic ratio. In some embodiments, the reducing-gas composition comprises carbon-containing gases and the hydrogen is characterized as at least 90% renewable hydrogen, or essentially fully renewable hydrogen, according to a hydrogen-isotope $^2H/^1H$ analysis.

In some reducing-gas compositions, the reducing-gas composition further comprises carbon monoxide, and wherein the carbon monoxide is at least 50% renewable, at least 90% renewable, or essentially fully renewable as determined from a measurement of the $^{14}C/^{12}C$ isotopic ratio. In some embodiments, the reducing-gas composition further comprises carbon monoxide and the hydrogen is characterized as at least 90% renewable hydrogen, or essentially fully renewable hydrogen, according to a hydrogen-isotope $^2H/^1H$ analysis. In some reducing-gas compositions, the molar ratio of the hydrogen to the carbon monoxide is at least 2.

In some embodiments, the reducing-gas composition comprises at most about 1 mol % $N_2$, at most about 0.5 mol % $N_2$, at most about 0.1 mol % $N_2$, or is essentially free of $N_2$. In various embodiments, the reducing-gas composition comprises in the range of from or in between about 10, 9, 8, 7, 6, 5, 4, 3, 2, 1.5, 1, 0.9, 0.8, 0.7, 0.6, 0.5, 0.4, 0.3, 0.2, 0.1, 0.05, 0.04, 0.03, 0.02, or 0.01 mol % $N_2$. In this disclosure, a hydrogen product that is "substantially free of nitrogen" means that there is no detectable nitrogen in the reducing-gas composition by ordinary analytical techniques.

The processes disclosed herein are environmentally friendly technologies with reduced carbon footprint. When the starting feedstock is biomass, which comprises biogenic and renewable carbon, the resulting carbon from pyrolysis is also biogenic. This can be shown from a measurement of the $^{14}C/^{12}C$ isotopic ratio of the carbon, using for example ASTM D6866. In some embodiments, all carbon processed is renewable. In other embodiments, less than all carbon is renewable.

Any biogenic carbon that is oxidized to carbon dioxide creates biogenic $CO_2$. This also can be shown from a measurement of the $^{14}C/^{12}C$ isotopic ratio of the carbon in a sample of the generated $CO_2$. This biogenic $CO_2$, which is derived from biomass, returns to the environment to be taken up again by growing biomass via photosynthesis. In this way, net $CO_2$ emissions are significantly reduced. In addition, the hydrogen content of the starting biomass substantially reduces the net $CO_2$ emissions of the process. The reason is that hydrogen in the biomass becomes $H_2$ in the reducing gas. $H_2$ is capable of causing chemical reduction of metal oxides in much the same way as caused by CO, but rather than creating $CO_2$, $H_2$ oxidation creates $H_2O$, which is not considered a problematic greenhouse gas.

Another reason that the disclosed processes are environmentally superior to conventional technologies relates to the energy balance. Metal oxide reduction inherently requires energy because the overall chemical reaction is endothermic. Even the known approach of electrochemical conversion to split a metal oxide into the metal and oxygen, thereby avoiding any direct $CO_2$ production, requires large amounts of electricity that in turn is made usually from non-renewable sources. Conventional metal ore processing utilizes large amounts of coal to create the necessary heat (from coal combustion) as well as to provide carbon for the reduction chemistry. Some embodiments of the present disclosure, by contrast, provide an integrated bio-reduction process that utilizes carbon and hydrogen in an energy-efficient manner. Pollution from coal burning is thereby avoided.

Integrated bio-reduction of metal ores greatly reduces environmental impacts, compared to the traditional use of fossil fuels such as coal. Conventional approaches are associated with a "carbon intensity" which is the net quantity of carbon dioxide generated per ton of metal ore processed. A "$CO_2$-equivalent carbon intensity" can also be defined, as the net quantity of carbon dioxide equivalent generated per ton of metal ore processed. The "carbon dioxide equivalent" or "$CO_2e$" signifies the amount of $CO_2$ which would have the equivalent global-warming impact. As an example, for iron ore processing, the average is 11.9 kg $CO_2$/ton (Tost et al., "Metal Mining's Environmental Pressures: A Review and Updated Estimates on $CO_2$ Emissions, Water Use, and Land Requirements", *Sustainability* 2018, 10, 2881, which is incorporated by reference). In various embodiments, the processes disclosed herein can be characterized by a reduction in the carbon intensity or $CO_2$-equivalent carbon intensity, compared to the prior art, of about 50%, 60%, 70%, 80%, 90%, 95%, or 99%. In various embodiments, the processes disclosed herein can be characterized by a carbon intensity, or $CO_2$-equivalent carbon intensity, of about 10, 9, 8, 7, 6, 5, 4, 3, 2, 1, 0.5, 0.4, 0.3, 0.2, or 0.1 kg $CO_2$/ton, or less. In the present disclosure, most or all of the $CO_2$ generated can be biogenic carbon dioxide, such that the effective carbon intensity is very low, zero, or even negative if there is a net sequestering of carbon in final products such as carbon steel.

Some variations are predicated on the realization that oxygen can be intentionally limited in combustion of pyrolysis off-gas to create more CO (rather than $CO_2$ as in complete combustion), which CO can then be used as a reducing agent. The generation of CO from partial oxidation still provides some heat, but less heat compared to conventional complete oxidation to $CO_2$. These variations utilize the discovery that the heat generated can be sufficient for carrying out the endothermic reduction of metal oxides, wherein the reduction chemically utilizes the CO produced from partial oxidation.

Based on the above realization, some variations provide a method of optimizing the reduction of a metal oxide, the method comprising pyrolyzing biomass to obtain carbon and a pyrolysis off-gas; oxidizing the pyrolysis off-gas with oxygen at intentionally less than the combustion-stoichiometric amount of the oxygen, thereby generating heat and a reducing gas; and utilizing the heat and the reducing gas to reduce the metal oxide.

The "combustion-stoichiometric amount of the oxygen" is the amount of oxygen, whether present in air, pure oxygen, or oxygen-enriched air, that completely oxidizes the carbon-containing or hydrogen-containing components to $CO_2$ or $H_2O$, respectively, without being in stoichiometric excess. When the pyrolysis off-gas is intentionally oxidized at less than stoichiometric for combustion, the oxygen utilized as a percentage of the combustion-stoichiometric amount of the oxygen can be from about 10% to about 99%, from about 25% to about 90%, such as from about 40% to about 80%. In various embodiments, this percentage is about, at least about, or at most about 15%, 20%, 25%, 30%, 35%, 40%, 45%, 50%, 55%, 60%, 65%, 70%, 75%, 80%, 85%, 90%, or 95%. These percentages are on a molar basis with oxygen in $O_2$ form.

In some embodiments, carbon can be directly utilized to reduce a metal oxide, such as by reaction of the metal oxide with carbon, thereby generating the metal (or a less-reduced form of the metal) and carbon monoxide or carbon dioxide. Alternatively, or additionally, the carbon can be indirectly utilized to reduce metal oxide via conversion of the carbon to carbon monoxide, followed by reaction of the carbon monoxide with the metal oxide.

Production of Reducing Gas

The production of reducing gas (also referred to herein as "bio-reductant gas") will now be further described. The conversion of the biogenic reagent to reducing gas takes place in a reactor, which can be referred to herein as a second reactor, a gasifier, or a bio-reductant formation unit.

A reactant is employed to react with the biogenic reagent and produce the reducing gas. The reactant can be selected from oxygen, steam, or a combination thereof. In some embodiments, oxygen is mixed with steam, and the resulting mixture is added to the second reactor. Oxygen or oxygen-enriched air can be added to cause an exothermic reaction such as the partial or total oxidation of carbon with oxygen; to achieve a more favorable $H_2/CO$ ratio in the reducing gas; (iii) to increase the yield of reducing gas; or (iv) to increase the purity of reducing gas, e.g. by reducing the amount of $CO_2$, pyrolysis products, tar, aromatic compounds, or other undesirable products.

Steam is the reactant, in some embodiments. Steam (i.e. $H_2O$ in a vapor phase) can be introduced into the second reactor in one or more input streams. Steam can comprise steam generated by moisture contained in the biogenic reagent input, as well as steam generated by any chemical reactions that produce water.

All references herein to a "ratio" of chemical species are references to molar ratios unless otherwise indicated. For example, a $H_2/CO$ ratio of 1 means one mole of hydrogen per mole of carbon dioxide.

Steam reforming, partial oxidation, water-gas shift (WGS), or combustion reactions can occur when oxygen or steam are added. Exemplary reactions are shown below with respect to a cellulose repeat unit ($C_6H_{10}O_5$) found, for example, in cellulosic feedstocks. Similar reactions can occur with any carbon-containing feedstock.

| | |
|---|---|
| Steam Reforming | $C_6H_{10}O_5 + H_2O \rightarrow 6\ CO + 6\ H_2$ |
| Partial Oxidation | $C_6H_{10}O_5 + \frac{1}{2}\ O_2 \rightarrow 6\ CO + 5\ H_2$ |
| Water-Gas Shift | $CO + H_2O \leftrightarrow H_2 + CO_2$ |
| Complete Combustion | $C_6H_{10}O_5 + 6\ O_2 \rightarrow 6\ CO_2 + 5\ H_2O$ |

The second reactor is any reactor capable of causing a chemical reaction that produces reducing gas. Conventional steam reformers, well-known in the art, can be used either with or without a catalyst. Other possibilities include auto-thermal reformers, partial-oxidation reactors, and multi-staged reactors that combine several reaction mechanisms (e.g., partial oxidation followed by water-gas shift). The reactor configuration can be a fixed bed, a fluidized bed, a plurality of microchannels, or some other configuration.

In some embodiments, the total amount of steam as reactant is at least about 0.1 mole of steam per mole of carbon in the feed material. In various embodiments, at least about any of 0.5, 1.0, 1.5, 2.0, 3.0, 4.0, 5.0, or more moles of steam are added or are present per mole of carbon. In some embodiments, between about 1.5-3.0 moles of steam are added or are present per mole carbon.

The amount to steam that is added to the second reactor can vary depending on factors such as the conditions of the pyrolysis reactor. When pyrolysis produces a carbon-rich solid material, generally more steam (or more oxygen) is used to add the necessary H and O atoms to the C available, thereby generating CO and $H_2$. From the perspective of the overall system, the moisture contained in the feed material can be accounted for in determining how much additional water (steam) to add in the process.

Exemplary ratios of oxygen to steam ($O_2/H_2O$) are equal to or at most about any of 2, 1.5, 1, 0.5, 0.2, 0.1, 0.05, 0.02, 0.01, or less, in the second reactor. When the ratio of $O_2/H_2O$ is at least about 1, the combustion reaction starts to dominate over partial oxidation, which can produce undesirably low $CO/CO_2$ ratios.

In some embodiments, oxygen without steam is used as the reactant. Oxygen can be added in substantially pure form, or it can be fed to the process via the addition of air, optionally enriched with oxygen. In some embodiments, air that is not enriched with oxygen is added. In other embodiments, enriched air from an off-spec or recycle stream, which can be a stream from a nearby air-separation plant, for example, can be used. In some embodiments, the use of enriched air with a reduced amount of $N_2$ (i.e., at most about 79 vol %) results in less $N_2$ in the resulting reducing gas. Removal of $N_2$ can be expensive, such that methods of producing reducing gas with less or no $N_2$ can be desirable.

In some embodiments, the presence of oxygen alters the ratio of $H_2/CO$ in the reducing gas, compared to the ratio produced by the same method in the absence of oxygen. The $H_2/CO$ ratio of the reducing gas can be between about 0.5 to about 2.0, such as between about 0.75-1.25, about 1-1.5, or about 1.5-2.0. As will be recognized, increased water-gas shift (by higher rates of steam addition) produces higher $H_2/CO$ ratios, such as at least 2.0, 3.0. 4.0. 5.0, or even higher, which can be desired for certain applications, including hydrogen production.

Catalysts can be utilized in the second reactor. Catalysts can comprise, but are not limited to, alkali metal salts, alkaline earth metal oxides and salts, mineral substances or ash in coal, transition metals and their oxides and salts, and eutectic salt mixtures. Specific examples of catalysts include, but are not limited to, potassium hydroxide, potassium carbonate, lithium hydroxide, lithium carbonate, cesium hydroxide, nickel oxide, nickel-substituted synthetic mica montmorillonite (NiSMM), NiSMM-supported molybdenum, iron hydroxyoxide, iron nitrate, iron-calcium-impregnated salts, nickel uranyl oxide, sodium fluoride, and cryolite.

Other exemplary catalysts include, but are not limited to, nickel, nickel oxide, rhodium, ruthenium, iridium, palladium, and platinum. Such catalysts can be coated or deposited onto one or more support materials, such as, for example, gamma-alumina (optionally doped with a stabilizing element such as magnesium, lanthanum, or barium).

Before being added to the system, any catalyst can be pretreated or activated using known techniques that impact total surface area, active surface area, site density, catalyst stability, catalyst lifetime, catalyst composition, surface roughness, surface dispersion, porosity, density, or thermal diffusivity. Pretreatments of catalysts include, but are not limited to, calcining, washcoat addition, particle-size reduction, and surface activation by thermal or chemical means.

Catalyst addition can be performed by first dissolving or slurrying the catalyst(s) into a solvent such as water or any hydrocarbon that can be gasified or reformed. In some embodiments, the catalyst is added by direct injection of such a slurry into a vessel. In some embodiments, the catalyst is added to steam and the steam/catalyst mixture is added to the system. In these embodiments, the added catalyst can be at or near its equilibrium solubility in the steam or can be introduced as a particle entrained in the steam and thereby introduced into the system.

Material can generally be conveyed into and out of the second reactor by single screws, twin screws, rams, and the like. Material can be conveyed mechanically by physical force (metal contact), pressure-driven flow, pneumatically driven flow, centrifugal flow, gravitational flow, fluidized flow, or some other known means of moving solid and gas phases. A fixed bed of pellets of the biogenic reagent can be utilized in the second reactor, especially in embodiments that employ a bed of metal oxide disposed above the carbon bed (e.g., FIG. 4), thereby producing activated carbon pellets that are mechanically robust.

In some embodiments, the second reactor employs gasification of the biogenic reagent, thereby generating a reducing gas. Gasification is carried out at elevated temperatures, such as at least about 600° C. to at most about 1100° C. Less-reactive biogenic reagents use higher operating temperatures. The amount of reactant introduced (e.g., air, oxygen, enriched air, or oxygen-steam mixtures) can be the primary factor controlling the gasification temperature. Operating pressures from atmospheric to about 50 bar have been employed in biomass gasification. Gasification also uses a reactant, commonly air, high-purity oxygen, steam, or some mixture of these gases.

Gasifiers can be differentiated based on the means of supporting solids within the vessel, the directions of flow of both solids and gas, and the method of supplying heat to the reactor. Whether the gasifier is operated at near atmospheric or at elevated pressures, and the gasifier is air-blown or oxygen-blown, are also distinguishing characteristics. Common classifications are fixed-bed updraft, fixed-bed downdraft, bubbling fluidized bed, and circulating fluidized bed.

Fixed-bed gasifiers, in general, cannot handle fibrous herbaceous feedstocks, such as wheat straw, corn stover, or yard wastes. However, in the disclosed process, biomass is first pyrolyzed to a biogenic reagent, and the biogenic reagent is gasified. The biogenic reagent can be gasified using a fixed-bed gasifier.

Circulating fluidized-bed gasification technology is available from Lurgi and Foster Wheeler, and represents the majority of existing gasification technology utilized for biomass and other wastes. Bubbling fluidized-bed gasification (e.g., U-GAS® technology) has been commercially used.

Directly heated gasifiers conduct endothermic and exothermic gasification reactions in a single reaction vessel; no additional heating is needed. In contrast, indirectly heated gasifiers use an external source of heat. Indirectly heated gasifiers commonly employ two vessels. The first vessel gasifies the feed with steam (an endothermic process). Heat is supplied by circulating a heat-transfer medium, commonly sand. Reducing gas and solid char produced in the first vessel, along with the sand, are separated. The mixed char and sand are fed to the second vessel, where the char is combusted with air, heating the sand. The hot sand is circulated back to the first vessel.

The biogenic reagent can be introduced to a gasifier as a "dry feed" (optionally with moisture, but no free liquid phase), or as a slurry or suspension in water. Dry-feed gasifiers can allow for high per-pass carbon conversion to reducing gas and good energy efficiency. In a dry-feed gasifier, the energy released by the gasification reactions can cause the gasifier to reach extremely high temperatures. This problem can be resolved by using a wet-wall design.

In some embodiments, the feed to the gasifier is a biogenic reagent with high hydrogen content. The resulting reducing gas is relatively rich in hydrogen, with high $H_2/CO$ ratios, such as $H_2/CO>1.5$ or more.

In some embodiments, the feed to the gasifier is a biogenic reagent with low hydrogen content. The resulting reducing gas is expected to have relatively low $H_2/CO$ ratios. For downstream processes that use $H_2/CO>1$, it can be desirable to inject water or steam into the gasifier to both moderate the gasifier temperature (via sensible-heat effects or endothermic chemistry), and to shift the $H_2/CO$ ratio to a higher, more-desirable ratio. Water addition can also contribute to temperature moderation by endothermic consumption, via steam-reforming chemistry. In steam reforming, $H_2O$ reacts with carbon or with a hydrocarbon, such as tar or benzene/toluene/xylenes, to produce reducing gas and lower the adiabatic gasification temperature.

In certain variations, the gasifier is a fluidized-bed gasifier, such as a bubbling fluidized gasification reactor. Fluidization results in a substantially uniform temperature within the gasifier bed. A fluidizing bed material, such as alumina sand or silica sand, can reduce potential attrition issues. The gasifier temperature can be moderated to a sufficiently low temperature so that ash particles do not begin to transform from solid to molten form, which can cause agglomeration and loss of fluidization within the gasifier.

When a fluidized-bed gasifier is used, the total flow rate of all components should ensure that the gasifier bed is fluidized. The total gas flow rate and bed diameter establish the gas velocity through the gasifier. The correct velocity must be maintained to ensure proper fluidization.

In variations, the gasifier type can be entrained-flow slagging, entrained flow non-slagging, transport, bubbling fluidized bed, circulating fluidized bed, or fixed bed. Some embodiments employ gasification catalysts.

Circulating fluidized-bed gasifiers can be employed, wherein gas, sand, and feedstock move together. Exemplary transport gases include recirculated product gas, combustion gas, or recycle gas. High heat-transfer rates from the sand ensure rapid heating of the feedstock, and ablation is expected to be stronger than with regular fluidized beds. A separator can be employed to separate the reducing gas from the sand and char particle. The sand particles can be reheated in a fluidized burner vessel and recycled to the reactor.

In some embodiments in which a countercurrent fixed-bed gasifier is used, the reactor comprises a fixed bed of a feedstock through which a gasification agent (such as steam, oxygen, or recycle gas) flows in countercurrent configuration. The ash is either removed dry or as a slag.

In some embodiments in which a cocurrent fixed-bed gasifier is used, the reactor is similar to the countercurrent type, but the gasification agent gas flows in cocurrent configuration with the feedstock. Heat is added to the upper part of the bed, either by combusting small amounts of the feedstock or from external heat sources. The produced gas leaves the reactor at a high temperature, and much of this heat is transferred to the gasification agent added in the top of the bed, resulting in good energy efficiency.

In some embodiments in which a fluidized-bed reactor is used as the second reactor, the feedstock is fluidized in recycle gas, oxygen, air, or steam. The ash can be removed dry or as heavy agglomerates that defluidize. Recycle or subsequent combustion of solids can be used to increase conversion. Fluidized-bed reactors are useful for feedstocks that form highly corrosive ash that would damage the walls of slagging reactors.

In some embodiments in which an entrained-flow gasifier is used, biogenic reagent is gasified with oxygen, air, or recycle gas in cocurrent flow. The gasification reactions take place in a dense cloud of very fine particles. High temperatures can be employed, thereby providing for low quantities of tar and methane in the reducing gas.

Entrained-flow reactors remove the majority of the ash as a slag, as the operating temperature can be well above the ash fusion temperature. A smaller fraction of the ash is produced either as a very fine dry fly ash or as a fly-ash slurry. Certain entrained-bed reactors have an inner water- or steam-cooled wall covered with partially solidified slag.

The gasifier chamber can be designed, by proper configuration of the freeboard or use of internal cyclones, to keep the carryover of solids downstream operations at a level suitable for recovery of heat. Unreacted biogenic reagent can be drawn from the bottom of the gasifier chamber, cooled, and recovered.

A gasifier can include one or more catalysts, such as catalysts effective for partial oxidation, reverse water-gas shift, or dry ($CO_2$) reforming of carbon-containing species.

In some embodiments, a bubbling fluid-bed devolatilization reactor is utilized as the second reactor. The reactor is heated, at least in part, by the hot recycle gas stream to approximately 600° C.—below the expected slagging temperature for biomass. Steam, oxygen, or air can also be introduced to the second reactor.

The second reactor can be designed, by proper configuration of a freeboard or use of internal cyclones, to keep the carryover of solids at a level suitable for recovery of heat downstream. Unreacted char can be drawn from the bottom of the devolatilization chamber, cooled, and then fed to a utility boiler to recover the remaining heating value of this stream.

When a fluidized-bed gasifier is employed as the second reactor, the feedstock can be introduced into a bed of hot sand fluidized by a gas, such as recycle gas. Reference herein to "sand" shall also include similar, substantially inert materials, such as glass particles, recovered ash particles, and the like. High heat-transfer rates from fluidized sand can result in rapid heating of the feedstock. There can be some ablation by attrition with the sand particles. Heat can be provided by heat-exchanger tubes through which hot combustion gas flows.

Circulating fluidized-bed reactors can be employed as the second reactor, wherein gas, sand, and feedstock move together. Exemplary transport gases include recirculated product gas, combustion gas, or recycle gas. High heat-transfer rates from the sand ensure rapid heating of the feedstock, and ablation is expected to be stronger than with regular fluidized beds. A separator can be employed to separate the reducing gas from the sand and char particles. The sand particles can be reheated in a fluidized burner vessel and recycled to the reactor.

In some embodiments in which a countercurrent fixed-bed reactor is used as the devolatilization unit, the reactor comprises a fixed bed of a feedstock through which a gasification agent (such as steam, oxygen, or recycle gas) flows in countercurrent configuration. The ash is either removed dry or as a slag.

In some embodiments in which a cocurrent fixed-bed reactor is used as the devolatilization unit, the reactor is similar to the countercurrent type, but the gasification agent gas flows in cocurrent configuration with the feedstock. Heat is added to the upper part of the bed, either by combusting small amounts of the feedstock or from external heat sources. The reducing gas leaves the reactor at a high temperature, and much of this heat is transferred to the reactants added in the top of the bed, resulting in good energy efficiency. Since tars pass through a hot bed of carbon in this configuration, tar levels are expected to be lower than when using the countercurrent type.

In some embodiments in which a fluidized-bed reactor is used as the devolatilization unit, the feedstock is fluidized in recycle gas, oxygen, air, or steam. The ash is removed dry or as heavy agglomerates that defluidize. Recycle or subsequent combustion of solids can be used to increase conversion.

To enhance heat and mass transfer, water can be introduced into the second reactor using a nozzle, which is generally a mechanical device designed to control the direction or characteristics of a fluid flow as it enters an enclosed chamber or pipe via an orifice. Nozzles are capable of reducing the water droplet size, thereby generating a fine spray of water. Nozzles can be selected from atomizer nozzles (similar to fuel injectors), swirl nozzles which inject the liquid tangentially, and so on.

Water sources can include direct piping from process condensate, other recycle water, wastewater, make-up water, boiler feed water, city water, for example. Water can optionally first be cleaned, purified, treated, ionized, distilled, and the like. When several water sources are used, various volume ratios of water sources are possible. In some embodiments, the water for the second reactor is wastewater.

In some variations, the reducing gas from the second reactor is filtered, purified, or otherwise conditioned prior to being converted to another product. For example, cooled reducing gas can be introduced to a conditioning unit, where benzene, toluene, ethyl benzene, xylene, sulfur compounds, nitrogen, metals, or other impurities are optionally removed from the reducing gas.

Some embodiments of the disclosure include a reducing-gas cleanup unit downstream of the second reactor. The reducing-gas cleanup unit is not particularly limited in its design. Exemplary reducing-gas cleanup units include cyclones, centrifuges, filters, membranes, solvent-based systems, and other means of removing particulates or other specific contaminants.

In some embodiments, an acid-gas removal unit is included downstream of the second reactor. The acid-gas removal unit is not particularly limited, and can be any means known in the art for removing $H_2S$, $CO_2$, or other acid gases from the reducing gas.

Examples of acid-gas removal steps include removal of $CO_2$ with one or more solvents for $CO_2$, or removal of $CO_2$ by a pressure-swing adsorption unit. Suitable solvents for reactive solvent-based acid gas removal include monoethanolamine, diethanolamine, methyldiethanolamine, diisopropylamine, and am inoethoxyethanol. Suitable solvents for physical solvent-based acid gas removal include dimethyl ethers of polyethylene glycol (such as in the Selexol® process) and refrigerated methanol (such as in the Rectisol® process).

The reducing gas produced as described according to the present disclosure can be utilized in a number of ways. Reducing gas can generally be chemically converted or purified into hydrogen, carbon monoxide, methane, olefins (such as ethylene), oxygenates (such as dimethyl ether), alcohols (such as methanol and ethanol), paraffins, and other hydrocarbons. Reducing gas can be converted into linear or branched $C_5$-$C_{15}$ hydrocarbons, diesel fuel, gasoline, waxes, or olefins by Fischer-Tropsch chemistry; mixed alcohols by a variety of catalysts; isobutane by isosynthesis; ammonia by hydrogen production followed by the Haber process; aldehydes and alcohols by oxosynthesis; and many derivatives of methanol including dimethyl ether, acetic acid, ethylene, propylene, and formaldehyde by various processes. The reducing gas can also be converted to energy using energy-conversion devices such as solid-oxide fuel cells, Stirling engines, micro-turbines, internal combustion engines, thermo-electric generators, scroll expanders, gas burners, or thermo-photovoltaic devices.

Recovery of Activated Carbon

The recovery of activated carbon will now be further described.

In some embodiments step (f) is conducted in order to intentionally or incidentally produce an activated carbon co-product. When step (f) is conducted, step (e) can or can not be conducted.

In certain embodiments, steps (e) and (f) are carried out in an integrated reactor having distinct reaction zones for generating a reducing gas in situ and then utilizing that reducing gas, or least a portion of it, for reducing a metal oxide to a metal or a less-reduced metal oxide.

When step (f) is employed, at least 1 wt %, 5 wt %, 10 wt %, 20 wt %, 30 wt %, 40 wt %, 50 wt %, 60 wt %, 70 wt %, 80 wt %, or 90 wt % of the biogenic reagent generated in step (b) can be recovered as activated carbon. The process is adjustable such that more or less activated carbon can be produced, compared to carbon that is directed to the reducing gas (generally as carbon oxides).

In certain embodiments, the fixed carbon within the biogenic reagent can be primarily used to make activated carbon while the volatile carbon within the biogenic reagent can be primarily used to make reducing gas. For example, at least 50 wt %, at least 90 wt %, or essentially all of the fixed carbon within the biogenic reagent generated in step (b) can be recovered as activated carbon in step (f), while, for example, at least 50 wt %, at least 90 wt %, or essentially all of the volatile carbon within the biogenic reagent generated in step (b) can be directed to the reducing gas (e.g., via steam-reforming reactions of volatile carbon to CO).

The activated carbon, when produced, can be characterized by an Iodine Number of at least about 500, 750, 800, 1000, 1500, or 2000, for example. The activated carbon can be characterized by a renewable carbon content of at least 50%, 60%, 70%, 80%, 90%, or 95% as determined from a measurement of the $^{14}C/^{12}C$ isotopic ratio of the activated carbon. In some embodiments, the activated carbon is characterized as (fully) renewable activated carbon as determined from a measurement of the $^{14}C/^{12}C$ isotopic ratio of the activated carbon.

In some systems, the second reactor is configured for continuously or periodically removing activated carbon from the second reactor, such as via a screw conveyer for removing carbon pellets out of the reactor. In these or other embodiments, the second reactor is configured for ultimately (i.e., at the end of a period of reaction time) removing activated carbon from the second reactor, such as via a screw conveyer or by opening up the reactor to recover activated carbon.

In some embodiments, the second reactor is configured for optimizing the production of different types of activated carbon. For example, reaction conditions (e.g., time, temperature, and steam concentration) can be selected for an activated carbon product with certain attributes such as Iodine Number. Different reaction conditions can be selected for a different activated carbon product, such as one with a higher Iodine Number. The second reactor can be operated in a campaign mode to produce one product and then switched to another mode for another product. The first product can have been continuously or periodically removed during the first campaign, or can be removed prior to switching the reaction conditions of the second reactor. In general, the second reactor can be optimized for generation of different amounts and properties of activated carbon as well as amounts and qualities of reducing gas.

When activated carbon is desired, the third reactor can or can not be present. In some embodiments, such as depicted in FIG. 3, activated carbon and a metal product are both produced. In certain embodiments, an integrated reactor is employed both for activated carbon production as well as for metal oxide reduction to a metal product.

The activated carbon can be characterized by an Iodine Number of at least about 500, 750, 1000, 1500, or 2000, for example. The activated carbon can be characterized by a renewable carbon content of at least 90% as determined from a measurement of the $^{14}C/^{12}C$ isotopic ratio of the activated carbon. In some embodiments, the activated carbon is characterized as (fully) renewable activated carbon as determined from a measurement of the $^{14}C/^{12}C$ isotopic ratio of the activated carbon.

Activated carbon produced by the processes disclosed herein can be used in a number of ways.

In some embodiments, the activated carbon is utilized internally at the process site to purify the one or more primary products. In some embodiments, the activated carbon is utilized at the site to purify water. In these or other embodiments, the activated carbon is utilized at the site to treat a liquid waste stream to reduce liquid-phase emissions or to treat a vapor waste stream to reduce air emissions. In some embodiments, the activated carbon is utilized as a soil amendment to assist generation of new biomass, which can be the same type of biomass utilized as local feedstock at the site.

Activated carbon prepared according to the processes disclosed herein can have the same or better characteristics as traditional fossil fuel-based activated carbon. In some embodiments, the activated carbon has a surface area that is comparable to, equal to, or greater than surface area associated with fossil fuel-based activated carbon. In some embodiments, the activated carbon can control pollutants as well as or better than traditional activated carbon products. In some embodiments, the activated carbon has an inert material (e.g., ash) level that is comparable to, equal to, or less than an inert material (e.g., ash) level associated with a traditional activated carbon product. In some embodiments, the activated carbon has a particle size or a particle size distribution that is comparable to, equal to, greater than, or less than a particle size or a particle size distribution associated with a traditional activated carbon product. In some embodiments, the activated carbon has a particle shape that is comparable to, substantially similar to, or the same as a particle shape associated with a traditional activated carbon product. In some embodiments, the activated carbon has a particle shape that is substantially different than a particle shape associated with a traditional activated carbon product. In some embodiments, the activated carbon has a pore volume that is comparable to, equal to, or greater than a pore volume associated with a traditional activated carbon product. In some embodiments, the activated carbon has pore dimensions that are comparable to, substantially similar to, or the same as pore dimensions associated with a traditional activated carbon product. In some embodiments, the activated carbon has an attrition resistance of particles value that is comparable to, substantially similar to, or the same as an attrition resistance of particles value associated with a traditional activated carbon product. In some embodiments, the activated carbon has a hardness value that is comparable to, substantially similar to, or the same as a hardness value associated with a traditional activated carbon product. In some embodiments, the activated carbon has a bulk density value that is comparable to, substantially similar to, or the same as a bulk density value associated with a traditional activated carbon product. In some embodiments, the activated carbon product has an adsorptive capacity that is comparable to, substantially similar to, or the same as an adsorptive capacity associated with a traditional activated carbon product.

Prior to suitability or actual use in any product applications, the disclosed activated carbons can be analyzed, measured, and optionally modified (such as through additives) in various ways. Some properties of potential interest include density, particle size, surface area, microporosity, absorptivity, adsorptivity, binding capacity, reactivity, desulfurization activity, basicity, hardness, and Iodine Number.

Activated carbon is used commercially in a wide variety of liquid and gas-phase applications, including water treatment, air purification, solvent vapor recovery, food and beverage processing, sugar and sweetener refining, automotive uses, and pharmaceuticals. For activated carbon, key product attributes can include particle size, shape, composition, surface area, pore volume, pore dimensions, particle-size distribution, the chemical nature of the carbon surface and interior, attrition resistance of particles, hardness, bulk density, and adsorptive capacity.

The bulk density for the biogenic activated carbon can be from about 50 g/liter to about 650 g/liter.

The surface area of the biogenic activated carbon can vary widely. Exemplary surface areas range from about 400 m²/g to about 2000 m²/g or higher, such as about 500 m²/g, 600 m²/g, 800 m²/g, 1000 m²/g, 1200 m²/g, 1400 m²/g, 1600 m²/g, or 1800 m²/g. Surface area generally correlates to adsorption capacity.

The pore-size distribution can be important to determine ultimate performance of the activated carbon. Pore-size measurements can include micropore content, mesopore content, and macropore content.

The Iodine Number is a parameter used to characterize activated carbon performance. The Iodine Number measures the degree of activation of the carbon, and is a measure of micropore (e.g., 0-20 Å) content. It is an important measurement for liquid-phase applications. Exemplary Iodine Numbers for activated carbon products produced by embodiments of the disclosure include in the range of from or in between about 500, 600, 750, 900, 1000, 1100, 1200, 1300, 1500, 1600, 1750, 1900, 2000, 2100, and 2200. The units of Iodine Number are milligram iodine per gram carbon.

Another pore-related measurement is Methylene Blue Number, which measures mesopore content (e.g., 20-500 Å). Exemplary Methylene Blue Numbers for activated carbon products produced by embodiments of the disclosure include in the range of from or in between about 100, 150, 200, 250, 300, 350, 400, 450, and 500. The units of Methylene Blue Number are milligram methylene blue (methylthioninium chloride) per gram carbon.

Another pore-related measurement is Molasses Number, which measures macropore content (e.g., >500 Å). Exemplary Molasses Numbers for activated carbon products produced by embodiments of the disclosure include in the range of from or in between about 100, 150, 200, 250, 300, 350, and 400. The units of Molasses Number are milligram molasses per gram carbon.

The activated carbon can be characterized by its water-holding capacity. In various embodiments, activated carbon products produced by embodiments of the disclosure have a water-holding capacity at 25° C. of about 10% to about 300% (water weight divided by weight of dry activated carbon), such as from about 50% to about 100%, e.g. about 60-80%.

Hardness or Abrasion Number is measure of activated carbon's resistance to attrition. It is an indicator of activated carbon's physical integrity to withstand frictional forces and mechanical stresses during handling or use. Some amount of hardness is desirable, but if the hardness is too high, excessive equipment wear can result. Exemplary Abrasion Numbers, measured according to ASTM D3802, range from about 1% to great than about 99%, such as about 1%, about 5%, about 10%, about 15%, about 20%, about 25%, about 30%, about 35%, about 40%, about 45%, about 50%, about 55%, 60%, about 65%, about 70%, about 75%, about 80%, about 85%, about 90%, about 95%, about 96%, about 97%, about 98%, about 99%, or at least about 99%.

In some embodiments, an optimal range of hardness can be achieved in which the activated carbon is reasonably resistant to attrition but does not cause abrasion and wear in capital facilities that process the activated carbon. This optimum is made possible in some embodiments of this disclosure due to the selection of feedstock as well as processing conditions. In some embodiments in which the downstream use can handle high hardness, the process of this disclosure can be operated to increase or maximize hardness to produce biogenic activated carbon products having an Abrasion Number of about 75%, about 80%, about 85%, about 90%, about 95%, about 96%, about 97%, about 98%, about 99%, or at least about 99%.

The biogenic activated carbon provided by the present disclosure has a wide range of commercial uses. For example, without limitation, the biogenic activated carbon can be utilized in emissions control, water purification, groundwater treatment, wastewater treatment, air stripper applications, PCB removal applications, odor removal applications, soil vapor extractions, manufactured gas plants, industrial water filtration, industrial fumigation, tank and process vents, pumps, blowers, filters, pre-filters, mist filters, ductwork, piping modules, adsorbers, absorbers, and columns.

In one embodiment, a method of using activated carbon to reduce emissions comprises:

(a) providing an activated carbon particle comprising a biogenic activated carbon composition recovered from the second reactor disclosed herein;

(b) providing a gas-phase emissions stream comprising a selected contaminant;

(c) providing an additive selected to assist in removal of the selected contaminant from the gas-phase emissions stream;

(d) introducing the activated carbon particle and the additive into the gas-phase emissions stream, thereby adsorbing the selected contaminant onto the activated carbon particle, thereby generating a contaminant-adsorbed carbon particle within the gas-phase emissions stream; and (e) separating the contaminant-adsorbed carbon particle from the gas-phase emissions stream, thereby producing a contaminant-reduced gas-phase emissions stream.

The additive for the biogenic activated carbon composition can be provided as part of the activated carbon particle. Alternatively, or additionally, the additive can be introduced directly into the gas-phase emissions stream, into a fuel bed, or into a combustion zone. Other ways of directly or indirectly introducing the additive into the gas-phase emissions stream for removal of the selected contaminant are possible, as will be appreciated by one of skill in the art.

A selected contaminant (in the gas-phase emissions stream) can be a metal, such as mercury, boron, selenium, arsenic, or any compound, salt, or mixture thereof. A selected contaminant can be a hazardous air pollutant, an organic compound (such as a VOC), or a non-condensable gas, for example. In some embodiments, a biogenic activated carbon product adsorbs, absorbs or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the biogenic activated carbon comprises at least about 1 wt % hydrogen or at least about 10 wt % oxygen.

Hazardous air pollutants are those pollutants that cause or can cause cancer or other serious health effects, such as reproductive effects or birth defects, or adverse environmental and ecological effects. Section 112 of the Clean Air Act, as amended, is incorporated by reference herein in its entirety. Pursuant to the Section 112 of the Clean Air Act, the United States Environmental Protection Agency (EPA) is mandated to control 189 hazardous air pollutants. Any current or future compounds classified as hazardous air pollutants by the EPA are included in possible selected contaminants in the present context.

Volatile organic compounds, some of which are also hazardous air pollutants, are organic chemicals that have a high vapor pressure at ordinary, room-temperature conditions. Examples include short-chain alkanes, olefins, alcohols, ketones, and aldehydes. Many volatile organic compounds are dangerous to human health or cause harm to the environment. EPA regulates volatile organic compounds in air, water, and land. EPA's definition of volatile organic compounds is described in 40 CFR Section 51.100, which is incorporated by reference herein in its entirety.

Non-condensable gases are gases that do not condense under ordinary, room-temperature conditions. Non-condensable gas can include, but are not limited to, nitrogen oxides, carbon monoxide, carbon dioxide, hydrogen sulfide, sulfur dioxide, sulfur trioxide, methane, ethane, ethylene, ozone, ammonia, or a combination thereof.

Multiple contaminants can be removed by the disclosed activated carbon particles. In some embodiments, the contaminant-adsorbed carbon particle comprises at least two contaminants, at least three contaminants, or more. The activated carbon as disclosed herein can allow multi-pollutant control as well as control of certain targeted pollutants (e.g. selenium).

In some embodiments, a contaminant-adsorbed carbon particle is treated to regenerate the activated carbon particle. In some embodiments, the method comprises thermally oxidizing the contaminant-adsorbed carbon particle. The contaminant-adsorbed carbon particle, or a regenerated form thereof, can be combusted to provide energy.

In some embodiments, an additive for activated carbon is selected from an acid, a base, a salt, a metal, a metal oxide, a metal hydroxide, a metal halide, or a combination thereof. In certain embodiments, the additive is selected from magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids (e.g., citric acid), or a combination thereof.

In some embodiments, the gas-phase emissions stream is derived from metals processing, such as the processing of high-sulfur-content metal ores.

As an exemplary embodiment relating to mercury control, activated carbon can be injected (such as into the ductwork) upstream of a particulate matter control device, such as an electrostatic precipitator or fabric filter. In some cases, a flue gas desulfurization (dry or wet) system can be downstream of the activated carbon injection point. The activated carbon can be pneumatically injected as a powder. The injection location can be determined by the existing plant configuration (unless it is a new site) and whether additional downstream particulate matter control equipment is modified.

For boilers currently equipped with particulate matter control devices, implementing biogenic activated carbon injection for mercury control could entail: (i) injection of powdered activated carbon upstream of the existing particulate matter control device (electrostatic precipitator or fabric filter); (ii) injection of powdered activated carbon downstream of an existing electrostatic precipitator and upstream of a retrofit fabric filter; or (iii) injection of powdered activated carbon between electrostatic precipitator electric fields. Inclusion of iron or iron-containing compounds can drastically improve the performance of electrostatic precipitators for mercury control. Furthermore, inclusion of iron or iron-containing compounds can drastically change end-of-life options, since the spent activated carbon solids can be separated from other ash.

In some embodiments, powdered activated carbon injection approaches can be employed in combination with existing $SO_2$ control devices. Activated carbon could be injected prior to the $SO_2$ control device or after the $SO_2$ control device, subject to the availability of a means to collect the activated carbon sorbent downstream of the injection point.

In some embodiments, the same physical material can be used in multiple processes, either in an integrated way or in sequence. Thus, for example, activated carbon may, at the end of its useful life as a performance material, then be introduced to a combustion process for energy value or to a metal-making process that uses carbon but does not require the properties of activated carbon, etc.

The biogenic activated carbon and the principles of the disclosure can be applied to liquid-phase applications, including processing of water, aqueous streams of varying purities, solvents, liquid fuels, polymers, molten salts, and molten metals, for example. As intended herein, "liquid phase" includes slurries, suspensions, emulsions, multiphase systems, or any other material that has (or can be adjusted to have) amount of a liquid state present.

In one embodiment, the present disclosure provides a method of using activated carbon to purify a liquid, comprising:

(a) providing an activated carbon particle recovered from the second reactor;

(b) providing a liquid comprising a selected contaminant;

(c) providing an additive selected to assist in removal of the selected contaminant from the liquid; and (d) contacting the liquid with the activated carbon particle and the additive, thereby adsorbing the selected contaminant onto the activated carbon particle, thereby generating a contaminant-adsorbed carbon particle and a contaminant-reduced liquid.

The additive can be provided as part of the activated carbon particle, or the additive can be introduced directly into the liquid. In some embodiments, an additive is introduced both as part of the activated carbon particle as well as directly into the liquid.

In some embodiments relating to liquid-phase applications, an additive is selected from an acid, a base, a salt, a metal, a metal oxide, a metal hydroxide, a metal halide, or a combination thereof. For example an additive can be selected from magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids (e.g., citric acid), or a combination thereof.

In some embodiments, the selected contaminant (in the liquid to be treated) is a metal, such as a metal selected from arsenic, boron, selenium, mercury, or any compound, salt, or mixture thereof. In some embodiments, the selected contaminant is an organic compound (such as a VOC), a halogen, a biological compound, a pesticide, or a herbicide. The contaminant-adsorbed carbon particle can comprise two, three, or more contaminants. In some embodiments, an activated carbon product adsorbs, absorbs or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the biogenic activated carbon comprises at least about 1 wt % hydrogen or at least about 10 wt % oxygen.

The liquid to be treated can be aqueous, although it is not necessary for the principles of this disclosure. In some embodiments, a liquid is treated with an activated carbon particle in a fixed bed. In other embodiments, a liquid is treated with an activated carbon particle in solution or in a moving bed.

In one embodiment, the present disclosure provides a method of using a biogenic activated carbon composition to remove a sulfur-containing contaminant from a liquid, the method comprising:

(a) providing an activated carbon particle recovered from the second reactor disclosed herein;

(b) providing a liquid containing a sulfur-containing contaminant;

(c) providing an additive selected to assist in removal of the sulfur-containing contaminant from the liquid; and (d) contacting the liquid with the activated-carbon particle and the additive, thereby adsorbing or absorbing the sulfur-containing contaminant onto or into the activated-carbon particle.

In some embodiments, the sulfur-containing contaminant is selected from elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, or a combination, salts, or derivatives thereof. For example, the sulfur-containing contaminant can be a sulfate, in anionic or salt form.

The liquid can be an aqueous liquid, such as water. In some embodiments, the water is wastewater associated with a process selected from metal mining, acid mine drainage, mineral processing, municipal sewer treatment, pulp and paper, ethanol, or any other industrial process that is capable of discharging sulfur-containing contaminants in wastewater. The water can also be (or be part of) a natural body of water, such as a lake, river, or stream.

In one embodiment, the present disclosure provides a process to reduce the concentration of a sulfate in water, the process comprising:

(a) providing an activated carbon particle recovered from the second reactor disclosed herein;

(b) providing a volume or stream of water comprising a sulfate;

(c) providing an additive selected to assist in removal of the sulfate from the water; and (d) contacting the water with the activated-carbon particle and the additive, thereby adsorbing or absorbing the sulfate onto or into the activated-carbon particle.

In some embodiments, the sulfate is reduced to a concentration of about 50 mg/L or less in the water, such as a concentration of about 10 mg/L or less in the water. In some embodiments, the sulfate is present primarily in the form of sulfate anions or bisulfate anions. Depending on pH, the sulfate can also be present in the form of sulfate salts.

The water can be derived from, part of, or the entirety of a wastewater stream. Exemplary wastewater streams are those that can be associated with a metal mining, acid mine drainage, mineral processing, municipal sewer treatment, pulp and paper, ethanol, or any other industrial process that could discharge sulfur-containing contaminants to wastewater. The water can be a natural body of water, such as a lake, river, or stream. In some embodiments, the process is conducted continuously. In other embodiments, the process is conducted in batch.

When water is treated with activated carbon, there can be filtration of the water, osmosis of the water, or direct addition (with sedimentation, clarification, etc.) of the activated-carbon particle to the water. When osmosis is employed, the activated carbon can be used in several ways within, or to assist, an osmosis device. In some embodiments, the activated-carbon particle and the additive are directly introduced to the water prior to osmosis. The activated-carbon particle and the additive are optionally employed in pre-filtration prior to the osmosis. In certain embodiments, the activated-carbon particle and the additive are incorporated into a membrane for osmosis.

The present disclosure also provides a method of using a biogenic activated carbon composition to remove a sulfur-containing contaminant from a gas phase, the method comprising:

(a) providing an activated carbon particle recovered from the second reactor disclosed herein;

(b) providing a gas-phase emissions stream comprising a sulfur-containing contaminant;

(c) providing an additive selected to assist in removal of the sulfur-containing contaminant from the gas-phase emissions stream;

(d) introducing the activated carbon particle and the additive into the gas-phase emissions stream, thereby adsorbing or absorbing the sulfur-containing contaminant onto the activated carbon particle; and (e) separating the activated carbon particle from the gas-phase emissions stream.

In some embodiments, the sulfur-containing contaminant is selected from elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, or a combination, salt, or derivatives thereof.

Generally speaking, the disclosed activated carbon can be used in any application in which traditional activated carbon might be used. In some embodiments, the activated carbon is used as a total (i.e., 100%) replacement for traditional activated carbon. In some embodiments, the activated carbon comprises essentially all or substantially all of the activated carbon used for a particular application. In some embodiments, the activated carbon comprises about 1% to about 100% of biogenic activated carbon.

For example and without limitation, the activated carbon can be used—alone or in combination with a traditional activated carbon product—in filters. In some embodiments, a packed bed or packed column comprises the disclosed activated carbon. In such embodiments, the biogenic activated carbon has a size characteristic suitable for the particular packed bed or packed column. Injection of biogenic activated carbon into gas streams can be useful for control of contaminant emissions in gas streams or liquid streams derived from coal-fired power plants, biomass-fired power plants, metal processing plants, crude-oil refineries, chemical plants, polymer plants, pulp and paper plants, cement plants, waste incinerators, food processing plants, gasification plants, and syngas plants.

Metal Oxide Reduction Furnaces

Various embodiments employing a metal ore furnace or a chemical-reduction furnace will now be further described.

A metal ore furnace or a chemical-reduction furnace can be a blast furnace, a top-gas recycling blast furnace, a shaft furnace, a reverberatory furnace (also known as an air furnace), a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, a direct-reduced-metal furnace, or a combination or derivative thereof.

A metal ore furnace or a chemical-reduction furnace can be arranged horizontally, vertically, or inclined. The flow of solids and fluids (liquids or gases) can be cocurrent or countercurrent. The solids within a furnace can be in a fixed bed or a fluidized bed. A metal ore furnace or a chemical-reduction furnace can be operated at a variety of process conditions of temperature, pressure, and residence time.

Some variations of the disclosure relate specifically to a blast furnace. A blast furnace is a type of metallurgical furnace used for smelting to produce industrial metals, such as iron or copper. Blast furnaces are utilized in smelting iron ore to produce pig iron, an intermediate material used in the production of commercial iron and steel. Blast furnaces are also used in combination with sinter plants in base metals smelting, for example.

"Blast" refers to the combustion air being forced or supplied above atmospheric pressure. In a blast furnace, metal ores, carbon (in the present disclosure, biogenic reagent or a derivative thereof), and usually flux (e.g., limestone) are continuously supplied through the top of the furnace, while a hot blast of air (optionally with oxygen enrichment) is blown into the lower section of the furnace through a series of pipes called tuyeres. The chemical reduction reactions take place throughout the furnace as the material falls downward. The end products are usually molten metal and slag phases tapped from the bottom, and waste gases (reduction off-gas) exiting from the top of the furnace. The downward flow of the metal ore along with the flux in countercurrent contact with an upflow of hot, CO-rich gases allows for an efficient chemical reaction to reduce the metal ore to metal.

Air furnaces (such as reverberatory furnaces) are naturally aspirated, usually by the convection of hot gases in a chimney flue. According to this broad definition, bloomeries for iron, blowing houses for tin, and smelt mills for lead would be classified as blast furnaces.

The blast furnace remains an important part of modern iron production. Modern furnaces are highly efficient, including Cowper stoves which preheat incoming blast air with waste heat from flue gas, and recovery systems to extract the heat from the hot gases exiting the furnace. A blast furnace can be built in the form of a tall structure, lined with refractory brick, and profiled to allow for expansion of the feed materials as they heat during their descent, and subsequent reduction in size as melting starts to occur.

In some embodiments pertaining to iron production, biogenic reagent comprising renewable carbon, iron ore (iron oxide), and limestone flux are charged into the top of the blast furnace. The blast furnace can be configured to allow the hot, dirty gas high in carbon monoxide content to exit the furnace throat, while bleeder valves can protect the top of the furnace from sudden gas pressure surges. The coarse particles in the exhaust gas settle and can be disposed, while the gas can flow through a venturi scrubber or electrostatic precipitator or a gas cooler to reduce the temperature of the cleaned gas. A casthouse at the bottom of the furnace contains equipment for casting the liquid iron and slag. A taphole can be drilled through a refractory plug, so that liquid iron and slag flow down a trough through an opening, separating the iron and slag. Once the pig iron and slag has been tapped, the taphole can be plugged with refractory clay. Nozzles, called tuyeres, are used to implement a hot blast to increase the efficiency of the blast furnace. The hot blast is directed into the furnace through cooled tuyeres near the base. The hot blast temperature can be from 900° C. to 1300° C. (air temperature), for example. The temperature within the blast furnace can be 2000° C. or higher. Other carbonaceous materials or oxygen can also be injected into the furnace at the tuyere level to combine with the carbon (from biogenic reagent) to release additional energy and increase the percentage of reducing gases present which increases productivity.

Blast furnaces operate on the principle of chemical reduction whereby carbon monoxide, having a stronger affinity for the oxygen in metal ore (e.g., iron ore) than the corresponding metal does, reduces the metal to its elemental form. Blast furnaces differ from bloomeries and reverberatory furnaces in that in a blast furnace, flue gas is in direct contact with the ore and metal, allowing carbon monoxide to diffuse into the ore and reduce the metal oxide to elemental metal mixed with carbon. The blast furnace usually operates as a continuous, countercurrent exchange process.

Silica usually is removed from the pig iron. Silica reacts with calcium oxide and forms a silicate which floats to the surface of the molten pig iron as slag. The downward-moving column of metal ore, flux, carbon, and reaction products must be porous enough for the flue gas to pass through. This requires the biogenic-reagent carbon to be in large enough particles to be permeable. Therefore, the biogenic reagent (which can contain additives) must be strong enough so it will not be crushed by the weight of the material above it. Besides physical strength of the carbon, it can also be low in sulfur, phosphorus, and ash.

Many chemical reactions take place in a blast furnace. The chemistry can be understood with reference to hematite ($Fe_2O_3$) as the starting metal oxide. This form of iron oxide is common in iron ore processing, either in the initial feedstock or as produced within the blast furnace. Other forms of iron ore (e.g., taconite) will have various concentrations of different iron oxides—$Fe_3O_4$, $Fe_2O_3$, FeO, etc.

The main overall chemical reaction producing molten iron in a blast furnace is $$Fe_2O_3+3CO \rightarrow 2Fe+3CO_2$$

which is an endothermic reaction. This overall reaction occurs over many steps, with the first being that preheated blast air blown into the furnace reacts with carbon (e.g., from a biogenic reagent) to produce carbon monoxide and heat:

$$2C+O_2 \rightarrow 2CO$$

The hot carbon monoxide is the reducing agent for the iron ore and reacts with the iron oxide to produce molten iron and carbon dioxide. Depending on the temperature in the different parts of the furnace (typically highest at the bottom), the iron is reduced in several steps. At the top, where the temperature usually is in the range of 200–700° C., the iron oxide is partially reduced to iron(II,III) oxide, $Fe_3O_4$:

$$3Fe_2O_3+CO \rightarrow 2Fe_3O_4+CO_2$$

At temperatures around 850° C., further down in the furnace, the iron(II,III) is reduced further to iron(II) oxide, FeO:

$$Fe_3O_4+CO \rightarrow 3FeO+CO_2$$

Hot carbon dioxide, unreacted carbon monoxide, and nitrogen from the air pass up through the furnace as fresh feed material travels down into the reaction zone. As the material travels downward, countercurrent gases both preheat the feed charge and decompose the limestone (when employed) to calcium oxide and carbon dioxide:

$$CaCO_3 \rightarrow CaO+CO_2$$

The calcium oxide formed by decomposition reacts with various acidic impurities in the iron (notably silica) to form a slag which is primarily calcium silicate, $CaSiO_3$:

$$SiO_2+CaO \rightarrow CaSiO_3$$

As the FeO moves down to the region with higher temperatures, ranging up to 1200° C., FeO is reduced further to iron metal, again with carbon monoxide as reactant:

$$FeO+CO \rightarrow Fe+CO_2$$

The carbon dioxide formed in this process can be converted back to carbon monoxide by reacting with carbon via the reverse Boudouard reaction:

$$C+CO_2 \rightarrow 2CO$$

In the chemical reactions shown above, it is important to note that a reducing gas can alternatively or additionally be directly introduced into the blast furnace, rather than being an in-situ product within the furnace. In these embodiments, the reducing gas can comprise both hydrogen and carbon monoxide, which both function to chemically reduce metal oxide.

In conventional blast furnaces, there is no hydrogen available for causing metal oxide reduction. In the present disclosure, hydrogen can be injected directly into the blast furnace. Alternatively, or additionally, hydrogen can be available within the biogenic reagent that is fed to the blast furnace, when the biogenic reagent comprises volatile carbon that is associated with hydrogen (e.g., heavy tar components). Regardless of the source, hydrogen can cause additional reduction reactions that are similar to those above, but replacing CO with $H_2$:

$$3Fe_2O_3+H_2 \rightarrow 2Fe_3O_4+H_2O$$

$$Fe_3O_4+4H_2 \rightarrow 3Fe+4H_2O$$

which occur in parallel to the reduction reactions with CO. The hydrogen can also react with carbon dioxide, thereby generating more CO, in the reverse water-gas shift reaction. In certain embodiments, a reducing gas consisting essentially of hydrogen is fed to a blast furnace.

The "pig iron" produced by the blast furnace can have a relatively high carbon content of around 3-6 wt %. Pig iron can be used to make cast iron. Pig iron produced by blast furnaces normally undergoes further processing to reduce the carbon and sulfur content and produce various grades of steel used commercially. In a further process step referred to as basic oxygen steelmaking, the carbon is oxidized by blowing oxygen onto the liquid pig iron to form crude steel.

Desulfurization conventionally is performed during the transport of the liquid iron to the steelworks, by adding calcium oxide, which reacts with iron sulfide contained in the pig iron to form calcium sulfide. In some embodiments, desulfurization can also take place within a furnace or downstream of a furnace, by reacting a metal sulfide with CO (in the reducing gas) to form a metal and carbonyl sulfide, CSO. In these or other embodiments, desulfurization can also take place within a furnace or downstream of a furnace, by reacting a metal sulfide with $H_2$ (in the reducing gas) to form a metal and hydrogen sulfide, $H_2S$.

Other types of furnaces can employ other chemical reactions. It will be understood that in the chemical conversion of a metal oxide into a metal, which employs carbon or a reducing gas in the conversion, that carbon can be renewable carbon. This disclosure provides renewable carbon in biogenic reagents produced via pyrolysis of biomass. In certain embodiments, some carbon utilized in the furnace is not renewable carbon. In various embodiments, of the total carbon that is consumed in the metal ore furnace, that percentage of that carbon that is renewable can be in the range of from or any number in between about 20% to about 100%, such as at least about 20%, 30%, 40%, 50%, 60%, 70%, 80%, 90%, 95%, 99%, or 100%.

In some variations of the disclosure, a Tecnored furnace, or modification thereof, is utilized. The Tecnored process was originally developed by Tecnored Desenvolvimento Tecnológico S.A. of Brazil and is based on a low-pressure moving-bed reduction furnace which reduces cold-bonded, carbon-bearing, self-fluxing, and self-reducing pellets. Reduction is carried out in a short-height shaft furnace at reduction temperatures. The process produces hot metal (e.g., liquid iron) at high efficiency.

Tecnored technology was developed to be a coke-less ironmaking process, thus avoiding the investment and operation of environmentally harmful coke ovens besides significantly reducing greenhouse gas emissions in the production of hot metal. The Tecnored process uses a combination of hot and cold blasts and requires no additional oxygen. It eliminates the need for coke plants, sinter plants, and tonnage oxygen plants. Hence, the process has much lower operating and investment costs than those of traditional ironmaking routes.

In the present disclosure, the Tecnored process can be adapted for use in various ways. Some embodiments provide cold-bonded, self-reducing agglomerates (e.g., pellets or briquettes), produced from iron ore fines or iron-bearing residues, plus a biogenic reagent. These materials, mixed with fluxing and binding agents, are agglomerated and thermally cured, producing briquettes/pellets which have sufficient strength for the physical and metallurgical demands of the Tecnored process. The agglomerates produced are then smelted in a Tecnored furnace. The fuel for the Tecnored furnace can itself be a high-carbon biogenic reagent as well.

By combining fine particles of iron oxide and the reductant within the briquette, both the surface area of the oxide in contact with reductant and, consequently, the reaction kinetics are increased dramatically. The self-reducing briquettes can be designed to contain sufficient reductant to allow full reduction of the iron-bearing feed contained, optionally with fluxes to provide the desired slag chemistry. The self-reducing briquettes are cured at low temperatures prior to feeding to the furnace. The heat required to drive the reaction within the self-reducing briquettes is provided by a bed of solid fuel, which can also be in the form of briquettes, onto which the self-reducing briquettes are fed within the furnace.

A Tecnored furnace has three zones: (i) upper shaft zone; (ii) melting zone; and (iii) lower shaft zone. In the upper shaft zone, solid fuel (e.g., biogenic reagent) is charged. In this zone, the Boudouard reaction ($C+CO_2 \rightarrow 2CO$) is prevented which saves energy. Post-combustion in this zone of the furnace burns CO which provides energy for preheating and reduction of the charge. Inside the pellets, the following reactions take place at a very fast rate:

$$Fe_xO_y+yCO \rightarrow xFe+yCO_2$$

$$yCO_2+yC=2yCO$$

where x is at least about 1 to at most about 5 and y is at least about 1 to at most about 7.

In the melting zone, reoxidation is prevented because of the reducing atmosphere in the charge. The melting of the charge takes place under reducing atmosphere. In the lower shaft zone, solid fuel is charged. The solid fuel can comprise, or consist essentially of, high-carbon biogenic reagent. In this zone, further reduction of residual iron oxides and slagging reactions of gangue materials and fuel ash takes place in the liquid state. Also, superheating of metal and slag droplets take place. These superheated metal and slag droplets sink due to gravity to the furnace hearth and accumulate there.

This modified Tecnored process employs two different inputs of carbon units—namely the reductant and the solid fuel. The reducing agent is conventionally coal fines, but in this disclosure, the reducing agent can include a biogenic reagent in the form of carbon fines. The biogenic reagent is added into the mixture from which the self-reducing agglomerates (pellets or briquettes) are produced. The quantity of carbon fines required is established by a C/F (carbon to ore fines) ratio, which can be selected to achieve full reduction of the metal oxides.

The solid fuel (biogenic reagent) need not be in the form of fines. For example, the solid fuel can be in the form of lumps, such as about 40-80 mm in size to handle the physical and thermal needs required from the solid fuels in the Tecnored process. The solid fuel is charged through side feeders (to avoid the endothermic Boudouard reaction in the upper shaft) and provides most of the energy demanded by the process. This energy is formed by the primary blast ($C+O_2 \rightarrow CO_2$) and by the secondary blast, where the upstream CO, generated by the gasification of the solid fuel at the hearth, is burned ($2CO+O_2 \rightarrow 2CO_2$).

In certain exemplary embodiments, a modified-Tecnored process comprises pelletizing iron ore fines with a size at most about 140 mesh, biogenic-reagent fines with a size at most about 200 mesh, and a flux such as hydrated lime of size at most about 140 mesh using cement as the binder. The pellets are cured and dried at 200° C. before they are fed to the top of the Tecnored furnace. The total residence time of the charge in the furnace is around 30-40 minutes. Biogenic reagent in the form of solid fuel of size ranging from 40 mm to 80 mm is fed in the furnace below the hot pellet area using side feeders. Hot blast air at around 1150° C. is blown in through tuyeres located in the side of the furnace to provide combustion air for the biogenic carbon. A small amount of furnace gas is allowed to flow through the side feeders to use for the solid fuel drying and preheating. Cold blast air is blown in at a higher point to promote post-combustion of CO in the upper shaft. The hot metal produced is tapped into a ladle on a ladle car, which can tilt the ladle for de-slagging. The liquid iron is optionally desulfurized in the ladle, and the slag is raked into a slag pot. The hot metal can comprise about 3-5 wt % carbon.

Conventionally, external CO or $H_2$ does not play a significant role in the self-reduction process using a Tecnored furnace. However, in the context of the present disclosure, external $H_2$ or CO (from reducing gas) can assist the overall chemistry by increasing the rate or conversion of iron oxides in the above reaction ($Fe_xO_y+y$ CO$\rightarrow$x Fe+y $CO_2$) or in a reaction with hydrogen as reactant ($FeO_xO_y+y$ $H_2 \rightarrow$x Fe+y $H_2O$). The reduction chemistry can be assisted at least at the surface of the pellets or briquettes, and possibly within the bulk phase of the pellets or briquettes since mass transfer of hot reducing gas is fast. Some embodiments of this disclosure combine aspects of a blast furnace with aspects of a Tecnored furnace, so that a self-reducing pellet or briquette is utilized, in addition to the use of reducing gas within the furnace.

As stated previously, there are a large number of possible furnace configurations for metal ore processing. This specification will not describe in details the various conditions and chemistry that can take place in all possible furnaces, but it will be understood by one skilled in the art that the principles of this disclosure can be applied to essentially any furnace or process that uses carbon somewhere in the process of making a metal from a metal ore.

It will also be observed that some processes utilize solid carbon, some processes utilize reducing gas, and some processes utilize both solid carbon and reducing gas. The processes provided herein produce both a solid carbon (biogenic reagent) as well as a reducing gas. In some embodiments, only the solid biogenic reagent is employed in a metal ore conversion process. In other embodiments, only the reducing gas is employed in a metal ore conversion process. In still other embodiments, both the solid biogenic reagent and the reducing gas are employed in a metal ore conversion process. In these embodiments employing both sources of renewable carbon, the percentage of overall carbon usage in the metal ore conversion from the reducing gas can be about, at least about, or at most about 5%, 10%, 20%, 30%, 40%, 50%, 60%, 70%, 80%, 90%, 95%, or 100%. The other carbon usage can be from the biogenic reagent. Alternatively, some or all of the other carbon usage can be from conventional carbon inputs, such as coal fines.

Pyrolysis Processes and Systems

Processes and systems suitable for pyrolyzing a biomass feedstock, thereby generating a biogenic reagent, wherein the biogenic reagent comprises carbon, will now be further described in detail. While such processes and systems can be co-located with a site of metal ore mining or metal ore processing, the disclosure is not limited to such co-location.

"Pyrolysis" and "pyrolyze" generally refer to thermal decomposition of a carbonaceous material. In pyrolysis, less oxygen is present than is required for complete combustion of the material, such as at most about 10%, 5%, 1%, 0.5%, 0.1%, or 0.01% of the oxygen ($O_2$ molar basis) that is required for complete combustion. In some embodiments, pyrolysis is performed in the absence of oxygen.

Exemplary changes that can occur during pyrolysis include any of the following: (i) heat transfer from a heat source increases the temperature inside the feedstock; (ii) the initiation of primary pyrolysis reactions at this higher temperature releases volatiles and forms a char; (iii) the flow of hot volatiles toward cooler solids results in heat transfer between hot volatiles and cooler unpyrolyzed feedstock; (iv) condensation of some of the volatiles in the cooler parts of the feedstock, followed by secondary reactions, can produce tar; (v) autocatalytic secondary pyrolysis reactions proceed while primary pyrolytic reactions simultaneously occur in competition; and (vi) further thermal decomposition, reforming, water-gas shift reactions, free-radical recombination, or dehydrations can also occur, which are a function of the residence time, temperature, and pressure profile.

Pyrolysis can at least partially dehydrate a starting feedstock (e.g., lignocellulosic biomass). In various embodiments, pyrolysis removes at least about 50%, 75%, 90%, 95%, 99%, or more of the water from the starting feedstock.

In some embodiments, multiple reactor zones are designed and operated in a way that optimizes carbon yield and product quality from pyrolysis, while maintaining flexibility and adjustability for feedstock variations and product requirements.

In some non-limiting embodiments, the temperatures and residence times can be selected to achieve relatively slow pyrolysis chemistry. The benefit is potentially the substantial preservation of cell walls contained in the biomass structure, which means the final product can retain some, most, or all of the shape and strength of the starting biomass. In order to maximize this potential benefit, apparatus that does not mechanically destroy the cell walls or otherwise convert the biomass particles into small fines can be utilized. Certain reactor configurations are discussed following the process description below.

Additionally, if the feedstock is a milled or sized feedstock, such as wood chips or pellets, it can be desirable for the feedstock to be carefully milled or sized. Careful initial treatment will preserve the strength and cell-wall integrity that is present in the native feedstock source (e.g., trees). This can also be important when the final product should retain some, most, or all of the shape and strength of the starting biomass.

In some embodiments, a first zone of a pyrolysis reactor is configured for feeding biomass (or another carbon-containing feedstock) in a manner that does not "shock" the biomass, which would rupture the cell walls and initiate fast decomposition of the solid phase into vapors and gases. This first zone can be thought of as mild pyrolysis.

In some embodiments, a second zone of a pyrolysis reactor is configured as the primary reaction zone, in which preheated biomass undergoes pyrolysis chemistry to release gases and condensable vapors, leaving a significant amount of solid material which is a high-carbon reaction intermediate. Biomass components (primarily cellulose, hemicellulose, and lignin) decompose and create vapors, which escape by penetrating through pores or creating new nanopores. The latter effect contributes to the creation of porosity and surface area.

In some embodiments, a third zone of a pyrolysis reactor is configured for receiving the high-carbon reaction intermediate and cooling down the solids to some extent. The third zone can be a lower temperature than the second zone. In the third zone, the chemistry and mass transport can be surprisingly complex. Without being limited by any particular theory or proposed mechanisms, it is believed that secondary reactions can occur in the third zone. Essentially, carbon-containing components that are in the gas phase can decompose to form additional fixed carbon or become adsorbed onto the carbon. Thus, the final carbonaceous material is, optionally, not simply the solid, devolatilized residue of the processing steps, but rather can include additional carbon that has been deposited from the gas phase, such as by decomposition of organic vapors (e.g., tars) that can form carbon.

Certain embodiments extend the concept of additional carbon formation by including a separate unit in which cooled carbon is subjected to an environment including carbon-containing species, to enhance the carbon content of the final product. When the temperature of this unit is below pyrolysis temperatures, the additional carbon is expected to be in the form of adsorbed carbonaceous species, rather than additional fixed carbon.

There are a large number of options as to intermediate input and output (purge or probe) streams of one or more phases present in any particular zone, various mass and energy recycle schemes, various additives that can be introduced anywhere in the process, adjustability of process conditions including both reaction and separation conditions in order to tailor product distributions, and so on. Zone-specific input and output streams enable good process monitoring and control, such as through FTIR sampling and dynamic process adjustments.

Some embodiments do not employ fast pyrolysis, and some embodiments do not employ slow pyrolysis. Surprisingly high-quality carbon materials, including compositions with very high fractions of fixed carbon, can be obtained from the disclosed processes and systems.

In some embodiments, a pyrolysis process for producing a high-carbon biogenic reagent comprises the following steps:

(a) providing a carbon-containing feedstock comprising biomass;

(b) optionally drying the feedstock to remove moisture contained within the feedstock;

(c) optionally deaerating the feedstock to remove interstitial oxygen, if any, contained with the feedstock;

(d) pyrolyzing the feedstock in the presence of a substantially inert gas phase for at least 10 minutes and with a temperature selected from about 250° C. to about 700° C., thereby generating hot pyrolyzed solids, condensable vapors, and non-condensable gases;

(e) separating the condensable vapors and the non-condensable gases from the hot pyrolyzed solids;

(f) cooling the hot pyrolyzed solids, thereby generating cooled pyrolyzed solids; and (g) recovering a high-carbon biogenic reagent comprising the cooled pyrolyzed solids.

"Biomass," for purposes of this disclosure, shall be construed as any biogenic feedstock or mixture of a biogenic and non-biogenic feedstocks. Elementally, biomass includes at least carbon, hydrogen, and oxygen. The methods and apparatus of the disclosure can accommodate a wide range of feedstocks of various types, sizes, and moisture contents.

Biomass includes, for example, plant and plant-derived material, vegetation, agricultural waste, forestry waste, wood waste, paper waste, animal-derived waste, poultry-derived waste, and municipal solid waste. In various embodiments of the disclosure utilizing biomass, the biomass feedstock can include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth. A person of ordinary skill in the art will readily appreciate that the feedstock options are virtually unlimited.

The present disclosure can also be used for carbon-containing feedstocks other than biomass, such as a fossil fuel (e.g., coal or petroleum coke), or any mixtures of biomass and fossil fuels (such as biomass/coal blends). In some embodiments, a carbon-containing feedstock is, or includes, coal, oil shale, crude oil, asphalt, or solids from crude-oil processing (such as petcoke). Feedstocks can include waste tires, recycled plastics, recycled paper, construction waste, deconstruction waste, and other waste or recycled materials. For the avoidance of doubt, any method, apparatus, or system described herein can be used with any carbonaceous feedstock. Carbon-containing feedstocks can be transportable by any known means, such as by truck, train, ship, barge, tractor trailer, or any other vehicle or means of conveyance.

Selection of a particular feedstock or feedstocks is generally carried out in a manner that favors an economical process. Regardless of the feedstocks chosen, there can be screening to remove undesirable materials. The feedstock can optionally be dried prior to processing.

The feedstock employed can be provided or processed into a wide variety of particle sizes or shapes. For example, the feed material can be a fine powder, or a mixture of fine and coarse particles. The feed material can be in the form of large pieces of material, such as wood chips or other forms of wood (e.g., round, cylindrical, square, etc.). In some embodiments, the feed material comprises pellets or other agglomerated forms of particles that have been pressed together or otherwise bound, such as with a binder.

It is noted that size reduction is a costly and energy-intensive process. Pyrolyzed material can be sized with significantly less energy input—that is, it can be preferred to reduce the particle size of the product, not the feedstock. This is an option in the present disclosure because the process does not require a fine starting material, and there is not necessarily any significant particle-size reduction during processing. The ability to process very large pieces of feedstock is a significant economic advantage of this disclosure. Notably, some market applications of the high-carbon product actually require large sizes (e.g., on the order of centimeters), so that in some embodiments, large pieces are fed, produced, and sold.

When it is desired to produce a final carbonaceous biogenic reagent that has structural integrity, such as in the form of cylinders, there are at least two options in the context of this disclosure. First, the material produced from the process can be collected and then further process mechanically into the desired form. For example, the product can be pressed or pelletized, with a binder. The second option is to utilize feed materials that generally possess the desired size or shape for the final product, and employ processing steps that do not destroy the basic structure of the feed material. In some embodiments, the feed and product have similar geometrical shapes, such as spheres, cylinders, or cubes.

The ability to maintain the approximate size of feed material throughout the process is beneficial when product strength is important. Also, this avoids the difficulty and cost of pelletizing high fixed-carbon materials.

The starting feed material can be provided with a range of moisture levels, as will be appreciated. In some embodiments, the feed material can already be sufficiently dry that it need not be further dried before pyrolysis. It can be desirable to utilize commercial sources of biomass that will usually contain moisture, and feed the biomass through a drying step before introduction into the pyrolysis reactor. However, in some embodiments a dried feedstock can be utilized.

It is desirable to provide a relatively low-oxygen environment in the pyrolysis reactor, such as about, or at most about, 10 mol %, 5 mol %, 4 mol %, 3 mol %, 2 mol %, 1.5 mol %, 1 mol %, 0.5 mol %, 0.2 mol %, 0.1 mol %, 0.05 mol %, 0.02 mol %, or 0.01 mol % $O_2$ in the gas phase. First, uncontrolled combustion should be avoided in the pyrolysis reactor, for safety reasons. Some amount of total carbon oxidation to $CO_2$ can occur, and the heat released from the exothermic oxidation can assist the endothermic pyrolysis chemistry. Large amounts of oxidation of carbon, including partial oxidation to syngas, will reduce the carbon yield to solids.

Practically speaking, it can be difficult to achieve a strictly oxygen-free environment in the reactor. This limit can be approached, and in some embodiments, the reactor is substantially free of molecular oxygen in the gas phase. To ensure that little or no oxygen is present in the pyrolysis reactor, it can be desirable to remove air from the feed material before it is introduced to the reactor. There are various ways to remove or reduce air in the feedstock.

In some embodiments, a deaeration unit is utilized in which feedstock, before or after drying, is conveyed in the presence of another gas which can remove adsorbed oxygen and penetrate the feedstock pores to remove oxygen from the pores. Essentially any gas that has lower than 21 vol % $O_2$ can be employed, at varying effectiveness. In some embodiments, nitrogen is employed. In some embodiments, CO or $CO_2$ is employed. Mixtures can be used, such as a mixture of nitrogen and a small amount of oxygen. Steam can be present in the deaeration gas, although adding significant moisture back to the feed should be avoided. The effluent from the deaeration unit can be purged (to the atmosphere or to an emissions treatment unit) or recycled.

In principle, the effluent (or a portion thereof) from the deaeration unit could be introduced into the pyrolysis reactor itself since the oxygen removed from the solids will now be highly diluted. In this embodiment, it can be advantageous to introduce the deaeration effluent gas to the last zone of the reactor, when it is operated in a countercurrent configuration.

Various types of deaeration units can be employed. If drying is to be performed, drying and then deaerating can be performed due to the inefficiencies of scrubbing soluble oxygen out of the moisture present. In certain embodiments, the drying and deaerating steps are combined into a single unit, or some amount of deaeration is achieved during drying, and so on.

The optionally dried and optionally deaerated feed material is introduced to a pyrolysis reactor or multiple reactors in series or parallel. The feed material can be introduced using any known means, including screw feeders or lock hoppers, for example. In some embodiments, a material feed system incorporates an air knife.

When a single pyrolysis reactor is employed, multiple zones can be present. Multiple zones, such as two, three, four, or more zones, can allow for the separate control of temperature, solids residence time, gas residence time, gas composition, flow pattern, or pressure in order to adjust the overall process performance.

References to "zones" shall be broadly construed to include regions of space within a single physical unit, physically separate units, or any combination thereof. For a continuous reactor, the demarcation of zones can relate to structure, such as the presence of flights within the reactor or distinct heating elements to provide heat to separate zones. Alternatively, or additionally, the demarcation of zones in a continuous reactor can relate to function, such as distinct temperatures, fluid flow patterns, solid flow patterns, extent of reaction, and so on. In a single batch reactor, "zones" are operating regimes in time, rather than in space. Multiple batch reactors can also be used.

It will be appreciated that there are not necessarily abrupt transitions from one zone to another zone. For example, the boundary between the preheating zone and pyrolysis zone can be somewhat arbitrary; some amount of pyrolysis can take place in a portion of the preheating zone, and some amount of "preheating" can continue to take place in the pyrolysis zone. The temperature profile in the reactor can be continuous, including at zone boundaries within the reactor.

Some embodiments employ a first zone that is operated under conditions of preheating or mild pyrolysis. The temperature of the first zone can be selected from about 150° C. to about 500° C., such as about 300° C. to about 400° C. The temperature of the first zone should not be so high as to shock the biomass material which ruptures the cell walls and initiates fast decomposition of the solid phase into vapors and gases.

All references to zone temperatures in this specification should be construed in a non-limiting way to include temperatures that can apply to the bulk solids present, or the gas phase, or the reactor walls (on the process side). It will be understood that there will be a temperature gradient in each zone, both axially and radially, as well as temporally (i.e., following start-up or due to transients). Thus, references to zone temperatures can be references to average temperatures or other effective temperatures that can influence the actual kinetics. Temperatures can be directly measured by thermocouples or other temperature probes, or indirectly measured or estimated by other means.

The second zone, or in general the primary pyrolysis zone, is operated under conditions of pyrolysis or carbonization. The temperature of the second zone can be in the range of from or any number in between about 250° C. to about 700° C., such as about, or at least about, or at most about 300° C., 350° C., 400° C., 450° C., 500° C., 550° C., 600° C., or 650° C. Within this zone, preheated biomass undergoes pyrolysis chemistry to release gases and condensable vapors, leaving a significant amount of solid material as a high-carbon reaction intermediate. Biomass components (primarily cellulose, hemicellulose, and lignin) decompose and create vapors, which escape by penetrating through pores or creating new pores. The preferred temperature will depend at least on the residence time of the second zone, as well as the nature of the feedstock and desired product properties.

The third zone, or cooling zone, is operated to cool down the high-carbon reaction intermediate to varying degrees. At a minimum, the temperature of the third zone should be a lower temperature than that of the second zone. The temperature of the third zone can be selected from about 100° C. to about 550° C., such as about 150° C. to about 350° C.

Chemical reactions can continue to occur in the cooling zone. Without being limited by any particular theory, it is believed that secondary pyrolysis reactions can be initiated in the third zone. Carbon-containing components that are in the gas phase can condense (due to the reduced temperature of the third zone). The temperature remains sufficiently high, however, to promote reactions that can form additional fixed carbon from the condensed liquids (secondary pyrolysis) or at least form bonds between adsorbed species and the fixed carbon. One exemplary reaction that can take place is the Boudouard reaction for conversion of carbon monoxide to carbon dioxide plus fixed carbon.

The residence times of the reactor zones can vary. There is an interplay of time and temperature, so that for a desired amount of pyrolysis, higher temperatures can allow for lower reaction times, and vice versa. The residence time in a continuous reactor (zone) is the volume divided by the volumetric flow rate. The residence time in a batch reactor is the batch reaction time, following heating to reaction temperature.

It should be recognized that in multiphase reactors, there are multiple residence times. In the present context, in each zone, there will be a residence time (and residence-time distribution) of both the solids phase and the vapor phase. For a given apparatus employing multiple zones, and with a given throughput, the residence times across the zones will generally be coupled on the solids side, but residence times can be uncoupled on the vapor side when multiple inlet and outlet ports are utilized in individual zones. The solids and vapor residence times are uncoupled.

The solids residence time of the preheating zone can be selected from about 5 min to about 60 min, such as about 10, 20, 30, 40, or 50 min. Depending on the temperature, sufficient time is desired to allow the biomass to reach a desired preheat temperature. The heat-transfer rate, which will depend on the particle type and size, the physical apparatus, and on the heating parameters, will dictate the minimum residence time necessary to allow the solids to reach a desired preheat temperature. Additional time can be undesirable as it would contribute to higher capital cost, unless some amount of mild pyrolysis is intended in the preheating zone.

The solids residence time of the pyrolysis zone can be selected from about 10 min to about 120 min, such as about 20, 30, 40, 50, 60, 70, 80, 90, or 100 min. Depending on the pyrolysis temperature in this zone, there should be sufficient time to allow the carbonization chemistry to take place, following the necessary heat transfer. For times below about 10 min, in order to remove high quantities of non-carbon elements, the temperature would need to be quite high, such as above 700° C. This temperature would promote fast pyrolysis and its generation of vapors and gases derived from the carbon itself, which is to be avoided when the intended product is solid carbon.

In a static system, there would be an equilibrium conversion that could be substantially reached at a certain time. When, as in certain embodiments, vapor is continuously flowing over solids with continuous volatiles removal, the equilibrium constraint can be removed to allow for pyrolysis and devolatilization to continue until reaction rates approach zero. Longer times would not tend to substantially alter the remaining recalcitrant solids.

The solids residence time of the cooling zone can be selected from about 5 min to about 60 min, such as about 10, 20, 30, 40, or 50 min. Depending on the cooling temperature in this zone, there should be sufficient time to allow the carbon solids to cool to the desired temperature. The cooling rate and temperature will dictate the minimum residence time necessary to allow the carbon to be cooled. Additional time can be undesirable, unless some amount of secondary pyrolysis is desired.

As discussed above, the residence time of the vapor phase can be separately selected and controlled. The vapor residence time of the preheating zone can be selected from about 0.1 min to about 15 min, such as about 0.5, 1, 2, 3, 4, 5, 6, 7, 8, 9, or 10 min. The vapor residence time of the pyrolysis zone can be selected from about 0.1 min to about 20 min, such as about 0.5, 1, 2, 3, 4, 5, 6, 7, 8, 9, 10, 11, 12, 13, 14, or 15 min. The vapor residence time of the cooling zone can be selected from about 0.1 min to about 15 min, such as about 0.5, 1, 2, 3, 4, 5, 6, 7, 8, 9, or 10 min. Short vapor residence times promote fast sweeping of volatiles out of the system, while longer vapor residence times promote reactions of components in the vapor phase with the solid phase.

The mode of operation for the reactor, and overall system, can be continuous, semi-continuous, batch, or any combination or variation of these. In some embodiments, the reactor is a continuous, countercurrent reactor in which solids and vapor flow substantially in opposite directions. The reactor can also be operated in batch but with simulated countercurrent flow of vapors, such as by periodically introducing and removing gas phases from the batch vessel.

Various flow patterns can be desired or observed. With chemical reactions and simultaneous separations involving multiple phases in multiple reactor zones, the fluid dynamics can be quite complex. The flow of solids can approach plug flow (well-mixed in the radial dimension) while the flow of vapor can approach fully mixed flow (fast transport in both radial and axial dimensions). Multiple inlet and outlet ports for vapor can contribute to overall mixing.

The pressure in each zone can be separately selected and controlled. The pressure of each zone can be independently selected from about 1 kPa to about 3000 kPa, such as about 101.3 kPa (normal atmospheric pressure). Independent zone control of pressure is possible when multiple gas inlets and outlets are used, including vacuum ports to withdraw gas when a zone pressure less than atmospheric is desired.

The process can conveniently be operated at atmospheric pressure, in some embodiments. There are many advantages associated with operation at atmospheric pressure, ranging from mechanical simplicity to enhanced safety. In certain embodiments, the pyrolysis zone is operated at a pressure of about 90 kPa, 95 kPa, 100 kPa, 101 kPa, 102 kPa, 105 kPa, or 110 kPa (absolute pressures).

Vacuum operation (e.g., 10-100 kPa) would promote fast sweeping of volatiles out of the system. Higher pressures (e.g., 100-1000 kPa) can be useful when the off-gases will be fed to a high-pressure operation. Elevated pressures can also be useful to promote heat transfer, chemistry, or separations.

The step of separating the condensable vapors and the non-condensable gases from the hot pyrolyzed solids can be accomplished in the reactor itself, or using a distinct separation unit. A substantially inert sweep gas can be introduced into one or more of the zones. Condensable vapors and non-condensable gases are then carried away from the zone(s) in the sweep gas, and out of the reactor.

The sweep gas can be $N_2$, Ar, CO, $CO_2$, $H_2$, $H_2O$, $CH_4$, other light hydrocarbons, or a combination thereof, for example. The sweep gas can first be preheated prior to introduction, or possibly cooled if it is obtained from a heated source.

The sweep gas more thoroughly removes volatile components, by getting them out of the system before they can condense or further react. The sweep gas allows volatiles to be removed at higher rates than would be attained merely from volatilization at a given process temperature. Or, use of the sweep gas allows milder temperatures to be used to remove a certain quantity of volatiles. The reason the sweep gas improves the volatiles removal is that the mechanism of separation is not merely relative volatility but rather liquid/vapor phase disengagement assisted by the sweep gas. The sweep gas can both reduce mass-transfer limitations of volatilization as well as reduce thermodynamic limitations by continuously depleting a given volatile species, to cause more of it to vaporize to attain thermodynamic equilibrium.

Some embodiments remove gases laden with volatile organic carbon from subsequent processing stages, in order to produce a product with high fixed carbon. Without removal, the volatile carbon can adsorb or absorb onto the pyrolyzed solids, thereby requiring additional energy (cost) to achieve a purer form of carbon which can be desired. By removing vapors quickly, it is also speculated that porosity can be enhanced in the pyrolyzing solids. Higher porosity is desirable for some products.

In certain embodiments, the sweep gas in conjunction with a relatively low process pressure, such as atmospheric pressure, provides for fast vapor removal without large amounts of inert gas necessary.

In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

The sweep can be performed in any one or more of the reactor zones. In some embodiments, the sweep gas is introduced into the cooling zone and extracted (along with volatiles produced) from the cooling or pyrolysis zones. In some embodiments, the sweep gas is introduced into the pyrolysis zone and extracted from the pyrolysis or preheating zones. In some embodiments, the sweep gas is introduced into the preheating zone and extracted from the pyrolysis zone. In these or other embodiments, the sweep gas can be introduced into each of the preheating, pyrolysis, and cooling zones and also extracted from each of the zones.

In some embodiments, the zone or zones in which separation is carried out is a physically separate unit from the reactor. The separation unit or zone can be disposed between reactor zones, if desired. For example, there can be a separation unit placed between pyrolysis and cooling units.

The sweep gas can be introduced continuously, especially when the solids flow is continuous. When the pyrolysis reaction is operated as a batch process, the sweep gas can be introduced after a certain amount of time, or periodically, to remove volatiles. Even when the pyrolysis reaction is operated continuously, the sweep gas can be introduced semi-continuously or periodically, if desired, with suitable valves and controls.

The volatiles-containing sweep gas can exit from the one or more reactor zones, and can be combined if obtained from multiple zones. The resulting gas stream, containing various vapors, can then be fed to a thermal oxidizer for control of air emissions. Any known thermal-oxidation unit can be employed. In some embodiments, the thermal oxidizer is fed with natural gas and air, to reach sufficient temperatures for substantial destruction of volatiles contained therein.

The effluent of the thermal oxidizer will be a hot gas stream comprising water, carbon dioxide, and nitrogen. This effluent stream can be purged directly to air emissions, if desired. The energy content of the thermal oxidizer effluent can be recovered, such as in a waste-heat recovery unit. The energy content can also be recovered by heat exchange with another stream (such as the sweep gas). The energy content can be utilized by directly or indirectly heating, or assisting with heating, a unit elsewhere in the process, such as the dryer or the reactor. In some embodiments, essentially all of the thermal oxidizer effluent is employed for indirect heating (utility side) of the dryer. The thermal oxidizer can employ other fuels than natural gas.

The yield of carbonaceous material can vary, depending on the above-described factors including type of feedstock and process conditions. In some embodiments, the net yield of solids as a percentage of the starting feedstock, on a dry basis, is at least 25%, 30%, 35%, 40%, 45%, 50%, or higher. The remainder will be split between condensable vapors, such as terpenes, tars, alcohols, acids, aldehydes, or ketones; and non-condensable gases, such as carbon monoxide, hydrogen, carbon dioxide, and methane. The relative amounts of condensable vapors compared to non-condensable gases will also depend on process conditions, including the water present.

In terms of the carbon balance, in some embodiments the net yield of carbon as a percentage of starting carbon in the feedstock is at least 25%, 30%, 40%, 50%, 60%, 65%, 70%, 75%, 80%, or higher. For example, the in some embodiments the carbonaceous material comprises between about 40% and about 70% of the carbon contained in the starting feedstock. The rest of the carbon results in the formation of methane, carbon monoxide, carbon dioxide, light hydrocarbons, aromatics, tars, terpenes, alcohols, acids, aldehydes, or ketones, to varying extents.

In some embodiments, these compounds, or a portion thereof, are combined with the carbon-rich solids to enrich the carbon and energy content of the product. In these embodiments, some or all of the resulting gas stream from the reactor, containing various vapors, can be condensed, at least in part, and then passed over cooled pyrolyzed solids derived from the cooling zone or from the separate cooling unit. These embodiments are described in more detail below.

Following the reaction and cooling within the cooling zone (if present), the carbonaceous solids can be introduced into a distinct cooling unit. In some embodiments, solids are collected and simply allowed to cool at slow rates. If the carbonaceous solids are reactive or unstable in air, it can be desirable to maintain an inert atmosphere or rapidly cool the solids to, for example, a temperature less than 40° C., such as ambient temperature. In some embodiments, a water quench is employed for rapid cooling. In some embodiments, a fluidized-bed cooler is employed. A "cooling unit" should be broadly construed to also include containers, tanks, pipes, or portions thereof.

In some embodiments, the process further comprises operating the cooling unit to cool the warm pyrolyzed solids with steam, thereby generating the cool pyrolyzed solids and superheated steam; wherein the drying is carried out, at least in part, with the superheated steam derived from the cooling unit. Optionally, the cooling unit can be operated to first cool the warm pyrolyzed solids with steam to reach a first cooling-unit temperature, and then with air to reach a second cooling-unit temperature, wherein the second cooling-unit temperature is lower than the first cooling-unit temperature and is associated with a reduced combustion risk for the warm pyrolyzed solids in the presence of the air.

Following cooling to ambient conditions, the carbonaceous solids can be recovered and stored, conveyed to another site operation, transported to another site, or otherwise disposed, traded, or sold. The solids can be fed to a unit to reduce particle size. A variety of size-reduction units are known in the art, including crushers, shredders, grinders, pulverizers, jet mills, pin mills, and ball mills.

Screening or some other means for separation based on particle size can be included. The grinding can be upstream or downstream of grinding, if present. A portion of the screened material (e.g., large chunks) can be returned to the grinding unit. The small and large particles can be recovered for separate downstream uses. In some embodiments, cooled pyrolyzed solids are ground into a fine powder, such as a pulverized carbon or activated carbon product.

Various additives can be introduced throughout the process, before, during, or after any step disclosed herein. The additives can be broadly classified as process additives, selected to improve process performance such as carbon yield or pyrolysis time/temperature to achieve a desired carbon purity; and product additives, selected to improve one or more properties of the high-carbon biogenic reagent, or a downstream product incorporating the reagent. Certain additives can provide enhanced process and product (biogenic reagents or products containing biogenic reagents) characteristics.

Additives can be added before, during, or after any one or more steps of the process, including into the feedstock itself at any time, before or after it is harvested. Additive treatment can be incorporated prior to, during, or after feedstock sizing, drying, or other preparation. Additives can be incorporated at or on feedstock supply facilities, transport trucks, unloading equipment, storage bins, conveyors (including open or closed conveyors), dryers, process heaters, or any other units. Additives can be added anywhere into the pyrolysis process itself, using suitable means for introducing additives. Additives can be added after carbonization, or even after pulverization, if desired.

In some embodiments, an additive is selected from a metal, a metal oxide, a metal hydroxide, or a combination thereof. For example an additive can be selected from, but is by no means limited to, magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, and a combination thereof.

In some embodiments, an additive is selected from an acid, a base, or a salt thereof. For example an additive can be selected from, but is by no means limited to, sodium hydroxide, potassium hydroxide, magnesium oxide, hydrogen bromide, hydrogen chloride, sodium silicate, potassium permanganate, or a combination thereof.

In some embodiments, an additive is selected from a metal halide. Metal halides are compounds between metals and halogens (fluorine, chlorine, bromine, iodine, and astatine). The halogens can form many compounds with metals. Metal halides are generally obtained by direct combination, or more commonly, neutralization of basic metal salt with a hydrohalic acid. In some embodiments, an additive is selected from iron chloride ($FeCl_2$ or $FeCl_3$), iron bromide ($FeBr_2$ or $FeBr_3$), or hydrates thereof, and any a combination thereof.

Additives can result in a final product with higher energy content (energy density). An increase in energy content can result from an increase in total carbon, fixed carbon, volatile carbon, or even hydrogen. Alternatively or additionally, the increase in energy content can result from removal of non-combustible matter or of material having lower energy density than carbon. In some embodiments, additives reduce the extent of liquid formation, in favor of solid and gas formation, or in favor of solid formation.

Without being limited to any particular hypothesis, additives can chemically modify the starting biomass, or treated biomass prior to pyrolysis, to reduce rupture of cell walls for greater strength/integrity. In some embodiments, additives can increase fixed carbon content of biomass feedstock prior to pyrolysis.

Additives can result in a biogenic reagent with improved mechanical properties, such as yield strength, compressive strength, tensile strength, fatigue strength, impact strength, elastic modulus, bulk modulus, or shear modulus. Additives can improve mechanical properties by simply being present (e.g., the additive itself imparts strength to the mixture) or due to some transformation that takes place within the additive phase or within the resulting mixture. For example, reactions such as vitrification can occur within a portion of the biogenic reagent that includes the additive, thereby improving the final strength.

Chemical additives can be applied to wet or dry biomass feedstocks. The additives can be applied as a solid powder, a spray, a mist, a liquid, or a vapor. In some embodiments, additives can be introduced through spraying of a liquid solution (such as an aqueous solution or in a solvent), or by soaking in tanks, bins, bags, or other containers.

In certain embodiments, dip pretreatment is employed wherein the solid feedstock is dipped into a bath comprising the additive, either batchwise or continuously, for a time sufficient to allow penetration of the additive into the solid feed material.

In some embodiments, additives applied to the feedstock can reduce energy requirements for the pyrolysis, or increase the yield of the carbonaceous product. In these or other embodiments, additives applied to the feedstock can provide functionality that is desired for the intended use of the carbonaceous product.

The throughput, or process capacity, can vary widely from small laboratory-scale units to full operations, including any pilot, demonstration, or semi-commercial scale. In various embodiments, the process capacity (for feedstocks, products, or both) is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

In some embodiments, the solids, or a portion thereof, produced can be recycled to the front end of the process, i.e. to the drying or deaeration unit or directly to the reactor. By returning to the front end and passing through the process again, treated solids can become higher in fixed carbon. Solid, liquid, and gas streams produced or existing within the process can be independently recycled, passed to subsequent steps, or removed/purged from the process at any point.

In some embodiments, pyrolyzed material is recovered and then fed to a separate unit for further pyrolysis, to create a product with higher carbon purity. In some embodiments, the secondary process can be conducted in a simple container, such as a steel drum, in which heated inert gas (such as heated $N_2$) is passed through. Other containers useful for this purpose include process tanks, barrels, bins, totes, sacks, and roll-offs. This secondary sweep gas with volatiles can be sent to the thermal oxidizer, or back to the main process reactor, for example. To cool the final product, another stream of inert gas, which is initially at ambient temperature for example, can be passed through the solids to cool the solids, and then returned to an inert gas preheat system.

Some variations of the disclosure utilize a high-carbon biogenic reagent production system comprising:

(a) a feeder configured to introduce a carbon-containing feedstock;

(b) an optional dryer, disposed in operable communication with the feeder, configured to remove moisture contained within a carbon-containing feedstock;

(c) a multiple-zone reactor, disposed in operable communication with the dryer, wherein the multiple-zone reactor comprises a pyrolysis zone disposed in operable communication with a spatially separated cooling zone, and wherein the multiple-zone reactor is configured with an outlet to remove condensable vapors and non-condensable gases from solids;

(d) a solids cooler, disposed in operable communication with the multiple-zone reactor; and (e) a high-carbon biogenic reagent recovery unit, disposed in operable communication with the solids cooler.

Some variations utilize a high-carbon biogenic reagent production system comprising:

(a) a feeder configured to introduce a carbon-containing feedstock;

(b) an optional dryer, disposed in operable communication with the feeder, configured to remove moisture contained within a carbon-containing feedstock;

(c) an optional preheater, disposed in operable communication with the dryer, configured to heat or mildly pyrolyze the feedstock;

(d) a pyrolysis reactor, disposed in operable communication with the preheater, configured to pyrolyze the feedstock;

(e) a cooler, disposed in operable communication with the pyrolysis reactor, configured to cool pyrolyzed solids; and (f) a high-carbon biogenic reagent recovery unit, disposed in operable communication with the cooler, wherein the system is configured with a gas outlet to remove condensable vapors and non-condensable gases from solids.

The feeder can be physically integrated with the multiple-zone reactor, such as through the use of a screw feeder or auger mechanism to introduce feed solids into the first reaction zone.

In some embodiments, the system further comprises a preheating zone, disposed in operable communication with the pyrolysis zone. Each of the pyrolysis zone, cooling zone, and preheating zone (it present) can be located within a single unit, or can be located in separate units.

Optionally, the dryer can be configured as a drying zone within the multiple-zone reactor. Optionally, the solids cooler can be disposed within the multiple-zone reactor (i.e., configured as an additional cooling zone or integrated with the main cooling zone).

The system can include a purging means for removing oxygen from the system. For example, the purging means can comprise one or more inlets to introduce a substantially inert gas, and one or more outlets to remove the substantially inert gas and displaced oxygen from the system. In some embodiments, the purging means is a deaerater disposed in operable communication between the dryer and the multiple-zone reactor.

The multiple-zone reactor can be configured with at least a first gas inlet and a first gas outlet. The first gas inlet and the first gas outlet can be disposed in communication with different zones, or with the same zone.

In some embodiments, the multiple-zone reactor is configured with a second gas inlet or a second gas outlet. In some embodiments, the multiple-zone reactor is configured with a third gas inlet or a third gas outlet. In some embodiments, the multiple-zone reactor is configured with a fourth gas inlet or a fourth gas outlet. In some embodiments, each zone present in the multiple-zone reactor is configured with a gas inlet and a gas outlet.

Gas inlets and outlets allow not only introduction and withdrawal of vapor, but gas outlets (probes) in particular allow precise process monitoring and control across various stages of the process, up to and potentially including all stages of the process. Precise process monitoring would be expected to result in yield and efficiency improvements, both dynamically as well as over a period of time when operational history can be utilized to adjust process conditions.

In some embodiments, a reaction gas probe is disposed in operable communication with the pyrolysis zone. Such a reaction gas probe can be useful to extract gases and analyze them, in order to determine extent of reaction, pyrolysis selectivity, or other process monitoring. Then, based on the measurement, the process can be controlled or adjusted in any number of ways, such as by adjusting feed rate, rate of inert gas sweep, temperature (of one or more zones), pressure (of one or more zones), additives, and so on.

As intended herein, "monitor and control" via reaction gas probes should be construed to include any one or more sample extractions via reaction gas probes, and optionally making process or equipment adjustments based on the measurements, if deemed necessary or desirable, using well-known principles of process control (feedback, feedforward, proportional-integral-derivative logic, etc.).

A reaction gas probe can be configured to withdraw gas samples in a number of ways. For example, a sampling line can have a lower pressure than the pyrolysis reactor pressure, so that when the sampling line is opened an amount of gas can readily be withdrawn from pyrolysis zone. The sampling line can be under vacuum, such as when the pyrolysis zone is near atmospheric pressure. A reaction gas probe can be associated with one gas output, or a portion thereof (e.g., a line split from a gas output line).

In some embodiments, both a gas input and a gas output are utilized as a reaction gas probe by periodically introducing an inert gas into a zone, and pulling the inert gas with a process sample out of the gas output ("sample sweep"). Such an arrangement could be used in a zone that does not otherwise have a gas inlet/outlet for the substantially inert gas for processing, or, the reaction gas probe could be associated with a separate gas inlet/outlet that is in addition to process inlets and outlets. A sampling inert gas that is introduced and withdrawn periodically for sampling (in embodiments that utilize sample sweeps) could even be different than the process inert gas, if desired, either for reasons of accuracy in analysis or to introduce an analytical tracer.

For example, acetic acid concentration in the gas phase of the pyrolysis zone can be measured using a gas probe to extract a sample, which is then analyzed using a suitable technique (such as gas chromatography, GC; mass spectroscopy, MS; GC-MS, or Fourier-Transform Infrared Spectroscopy, FTIR). CO or $CO_2$ concentration in the gas phase could be measured and used as an indication of the pyrolysis selectivity toward gases/vapors, for example. Turpene concentration in the gas phase could be measured and used as an indication of the pyrolysis selectivity toward liquids, for example.

In some embodiments, the system further comprises at least one additional gas probe disposed in operable communication with the cooling zone, or with the drying zone (if present) or the preheating zone (if present).

A gas probe for the cooling zone could be useful to determine the extent of any additional chemistry taking place in the cooling zone, for example. A gas probe in the cooling zone could also be useful as an independent measurement of temperature (in addition, for example, to a thermocouple disposed in the cooling zone). This independent measurement can be a correlation of cooling temperature with a measured amount of a certain species. The correlation could be separately developed, or could be established after some period of process operation.

A gas probe for the drying zone could be useful to determine the extent of drying, by measuring water content, for example. A gas probe in the preheating zone could be useful to determine the extent of any mild pyrolysis taking place, for example.

In certain embodiments, the cooling zone is configured with a gas inlet, and the pyrolysis zone is configured with a gas outlet, thereby generating substantially countercurrent flow of the gas phase relative to the solid phase. Alternatively, or additionally, the preheating zone (when it is present) can be configured with a gas outlet, thereby generating substantially countercurrent flow of the gas phase relative to the solid phase. Alternatively, or additionally, the drying zone can be configured with a gas outlet, thereby generating substantially countercurrent flow.

The pyrolysis reactor or reactors can be selected from any suitable reactor configuration that is capable of carrying out the pyrolysis process. Exemplary reactor configurations include, but are not limited to, fixed-bed reactors, fluidized-bed reactors, entrained-flow reactors, augers, ablative reactors, rotating cones, rotary drum kilns, calciners, roasters, moving-bed reactors, transport-bed reactors, ablative reactors, rotating cones, or microwave-assisted pyrolysis reactors.

In some embodiments in which an auger is used, sand or another heat carrier can optionally be employed. For example, the feedstock and sand can be fed at one end of a screw. The screw mixes the sand and feedstock and conveys them through the reactor. The screw can provide good control of the feedstock residence time and does not dilute the pyrolyzed products with a carrier or fluidizing gas. The sand can be reheated in a separate vessel.

In some embodiments in which an ablative process is used, the feedstock is moved at a high speed against a hot metal surface. Ablation of any char forming at surfaces can maintain a high rate of heat transfer. Such apparatus can prevent dilution of products. As an alternative, the feedstock particles can be suspended in a carrier gas and introduced at a high speed through a cyclone whose wall is heated.

In some embodiments in which a fluidized-bed reactor is used, the feedstock can be introduced into a bed of hot sand fluidized by a gas, which can be a recirculated product gas. Reference herein to "sand" shall also include similar, substantially inert materials, such as glass particles, recovered ash particles, and the like. High heat-transfer rates from fluidized sand can result in rapid heating of the feedstock.

There can be some ablation by attrition with the sand particles. Heat is usually provided by heat-exchanger tubes through which hot combustion gas flows.

Circulating fluidized-bed reactors can be employed, wherein gas, sand, and feedstock move together. Exemplary transport gases include recirculated product gases and combustion gases. High heat-transfer rates from the sand ensure rapid heating of the feedstock, and ablation is expected to be stronger than with regular fluidized beds. A separator can be employed to separate the product gases from the sand and char particles. The sand particles can be reheated in a fluidized burner vessel and recycled to the reactor.

In some embodiments, a multiple-zone reactor is a continuous reactor comprising a feedstock inlet, a plurality of spatially separated reaction zones configured for separately controlling the temperature and mixing within each of the reaction zones, and a carbonaceous-solids outlet, wherein one of the reaction zones is configured with a first gas inlet for introducing a substantially inert gas into the reactor, and wherein one of the reaction zones is configured with a first gas outlet.

In various embodiments the reactor includes at least two, three, four, or more reaction zones. Each of the reaction zones is disposed in communication with separately adjustable heating means independently selected from electrical heat transfer, steam heat transfer, hot-oil heat transfer, phase-change heat transfer, waste heat transfer, or a combination thereof. In some embodiments, a reactor zone is heated with an effluent stream from the thermal oxidizer, if present. In some embodiments, at least one additional reactor zone is heated with an effluent stream from the thermal oxidizer, if present.

The reactor can be configured for separately adjusting gas-phase composition and gas-phase residence time of at least two reaction zones, up to and including all reaction zones present in the reactor.

The reactor can be equipped with a second gas inlet or a second gas outlet. In some embodiments, the reactor is configured with a gas inlet in each reaction zone. In these or other embodiments, the reactor is configured with a gas outlet in each reaction zone. The reactor can be a cocurrent or countercurrent reactor.

In some embodiments, the feedstock inlet comprises a screw or auger feed mechanism. In some embodiments, the carbonaceous-solids outlet comprises a screw or auger output mechanism.

Certain embodiments utilize a rotating calciner with a screw feeder. In these embodiments, the reactor is axially rotatable, i.e. it spins about its centerline axis. The speed of rotation will impact the solid flow pattern, and heat and mass transport. Each of the reaction zones can be configured with flights disposed on internal walls, to provide agitation of solids. The flights can be separately adjustable in each of the reaction zones.

Other means of agitating solids can be employed, such as augers, screws, or paddle conveyors. In some embodiments, the reactor includes a single, continuous auger disposed throughout each of the reaction zones. In other embodiments, the reactor includes twin screws disposed throughout each of the reaction zones.

Some systems are designed specifically with the capability to maintain the approximate size of feed material throughout the process—that is, to process the biomass feedstock without destroying or significantly damaging its structure. In some embodiments, the pyrolysis zone does not contain augers, screws, or rakes that would tend to greatly reduce the size of feed material being pyrolyzed.

In some embodiments of the disclosure, the system further includes a thermal oxidizer disposed in operable communication with the outlet at which condensable vapors and non-condensable gases are removed. The thermal oxidizer can be configured to receive a separate fuel (such as natural gas) and an oxidant (such as air) into a combustion chamber, adapted for combustion of the fuel and the condensable vapors. Certain non-condensable gases can also be oxidized, such as CO or $CH_4$, to $CO_2$.

When a thermal oxidizer is employed, the system can include a heat exchanger disposed between the thermal oxidizer and the dryer, configured to utilize of the heat of the combustion for the dryer. This embodiment can contribute significantly to the overall energy efficiency of the process.

In some embodiments, the system further comprises a carbon-enhancement unit, disposed in operable communication with the solids cooler, configured for combining condensable vapors, in at least partially condensed form, with the solids. The carbon-enhancement unit can increase the carbon content of the high-carbon biogenic reagent obtained from the recovery unit.

The system can further include a separate pyrolysis unit adapted to further pyrolyze the high-carbon biogenic reagent to further increase its carbon content. The separate pyrolysis unit can be a relatively simply container, unit, or device, such as a tank, barrel, bin, drum, tote, sack, or roll-off.

The overall system can be at a fixed location, or it can be distributed at several locations. The system can be constructed using modules which can be simply duplicated for practical scale-up. The system can also be constructed using economy-of-scale principles, as is well-known in the process industries.

Some variations relating to carbon enhancement of solids will now be further described. In some embodiments, a process for producing a high-carbon biogenic reagent comprises:

(a) providing a carbon-containing feedstock comprising biomass;

(b) optionally drying the feedstock to remove moisture contained within the feedstock;

(c) optionally deaerating the feedstock to remove interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., thereby generating hot pyrolyzed solids, condensable vapors, and non-condensable gases;

(e) separating the condensable vapors and the non-condensable gases from the hot pyrolyzed solids;

(f) in a cooling zone, cooling the hot pyrolyzed solids, in the presence of the substantially inert gas for at least 5 minutes and with a cooling temperature less than the pyrolysis temperature, thereby generating warm pyrolyzed solids;

(g) optionally cooling the warm pyrolyzed solids, thereby generating cool pyrolyzed solids;

(h) subsequently passing the condensable vapors or the non-condensable gases from step (e) across the warm pyrolyzed solids or the cool pyrolyzed solids, to form enhanced pyrolyzed solids with increased carbon content; and (i) recovering a high-carbon biogenic reagent comprising the enhanced pyrolyzed solids.

In some embodiments, step (h) comprises passing the condensable vapors from step (e), in vapor or condensed form, across the warm pyrolyzed solids, thereby producing enhanced pyrolyzed solids with increased carbon content. In some embodiments, step (h) comprises passing the non-condensable gases from step (e) across the warm pyrolyzed solids, thereby producing enhanced pyrolyzed solids with increased carbon content.

Alternatively, or additionally, vapors or gases can be contacted with the cool pyrolyzed solids. In some embodiments, step (h) comprises passing the condensable vapors from step (e), in vapor or condensed form, across the cool pyrolyzed solids, thereby producing enhanced pyrolyzed solids with increased carbon content. In some embodiments, step (h) includes passing the non-condensable gases from step (e) across the cool pyrolyzed solids, thereby producing enhanced pyrolyzed solids with increased carbon content.

In certain embodiments, step (h) includes passing substantially all of the condensable vapors from step (e), in vapor or condensed form, across the cool pyrolyzed solids, thereby producing enhanced pyrolyzed solids with increased carbon content. In certain embodiments, step (h) includes passing substantially all of the non-condensable gases from step (e) across the cool pyrolyzed solids, thereby producing enhanced pyrolyzed solids with increased carbon content.

The process can include various methods of treating or separating the vapors or gases prior to using them for carbon enhancement. For example, an intermediate feed stream comprising the condensable vapors and the non-condensable gases, obtained from step (e), can be fed to a separation unit configured, thereby generating at least first and second output streams. In certain embodiments, the intermediate feed stream comprises all of the condensable vapors, all of the non-condensable gases, or both.

Separation techniques can include or use distillation columns, flash vessels, centrifuges, cyclones, membranes, filters, packed beds, capillary columns, and so on. Separation can be principally based, for example, on distillation, absorption, adsorption, or diffusion, and can utilize differences in vapor pressure, activity, molecular weight, density, viscosity, polarity, chemical functionality, affinity to a stationary phase, and any a combination thereof.

In some embodiments, the first and second output streams are separated from the intermediate feed stream based on relative volatility. For example, the separation unit can be a distillation column, a flash tank, or a condenser.

Thus in some embodiments, the first output stream comprises the condensable vapors, and the second output stream comprises the non-condensable gases. The condensable vapors can include a carbon-containing compound selected from terpenes, alcohols, acids, aldehydes, or ketones. The vapors from pyrolysis can include aromatic compounds such as benzene, toluene, ethylbenzene, and xylenes. Heavier aromatic compounds, such as refractory tars, can be present in the vapor. The non-condensable gases can include a carbon-containing molecule selected from carbon monoxide, carbon dioxide, or methane.

In some embodiments, the first and second output streams are separated intermediate feed stream based on relative polarity. For example, the separation unit can be a stripping column, a packed bed, a chromatography column, or membranes.

Thus in some embodiments, the first output stream comprises polar compounds, and the second output stream comprises non-polar compounds. The polar compounds can include a carbon-containing molecule selected from methanol, furfural, or acetic acid. The non-polar compounds can include a carbon-containing molecule selected from carbon monoxide, carbon dioxide, methane, a turpene, or a turpene derivative.

Step (h) can increase the total carbon content of the high-carbon biogenic reagent, relative to an otherwise-identical process without step (h). The extent of increase in carbon content can be, for example, about 1%, 2%, 5%, 10%, 15%, 25%, or even higher, in various embodiments.

In some embodiments, step (h) increases the fixed carbon content of the high-carbon biogenic reagent. In these or other embodiments, step (h) increases the volatile carbon content of the high-carbon biogenic reagent. Volatile carbon content is the carbon attributed to volatile matter in the reagent. The volatile matter can be, but is not limited to, hydrocarbons including aliphatic or aromatic compounds (e.g., terpenes); oxygenates including alcohols, aldehydes, or ketones; and various tars. Volatile carbon can remain bound or adsorbed to the solids at ambient conditions but upon heating, will be released before the fixed carbon would be oxidized, gasified, or otherwise released as a vapor.

Depending on conditions associated with step (h), it is possible for some amount of volatile carbon to become fixed carbon (e.g., via Boudouard carbon formation from CO). The volatile matter can enter the micropores of the fixed carbon and will be present as condensed/adsorbed species, but remain relatively volatile. This residual volatility can be more advantageous for fuel applications, compared to product applications requiring high surface area and porosity.

Step (h) can increase the energy content (i.e., energy density) of the high-carbon biogenic reagent. The increase in energy content can result from an increase in total carbon, fixed carbon, volatile carbon, or even hydrogen. The extent of increase in energy content can be, for example, about 1%, 2%, 5%, 10%, 15%, 25%, or even higher, in various embodiments.

Further separations can be employed to recover one or more non-condensable gases or condensable vapors, for use within the process or further processing. For example, further processing can be included to produce refined carbon monoxide or hydrogen.

As another example, separation of acetic acid can be conducted, followed by reduction of the acetic acid into ethanol. The reduction of the acetic acid can be accomplished, at least in part, using hydrogen derived from the non-condensable gases produced.

Condensable vapors can be used for either energy in the process (such as by thermal oxidation) or in carbon enrichment, to increase the carbon content of the high-carbon biogenic reagent. Certain non-condensable gases, such as CO or $CH_4$, can be utilized either for energy in the process, or as part of the substantially inert gas for the pyrolysis step. A combination of any of the foregoing are also possible.

A potential benefit of including step (h) is that the gas stream is scrubbed, with the resulting gas stream being enriched in CO and $CO_2$. The resulting gas stream can be utilized for energy recovery, recycled for carbon enrichment of solids, or used as an inert gas in the reactor. Similarly, by separating non-condensable gases from condensable vapors, the $CO/CO_2$ stream is prepared for use as the inert gas in the reactor system or in the cooling system, for example.

Other variations are premised on the realization that the principles of the carbon-enhancement step can be applied to any feedstock in which it is desired to add carbon.

In some embodiments, a batch or continuous process for producing a high-carbon biogenic reagent comprises:
(a) providing a solid stream comprising a carbon-containing material;
(b) providing a gas stream comprising condensable carbon-containing vapors, non-condensable carbon-containing gases, or a mixture of condensable carbon-containing vapors and non-condensable carbon-containing gases; and (c) passing the gas stream across the solid stream under suitable conditions to form a carbon-containing product with increased carbon content relative to the carbon-containing material.

In some embodiments, the starting carbon-containing material is pyrolyzed biomass or torrefied biomass. The gas stream can be obtained during an integrated process that provides the carbon-containing material. Or, the gas stream can be obtained from separate processing of the carbon-containing material. The gas stream, or a portion thereof, can be obtained from an external source (e.g., an oven at a lumber mill). Mixtures of gas streams, as well as mixtures of carbon-containing materials, from a variety of sources, are possible.

In some embodiments, the process further comprises recycling or reusing the gas stream for repeating the process to further increase carbon or energy content of the carbon-containing product. In some embodiments, the process further comprises recycling or reusing the gas stream for carrying out the process to increase carbon or energy content of another feedstock different from the carbon-containing material.

In some embodiments, the process further includes introducing the gas stream to a separation unit configured, thereby generating at least first and second output streams, wherein the gas stream comprises a mixture of condensable carbon-containing vapors and non-condensable carbon-containing gases. The first and second output streams can be separated based on relative volatility, relative polarity, or any other property. The gas stream can be obtained from separate processing of the carbon-containing material.

In some embodiments, the process further comprises recycling or reusing the gas stream for repeating the process to further increase carbon content of the carbon-containing product. In some embodiments, the process further comprises recycling or reusing the gas stream for carrying out the process to increase carbon content of another feedstock.

The carbon-containing product can have an increased total carbon content, a higher fixed carbon content, a higher volatile carbon content, a higher energy content, or any combination thereof, relative to the starting carbon-containing material.

In related variations, a high-carbon biogenic reagent production system comprises:

(a) a feeder configured to introduce a carbon-containing feedstock;

(b) an optional dryer, disposed in operable communication with the feeder, configured to remove moisture contained within a carbon-containing feedstock;

(c) a multiple-zone reactor, disposed in operable communication with the dryer, wherein the multiple-zone reactor comprises a pyrolysis zone disposed in operable communication with a spatially separated cooling zone, and wherein the multiple-zone reactor is configured with an outlet to remove condensable vapors and non-condensable gases from solids;

(d) a solids cooler, disposed in operable communication with the multiple-zone reactor;

(e) a material-enrichment unit, disposed in operable communication with the solids cooler, configured to pass the condensable vapors or the non-condensable gases across the solids, to form enhanced solids with increased carbon content; and (f) a high-carbon biogenic reagent recovery unit, disposed in operable communication with the material-enrichment unit.

The system can further comprise a preheating zone, disposed in operable communication with the pyrolysis zone. In some embodiments, the dryer is configured as a drying zone within the multiple-zone reactor. Each of the zones can be located within a single unit or in separate units. Also, the solids cooler can be disposed within the multiple-zone reactor.

In some embodiments, the cooling zone is configured with a gas inlet, and the pyrolysis zone is configured with a gas outlet, thereby generating substantially countercurrent flow of the gas phase relative to the solid phase. In these or other embodiments, the preheating zone or the drying zone (or dryer) is configured with a gas outlet, thereby generating substantially countercurrent flow of the gas phase relative to the solid phase.

In particular embodiments, the system incorporates a material-enrichment unit that comprises:

(i) a housing with an upper portion and a lower portion;

(ii) an inlet at a bottom of the lower portion of the housing configured to carry the condensable vapors and non-condensable gases;

(iii) an outlet at a top of the upper portion of the housing configured to carry a concentrated gas stream derived from the condensable vapors and non-condensable gases;

(iv) a path defined between the upper portion and the lower portion of the housing; and (v) a transport system following the path, the transport system configured to transport the solids, wherein the housing is shaped such that the solids adsorb of the condensable vapors or of the non-condensable gases.

The present disclosure is capable of producing a variety of compositions useful as high-carbon biogenic reagents, and products incorporating such reagents. In some variations, a high-carbon biogenic reagent is produced by any process disclosed herein, such as a process comprising the steps of:

(a) providing a carbon-containing feedstock comprising biomass;

(b) optionally drying the feedstock to remove moisture contained within the feedstock;

(c) optionally deaerating the feedstock to remove interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., thereby generating hot pyrolyzed solids, condensable vapors, and non-condensable gases;

(e) separating the condensable vapors and the non-condensable gases from the hot pyrolyzed solids;

(f) in a cooling zone, cooling the hot pyrolyzed solids, in the presence of the substantially inert gas for at least 5 minutes and with a cooling temperature less than the pyrolysis temperature, thereby generating warm pyrolyzed solids;

(g) cooling the warm pyrolyzed solids, thereby generating cool pyrolyzed solids; and (h) recovering a high-carbon biogenic reagent comprising the cool pyrolyzed solids.

In some embodiments, the reagent comprises about at least 70 wt %, at least 80 wt %, at least 90 wt %, or at least 95 wt % total carbon on a dry basis. The total carbon includes at least fixed carbon, and can further include carbon from volatile matter. In some embodiments, carbon from volatile matter is about at least 5%, at least 10%, at least 25%, or at least 50% of the total carbon present in the high-carbon biogenic reagent. Fixed carbon can be measured using ASTM D3172, while volatile carbon can be measured using ASTM D3175, for example.

The high-carbon biogenic reagent can comprise about 10 wt % or less, such as about 5 wt % or less, hydrogen on a dry basis. The biogenic reagent can comprise about 1 wt % or less, such as about 0.5 wt % or less, nitrogen on a dry basis. The biogenic reagent can comprise about 0.5 wt % or less, such as about 0.2 wt % or less, phosphorus on a dry basis. The biogenic reagent can comprise about 0.2 wt % or less, such as about 0.1 wt % or less, sulfur on a dry basis.

Carbon, hydrogen, and nitrogen can be measured using ASTM D5373 for ultimate analysis, for example. Oxygen can be measured using ASTM D3176, for example. Sulfur can be measured using ASTM D3177, for example.

Certain embodiments provide reagents with little or essentially no hydrogen (except from any moisture that can be present), nitrogen, phosphorus, or sulfur, and are substantially carbon plus any ash and moisture present. Therefore, some embodiments provide a biogenic reagent with up to and including 100% carbon, on a dry/ash-free (DAF) basis.

Generally speaking, feedstocks such as biomass contain non-volatile species, including silica and various metals, which are not readily released during pyrolysis. It is of course possible to utilize ash-free feedstocks, in which case there should not be substantial quantities of ash in the pyrolyzed solids. Ash can be measured using ASTM D3174, for example.

Various amounts of non-combustible matter, such as ash, can be present. The high-carbon biogenic reagent can comprise about 10 wt % or less, such as about 5 wt %, about 2 wt %, about 1 wt % or less non-combustible matter on a dry basis. In certain embodiments, the reagent contains little ash, or even essentially no ash or other non-combustible matter. Therefore, some embodiments provide essentially pure carbon, including 100% carbon, on a dry basis.

Various amounts of moisture can be present. On a total mass basis, the high-carbon biogenic reagent can comprise at least 1 wt %, 2 wt %, 5 wt %, 10 wt %, 15 wt %, 25 wt %, 35 wt %, 50 wt %, or more moisture. As intended herein, "moisture" is to be construed as including any form of water present in the biogenic reagent, including absorbed moisture, adsorbed water molecules, chemical hydrates, and physical hydrates. The equilibrium moisture content can vary at least with the local environment, such as the relative humidity. Also, moisture can vary during transportation, preparation for use, and other logistics. Moisture can be measured using ASTM D3173, for example.

The high-carbon biogenic reagent can have various energy contents which for present purposes means the energy density based on the higher heating value associated with total combustion of the bone-dry reagent. For example, the high-carbon biogenic reagent can possess an energy content of about at least 11,000 Btu/lb, at least 12,000 Btu/lb, at least 13,000 Btu/lb, at least 14,000 Btu/lb, or at least 15,000 Btu/lb. In certain embodiments, the energy content is between about 14,000-15,000 Btu/lb. The energy content can be measured using ASTM D5865, for example.

The high-carbon biogenic reagent can be formed into a powder, such as a coarse powder or a fine powder. For example, the reagent can be formed into a powder with an average mesh size of about 200 mesh, about 100 mesh, about 50 mesh, about 10 mesh, about 6 mesh, about 4 mesh, or about 2 mesh, in embodiments.

In some embodiments, the high-carbon biogenic reagent is formed into structural objects comprising pressed, binded, or agglomerated particles. The starting material to form these objects can be a powder form of the reagent, such as an intermediate obtained by particle-size reduction. The objects can be formed by mechanical pressing or other forces, optionally with a binder or other means of agglomerating particles together.

In some embodiments, the high-carbon biogenic reagent is produced in the form of structural objects whose structure substantially derives from the feedstock. For example, feedstock chips can produce product chips of high-carbon biogenic reagent. Or, feedstock cylinders can produce high-carbon biogenic reagent cylinders, which can be somewhat smaller but otherwise maintain the basic structure and geometry of the starting material.

A high-carbon biogenic reagent according to the present disclosure can be produced as, or formed into, an object that has a minimum dimension of at least about 1 cm, 2 cm, 3 cm, 4 cm, 5 cm, 6 cm, 7 cm, 8 cm, 9 cm, 10 cm, or higher. In various embodiments, the minimum dimension or maximum dimension can be a length, width, or diameter.

Other variations of the disclosure relate to the incorporation of additives into the process, into the product, or both. In some embodiments, the high-carbon biogenic reagent includes a process additive incorporated during the process. In these or other embodiments, the reagent includes a product additive introduced to the reagent following the process.

In some embodiments, a high-carbon biogenic reagent comprises, on a dry basis:

70 wt % or more total carbon;

5 wt % or less hydrogen;

1 wt % or less nitrogen;

0.5 wt % or less phosphorus;

0.2 wt % or less sulfur; and an additive selected from a metal, a metal oxide, a metal hydroxide, a metal halide, or a combination thereof.

The additive can be selected from, but is by no means limited to, magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, and a combination thereof.

In some embodiments, a high-carbon biogenic reagent comprises, on a dry basis:

70 wt % or more total carbon;

5 wt % or less hydrogen;

1 wt % or less nitrogen;

0.5 wt % or less phosphorus;

0.2 wt % or less sulfur; and an additive selected from an acid, a base, or a salt thereof.

The additive can be selected from, but is by no means limited to, sodium hydroxide, potassium hydroxide, magnesium oxide, hydrogen bromide, hydrogen chloride, sodium silicate, potassium permanganate, or a combination thereof.

In certain embodiments, a high-carbon biogenic reagent comprises, on a dry basis:

70 wt % or more total carbon;

5 wt % or less hydrogen;

1 wt % or less nitrogen;

0.5 wt % or less phosphorus;

0.2 wt % or less sulfur;

a first additive selected from a metal, metal oxide, metal hydroxide, a metal halide, or a combination thereof; and a second additive selected from an acid, a base, or a salt thereof, wherein the first additive is different from the second additive.

The first additive can be selected from magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, and a combination thereof, while the second additive can be independently selected from sodium hydroxide, potassium hydroxide, magnesium oxide, hydrogen bromide, hydrogen chloride, sodium silicate, potassium permanganate, or a combination thereof.

A certain high-carbon biogenic reagent consists essentially of, on a dry basis, carbon, hydrogen, nitrogen, phosphorus, sulfur, non-combustible matter, and an additive selected from magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, or a combination thereof.

A certain high-carbon biogenic reagent consists essentially of, on a dry basis, carbon, hydrogen, nitrogen, phosphorus, sulfur, non-combustible matter, and an additive selected from sodium hydroxide, potassium hydroxide, magnesium oxide, hydrogen bromide, hydrogen chloride, sodium silicate, or a combination thereof.

The amount of additive (or total additives) can vary widely, such as from about 0.01 wt % to about 25 wt %, including about 0.1 wt %, about 1 wt %, about 5 wt %, about 10 wt %, or about 20 wt %. It will be appreciated then when relatively large amounts of additives are incorporated, such as higher than about 1 wt %, there will be a reduction in energy content calculated on the basis of the total reagent weight (inclusive of additives). Still, in various embodiments, the high-carbon biogenic reagent with additive(s) can possess an energy content of about at least 11,000 Btu/lb, at least 12,000 Btu/lb, at least 13,000 Btu/lb, at least 14,000 Btu/lb, or at least 15,000 Btu/lb.

The above discussion regarding product form applies also to embodiments that incorporate additives. In fact, certain embodiments incorporate additives as binding agents, fluxing agents, or other modifiers to enhance final properties for a particular application.

In some embodiments, the majority of carbon contained in the high-carbon biogenic reagent is classified as renewable carbon. In some embodiments, substantially all of the carbon is classified as renewable carbon. There can be certain market mechanisms (e.g., Renewable Identification Numbers, tax credits, etc.) wherein value is attributed to the renewable carbon content within the high-carbon biogenic reagent.

In certain embodiments, the fixed carbon can be classified as non-renewable carbon (e.g., from coal) while the volatile carbon, which can be added separately, can be renewable carbon to increase not only energy content but also renewable carbon value.

The high-carbon biogenic reagents produced as described herein is useful for a wide variety of carbonaceous products. The high-carbon biogenic reagent can be a desirable market product itself. High-carbon biogenic reagents as provided herein are associated with lower levels of impurities, reduced process emissions, and improved sustainability (including higher renewable carbon content) compared to the state of the art.

In variations, a product includes any of the high-carbon biogenic reagents that can be obtained by the disclosed processes, or that are described in the compositions set forth herein, or any portions, a combination, or derivatives thereof.

Generally speaking, the high-carbon biogenic reagents can be combusted to produce energy (including electricity and heat); partially oxidized, gasified, or steam-reformed to produce syngas; utilized for their adsorptive or absorptive properties; utilized for their reactive properties during metal refining (such as reduction of metal oxides, such as according to the present disclosure) or other industrial processing; or utilized for their material properties in carbon steel and various other metal alloys. Essentially, the high-carbon biogenic reagents can be utilized for any market application of carbon-based commodities or advanced materials, including specialty uses to be developed.

Prior to suitability or actual use in any product applications, the disclosed high-carbon biogenic reagents can be analyzed, measured, and optionally modified (such as through additives) in various ways. Some properties of potential interest, other than chemical composition and energy content, include density, particle size, surface area, microporosity, absorptivity, adsorptivity, binding capacity, reactivity, desulfurization activity, and basicity, to name a few properties.

Products or materials that can incorporate these high-carbon biogenic reagents include, but are by no means limited to, carbon-based blast furnace addition products, carbon-based taconite pellet addition products, ladle addition carbon-based products, met coke carbon-based products, coal replacement products, carbon-based coking products, carbon breeze products, fluidized-bed carbon-based feedstocks, carbon-based furnace addition products, injectable carbon-based products, pulverized carbon-based products, stoker carbon-based products, carbon electrodes, or activated carbon products.

Use of the disclosed high-carbon biogenic reagents in metals production can reduce slag, increase overall efficiency, and reduce lifecycle environmental impacts. Therefore, embodiments of this disclosure are particularly well-suited for metal processing and manufacturing.

Some variations of the disclosure utilize the high-carbon biogenic reagents as carbon-based blast furnace addition products. A blast furnace is a type of metallurgical furnace used for smelting to produce industrial metals, such as (but not limited to) iron. Smelting is a form of extractive metallurgy; its main use is to produce a metal from its ore. Smelting uses heat and a chemical reducing agent to decompose the ore. The carbon or the carbon monoxide derived from the carbon removes oxygen from the ore, leaving behind elemental metal.

The reducing agent can comprise a high-carbon biogenic reagent, or the reducing agent can consist essentially of a high-carbon biogenic reagent. In a blast furnace, high-carbon biogenic reagent, ore, and, often, limestone can be continuously supplied through the top of the furnace, while air (optionally with oxygen enrichment) is blown into the bottom of the chamber, so that the chemical reactions take place throughout the furnace as the material moves downward. The end products are usually molten metal and slag phases tapped from the bottom, and flue gases exiting from the top of the furnace. The downward flow of the ore in contact with an upflow of hot, carbon monoxide-rich gases is a countercurrent process.

Carbon quality in the blast furnace is measured by its resistance to degradation. The role of the carbon as a permeable medium is crucial in economic blast furnace operation. The degradation of the carbon varies with the position in the blast furnace and involves the combination of reaction with $CO_2$, $H_2O$, or $O_2$ and the abrasion of carbon particles against each other and other components of the burden. Degraded carbon particles can cause plugging and poor performance.

The Coke Reactivity test is a highly regarded measure of the performance of carbon in a blast furnace. This test has two components: the Coke Reactivity Index (CRI) and the Coke Strength after Reaction (CSR). A carbon-based material with a low CRI value (high reactivity) and a high CSR value is preferable for better blast furnace performance. CRI can be determined according to any suitable method known in the art, for example by ASTM Method DS341 on an as-received basis.

In some embodiments, the high-carbon biogenic reagent provides a carbon product having suitable properties for introduction directly into a blast furnace.

The strength of the high-carbon biogenic reagent can be determined by any suitable method known in the art, for example by a drop-shatter test, or a CSR test. In some embodiments, the high-carbon biogenic reagent, optionally when blended with another source of carbon, provides a final carbon product having CSR of at least about 50%, 60%, or 70%. A combination product can also provide a final coke product having a suitable reactivity for combustion in a blast furnace. In some embodiments, the product has a CRI such that the high-carbon biogenic reagent is suitable for use as an additive or replacement for met coal, met coke, coke breeze, foundry coke, or injectable coal.

Some embodiments employ an additive in an amount sufficient to provide a high-carbon biogenic reagent that, when added to another carbon source (e.g., coke) having a CRI or CSR insufficient for use as a blast furnace product, provides a composite product with a CRI or CSR sufficient for use in a blast furnace. In some embodiments, an additive is present in an amount sufficient to provide a high-carbon biogenic reagent having a CRI of at most about 40%, 30%, or 20%.

In some embodiments, an additive selected from the alkaline earth metals, or oxides or carbonates thereof, is introduced during or after the process of producing a high-carbon biogenic reagent. For example, calcium, calcium oxide, calcium carbonate, magnesium oxide, or magnesium carbonate can be introduced as additives. The addition of these compounds before, during, or after pyrolysis can increase the reactivity of the high-carbon biogenic reagent in a blast furnace. These compounds can lead to stronger materials, i.e. higher CSR, thereby improving blast-furnace efficiency. In addition, additives such as those selected from the alkaline earth metals, or oxides or carbonates thereof, can lead to lower emissions (e.g., $SO_2$).

In some embodiments, a high-carbon biogenic reagent contains not only a high fixed-carbon content but also a fairly high fraction of volatile carbon, as described above. The volatile matter can be desirable for metal oxide reduction because it is expected to have better mass transport into the metal oxide at lower temperatures. Compared to fossil-fuel based products such as coke, high-carbon biogenic reagents can have sufficient strength and more fixed and volatile carbon, which leads to greater reactivity.

In some embodiments, a blast furnace replacement product is a high-carbon biogenic reagent according to the present disclosure comprising at least about 55 wt % carbon, at most about 0.5 wt % sulfur, at most about 8 wt % non-combustible material, and a heat value of at least about 11,000 Btu per pound. In some embodiments, the blast furnace replacement product further comprises at most about 0.035 wt % phosphorous, about 0.5 wt % to about 50 wt % volatile matter, and optionally an additive. In some embodiments, the blast furnace replacement product comprises about 2 wt % to about 15 wt % dolomite, about 2 wt % to about 15 wt % dolomitic lime, about 2 wt % to about 15 wt % bentonite, or about 2 wt % to about 15 wt % calcium oxide. In some embodiments, the blast furnace replacement product has dimensions substantially in the range of about 1 cm to about 10 cm.

In some embodiments, a high-carbon biogenic reagent according to the present disclosure is useful as a foundry coke replacement product. Foundry coke is generally characterized as having a carbon content of at least about 85 wt %, a sulfur content of about 0.6 wt %, at most about 1.5 wt % volatile matter, at most about 13 wt % ash, at most about 8 wt % moisture, about 0.035 wt % phosphorus, a CRI value of about 30, and dimensions ranging from about 5 cm to about 25 cm.

Some variations of the disclosure utilize the high-carbon biogenic reagents as carbon-based taconite pellet addition products. The ores used in making iron and steel are iron oxides. Major iron oxide ores include hematite, limonite (also called brown ore), taconite, and magnetite, a black ore. Taconite is a low-grade but important ore, which contains both magnetite and hematite. The iron content of taconite is generally 25 wt % to 30 wt %. Blast furnaces can require at least about 50 wt % iron content ore for efficient operation. Iron ores can undergo beneficiation including crushing, screening, tumbling, flotation, and magnetic separation. The refined ore is enriched to over 60% iron and is often formed into pellets before shipping.

For example, taconite can be ground into a fine powder and combined with a binder such as bentonite clay and limestone. Pellets about one centimeter in diameter can be formed, containing approximately 65 wt % iron, for example. The pellets are fired, oxidizing magnetite to hematite. The pellets are durable which ensures that the blast furnace charge remains porous enough to allow heated gas to pass through and react with the pelletized ore.

The taconite pellets can be fed to a blast furnace to produce iron, as described above with reference to blast furnace addition products. In some embodiments, a high-carbon biogenic reagent is introduced to the blast furnace. In these or other embodiments, a high-carbon biogenic reagent is incorporated into the taconite pellet itself. For example, taconite ore powder, after beneficiation, can be mixed with a high-carbon biogenic reagent and a binder and rolled into small objects, then baked to hardness. In such embodiments, taconite-carbon pellets with the appropriate composition can conveniently be introduced into a blast furnace without the need for a separate source of carbon.

Some variations of the disclosure utilize the high-carbon biogenic reagents as ladle addition carbon-based products. A ladle is a vessel used to transport and pour out molten metals. Casting ladles are used to pour molten metal into molds to produce the casting. Transfers ladle are used to transfer a large amount of molten metal from one process to another. Treatment ladles are used for a process to take place within the ladle to change some aspect of the molten metal, such as the conversion of cast iron to ductile iron by the addition of various elements into the ladle.

High-carbon biogenic reagents can be introduced to any type of ladle, but carbon can be added to treatment ladles in suitable amounts based on the target carbon content. Carbon injected into ladles can be in the form of fine powder, for good mass transport of the carbon into the final composition. In some embodiments, a high-carbon biogenic reagent according to the present disclosure, when used as a ladle addition product, has a minimum dimension of about 0.5 cm, such as about 0.75 cm, about 1 cm, about 1.5 cm, or higher.

In some embodiments, a high carbon biogenic reagent according to the present disclosure is useful as a ladle addition carbon additive at, for example, basic oxygen furnace or electric arc furnace facilities wherever ladle addition of carbon would be used (e.g., added to ladle carbon during steel manufacturing).

In some embodiments, the ladle addition carbon additive additionally comprises up to about 5 wt % manganese, up to about 5 wt % calcium oxide, or up to about 5 wt % dolomitic lime.

Direct-reduced iron (DRI), also called sponge iron, is produced from direct reduction of iron ore (in the form of lumps, pellets, or fines) by a reducing gas conventionally produced from natural gas or coal. The reducing gas can be syngas, a mixture of hydrogen and carbon monoxide which acts as reducing agent. The high-carbon biogenic reagent as provided herein can be converted into a gas stream comprising CO, to act as a reducing agent to produce direct-reduced iron.

Iron nuggets are a high-quality steelmaking and iron-casting feed material. Iron nuggets are essentially all iron and carbon, with almost no gangue (slag) and low levels of metal residuals. They are a premium grade pig iron product with superior shipping and handling characteristics. The carbon contained in iron nuggets, or any portion thereof, can be the high-carbon biogenic reagent provided herein. Iron nuggets can be produced through the reduction of iron ore in a rotary hearth furnace, using a high-carbon biogenic reagent as the reductant and energy source.

Some variations of the disclosure utilize the high-carbon biogenic reagents as metallurgical coke carbon-based products. Metallurgical coke, also known as "met" coke, is a carbon material normally manufactured by the destructive distillation of various blends of bituminous coal. The final solid is a non-melting carbon called metallurgical coke. As a result of the loss of volatile gases and of partial melting, met coke has an open, porous morphology. Met coke has a very low volatile content. However, the ash constituents, that were part of the original bituminous coal feedstock, remain encapsulated in the resultant coke. Met coke feedstocks are available in a wide range of sizes from fine powder to basketball-sized lumps. Purities can range from at least about 86 to at most about 92 wt % fixed carbon.

Metallurgical coke is used where a high-quality, tough, resilient, wearing carbon is required. Applications include, but are not limited to, conductive flooring, friction materials (e.g., carbon linings), foundry coatings, foundry carbon raiser, corrosion materials, drilling applications, reducing agents, heat-treatment agents, ceramic packing media, electrolytic processes, and oxygen exclusion.

Met coke can be characterized as having a heat value of about 10,000 to 14,000 Btu per pound and an ash content of about 10 wt % or greater. Thus, in some embodiments, a met coke replacement product comprises a high-carbon biogenic reagent according to the present disclosure comprising at least about 80 wt %, 85 wt %, or 90 wt % carbon, at most about 0.8 wt % sulfur, at most about 3 wt % volatile matter, at most about 15 wt % ash, at most about 13 wt % moisture, and at most about 0.035 wt % phosphorus. A high-carbon biogenic reagent according to the present disclosure, when used as a met coke replacement product, can have a size range from about 2 cm to about 15 cm, for example.

In some embodiments, the met coke replacement product further comprises an additive such as chromium, nickel, manganese, magnesium oxide, silicon, aluminum, dolomite, fluorospar, calcium oxide, lime, dolomitic lime, bentonite and a combination thereof.

Some variations of the disclosure utilize the high-carbon biogenic reagents as coal replacement products. Any process or system using coal can in principle be adapted to use a high-carbon biogenic reagent.

In some embodiments, a high-carbon biogenic reagent is combined with one or more coal-based products to form a composite product having a higher rank than the coal-based product(s) or having fewer emissions, when burned, than the pure coal-based product.

For example, a low-rank coal such as sub-bituminous coal can be used in applications normally calling for a higher-rank coal product, such as bituminous coal, by combining a selected amount of a high-carbon biogenic reagent according to the present disclosure with the low-rank coal product. In other embodiments, the rank of a mixed coal product (e.g., a combination of a plurality of coals of different rank) can be improved by combining the mixed coal with some amount of high-carbon biogenic reagent. The amount of a high-carbon biogenic reagent to be mixed with the coal product(s) can vary depending on the rank of the coal product(s), the characteristics of the high-carbon biogenic reagent (e.g., carbon content, heat value, etc.) and the desired rank of the final combined product.

For example, anthracite coal is generally characterized as having at least about 80 wt % carbon, about 0.6 wt % sulfur, about 5 wt % volatile matter, up to about 15 wt % ash, up to about 10 wt % moisture, and a heat value of about 12,494 Btu/lb. In some embodiments, an anthracite coal replacement product is a high-carbon biogenic reagent comprising at least about 80 wt % carbon, at most about 0.6 wt % sulfur, at most about 15 wt % ash, and a heat value of at least about 12,000 Btu/lb.

In some embodiments, a high-carbon biogenic reagent is useful as a thermal coal replacement product. Thermal coal products are generally characterized as having high sulfur levels, high phosphorus levels, high ash content, and heat values of up to about 15,000 Btu/lb. In some embodiments, a thermal coal replacement product is a high-carbon biogenic reagent comprising at most about 0.5 wt % sulfur, at most about 4 wt % ash, and a heat value of at least about 12,000 Btu/lb.

Some variations of the disclosure utilize the high-carbon biogenic reagents as carbon-based coking products. Any coking process or system can be adapted to use high-carbon biogenic reagents to produce coke, or use it as a coke feedstock.

In some embodiments, a high-carbon biogenic reagent is useful as a thermal coal or coke replacement product. For example, a thermal coal or coke replacement product can consist essentially of a high-carbon biogenic reagent comprising at least about 50 wt % carbon, at most about 8 wt % ash, at most about 0.5 wt % sulfur, and a heat value of at least about 11,000 Btu/lb. In other embodiments, the thermal coke replacement product comprises a high-carbon biogenic reagent comprising at least about 50 wt % carbon, at most about 8 wt % ash, at most about 0.5 wt % sulfur, and a heat value of at least about 11,000 Btu/lb. In some embodiments, the thermal coke replacement product further comprises about 0.5 wt % to about 50 wt % volatile matter. The thermal coal or coke replacement product can comprise about 0.4 wt % to about 15 wt % moisture.

In some embodiments, a high-carbon biogenic reagent is useful as a petroleum (pet) coke or calcine pet coke replacement product. Calcine pet coke is generally characterized as having at least about 66 wt % carbon, up to 4.6 wt % sulfur, up to about 5.5 wt % volatile matter, up to about 19.5 wt % ash, and up to about 2 wt % moisture, and can be sized at about 3 mesh or less. In some embodiments, the calcine pet coke replacement product is a high-carbon biogenic reagent comprising at least about 66 wt % carbon, at most about 4.6 wt % sulfur, at most about 19.5 wt % ash, at most about 2 wt % moisture, and is sized at about 3 mesh or less.

In some embodiments, a high-carbon biogenic reagent is useful as a coking carbon replacement carbon (e.g., co-fired with metallurgical coal in a coking furnace). In one embodiment, a coking carbon replacement product is a high-carbon biogenic reagent comprising at least about 55 wt % carbon, at most about 0.5 wt % sulfur, at most about 8 wt % non-combustible material, and a heat value of at least about 11,000 Btu per pound. In some embodiments, the coking carbon replacement product comprises about 0.5 wt % to about 50 wt % volatile matter, or an additive.

Some variations of the disclosure utilize the high-carbon biogenic reagents as carbon breeze products, which can have very fine particle sizes such as 6 mm, 3 mm, 2 mm, 1 mm, or smaller. In some embodiments, a high-carbon biogenic reagent according to the present disclosure is useful as a coke breeze replacement product. Coke breeze is generally characterized as having a maximum dimension of at most about 6 mm, a carbon content of at least about 80 wt %, 0.6 to 0.8 wt % sulfur, 1% to 20 wt % volatile matter, up to about 13 wt % ash, and up to about 13 wt % moisture. In some embodiments, a coke breeze replacement product is a high-carbon biogenic reagent according to the present disclosure comprising at least about 80 wt % carbon, at most about 0.8 wt % sulfur, at most about 20 wt % volatile matter, at most about 13 wt % ash, at most about 13 wt % moisture, and a maximum dimension of about 6 mm.

In some embodiments, a high-carbon biogenic reagent is useful as a carbon breeze replacement product during, for example, taconite pellet production or in an ironmaking process.

Some variations utilize the high-carbon biogenic reagents as feedstocks for various fluidized beds, or as fluidized-bed carbon-based feedstock replacement products. The carbon can be employed in fluidized beds for total combustion, partial oxidation, gasification, steam reforming, or the like. The carbon can be primarily converted into syngas for various downstream uses, including production of energy (e.g., combined heat and power), or liquid fuels (e.g., methanol or Fischer-Tropsch diesel fuels).

In some embodiments, a high-carbon biogenic reagent according to the present disclosure is useful as a fluidized-bed coal replacement product in, for example, fluidized bed furnaces wherever coal would be used (e.g., for process heat or energy production).

Some variations utilize the high-carbon biogenic reagents as carbon-based furnace addition products. Coal-based carbon furnace addition products are generally characterized as having high sulfur levels, high phosphorus levels, and high ash content, which contribute to degradation of the metal product and create air pollution. In some embodiments, a carbon furnace addition replacement product comprising a high-carbon biogenic reagent comprises at most about 0.5 wt % sulfur, at most about 4 wt % ash, at most about 0.03 wt % phosphorous, and a maximum dimension of about 7.5 cm. In some embodiments, the carbon furnace addition replacement product replacement product comprises about 0.5 wt % to about 50 wt % volatile matter and about 0.4 wt % to about 15 wt % moisture.

In some embodiments, a high-carbon biogenic reagent is useful as a furnace addition carbon additive at, for example, basic oxygen furnace or electric arc furnace facilities wherever furnace addition carbon would be used. For example, furnace addition carbon can be added to scrap steel during steel manufacturing at electric-arc furnace facilities. For electric-arc furnace applications, high-purity carbon is desired so that impurities are not introduced back into the process following earlier removal of impurities.

In some embodiments, a furnace addition carbon additive is a high-carbon biogenic reagent comprising at least about 80 wt % carbon, at most about 0.5 wt % sulfur, at most about 8 wt % non-combustible material, and a heat value of at least about 11,000 Btu per pound. In some embodiments, the furnace addition carbon additive further comprises up to about 5 wt % manganese, up to about 5 wt % fluorospar, about 5 wt % to about 10 wt % dolomite, about 5 wt % to about 10 wt % dolomitic lime, or about 5 wt % to about 10 wt % calcium oxide.

Some variations utilize the high-carbon biogenic reagents as stoker furnace carbon-based products. In some embodiments, a high-carbon biogenic reagent according to the present disclosure is useful as a stoker coal replacement product at, for example, stoker furnace facilities wherever coal would be used (e.g., for process heat or energy production).

Some variations utilize the high-carbon biogenic reagents as injectable (e.g., pulverized) carbon-based materials. In some embodiments, a high-carbon biogenic reagent is useful as an injection-grade calcine pet coke replacement product. Injection-grade calcine pet coke is generally characterized as having at least about 66 wt % carbon, about 0.55 to about 3 wt % sulfur, up to about 5.5 wt % volatile matter, up to about 10 wt % ash, up to about 2 wt % moisture, and is sized at about 6 Mesh or less. In some embodiments, a calcine pet coke replacement product is a high-carbon biogenic reagent comprising at least about 66 wt % carbon, at most about 3 wt % sulfur, at most about 10 wt % ash, at most about 2 wt % moisture, and is sized at about 6 mesh or less.

In some embodiments, a high-carbon biogenic reagent is useful as an injectable carbon replacement product at, for example, basic oxygen furnace or electric arc furnace facilities in any application where injectable carbon would be used (e.g., injected into slag or ladle during steel manufacturing).

In some embodiments, a high-carbon biogenic reagent is useful as a pulverized carbon replacement product, for example, wherever pulverized coal would be used (e.g., for process heat or energy production). In some embodiments, the pulverized coal replacement product comprises up to about 10 percent calcium oxide.

Some variations utilize the high-carbon biogenic reagents as carbon addition product for metals production. In some embodiments, a high-carbon biogenic reagent according to the present disclosure is useful as a carbon addition product for production of carbon steel or another metal alloy comprising carbon. Coal-based late-stage carbon addition products are generally characterized as having high sulfur levels, high phosphorous levels, and high ash content, and high mercury levels which degrade metal quality and contribute to air pollution. In some embodiments of this disclosure, the carbon addition product comprises at most about 0.5 wt % sulfur, at most about 4 wt % ash, at most about 0.03 wt % phosphorus, a minimum dimension of about 1 to 5 mm, and a maximum dimension of about 8 to 12 mm.

Some variations utilize the high-carbon biogenic reagents within carbon electrodes. In some embodiments, a high-carbon biogenic reagent is useful as an electrode (e.g. anode) material suitable for use, for example, in aluminum production.

Other uses of the high-carbon biogenic reagent in carbon electrodes include applications in batteries, fuel cells, capacitors, and other energy-storage or energy-delivery devices. For example, in a lithium-ion battery, the high-carbon biogenic reagent can be used on the anode side to intercalate lithium. In these applications, carbon purity and low ash can be significant.

Some variations of the disclosure utilize the high-carbon biogenic reagents as catalyst supports. Carbon is a known catalyst support in a wide range of catalyzed chemical reactions, such as mixed-alcohol synthesis from syngas using sulfided cobalt-molybdenum metal catalysts supported on a carbon phase, or iron-based catalysts supported on carbon for Fischer-Tropsch synthesis of higher hydrocarbons from syngas.

Some variations utilize the high-carbon biogenic reagents as activated carbon products. Activated carbon is used in a wide variety of liquid and gas-phase applications, including water treatment, air purification, solvent vapor recovery, food and beverage processing, and pharmaceuticals. For activated carbon, the porosity and surface area of the material are generally important. The high-carbon biogenic reagent provided herein can provide a superior activated carbon product, in various embodiments, due to (i) greater surface area than fossil-fuel based activated carbon; (ii) carbon renewability; (iii) vascular nature of biomass feedstock in conjunction with additives better allows penetration/distribution of additives that enhance pollutant control; and (iv) less inert material (ash) leads to greater reactivity.

It should be recognized that in the above description of market applications of high-carbon biogenic reagents, the described applications are not exclusive, nor are they exhaustive. Thus a high-carbon biogenic reagent that is described as being suitable for one type of carbon product can be suitable for any other application described, in various embodiments. These applications are exemplary only, and there are other applications of high-carbon biogenic reagents.

In addition, in some embodiments, the same physical material can be used in multiple market processes, either in an integrated way or in sequence. Thus, for example, a high-carbon biogenic reagent that is used as a carbon electrode or an activated carbon may, at the end of its useful life as a performance material, then be introduced to a combustion process for energy value or to a metal-making (e.g., metal ore reduction) process, etc.

Some embodiments can employ a biogenic reagent both for its reactive/adsorptive properties and also as a fuel. For example, a biogenic reagent injected into an emissions stream can be suitable to remove contaminants, followed by combustion of the biogenic reagent particles and possibly the contaminants, to produce energy and thermally destroy or chemically oxidize the contaminants.

Significant environmental and product use advantages can be associated with high-carbon biogenic reagents, compared to conventional fossil-fuel-based products. The high-carbon biogenic reagents can be not only environmentally superior, but also functionally superior from a processing standpoint because of greater purity, for example.

With regard to some embodiments of metals production, production of biogenic reagents with disclosed processes can result in significantly lower emissions of CO, $CO_2$, $NO_x$, $SO_2$, and hazardous air pollutants compared to the coking of coal-based products necessary to prepare them for use in metals production.

Use of high-carbon biogenic reagents in place of coal or coke also significantly reduces environmental emissions of $SO_2$, hazardous air pollutants, and mercury.

Also, because of the purity of these high-carbon biogenic reagents (including low ash content), the disclosed biogenic reagents have the potential to reduce slag and increase production capacity in batch metal-making processes.

Variations Utilizing Coal and Other Non-Biomass Feedstocks

Although the most significantly beneficial environmental impacts occur where pyrolysis feedstock is exclusively biomass, the processes and systems herein can be adapted for non-biomass feedstocks, or mixtures of biomass and other feedstocks. It will further be recognized that in some cases, a pyrolysis step is not necessary, such as when a selected solid feedstock (e.g., coal) has sufficient properties, such as carbon content or reactivity, or when the feedstock was previously pyrolyzed, for example.

For example, a solid carbonaceous feedstock can be selected from biomass, lignite, coal, coal-like carbon deposits, oil shale, asphalt, petcoke, waste tires, recycled plastics, recycled paper, construction waste, deconstruction waste, or a combination thereof.

When the solid carbonaceous feedstock is or included biomass, the biomass can be selected from softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, railroad ties, lignin, animal manure, municipal solid waste, municipal sewage, or a combination thereof.

It is noted that "solid carbonaceous feedstock" means the feedstock is substantially in solid form but can contain liquids, such as water, oils, low-molecular-weight lignin, tars, hydrocarbons, and the like.

In some embodiments, the solid carbonaceous feedstock is a mixture of biomass and coal, such as from about 1% to about 99% biomass with the remainder being coal. In certain embodiments, the solid carbonaceous feedstock is coal.

Some variations provide a process comprising:

(a) providing a solid carbonaceous feedstock;

(b) pyrolyzing the solid carbonaceous feedstock, thereby generating a reagent, wherein the biogenic reagent comprises carbon, and a pyrolysis off-gas;

(c) optionally, oxidizing the pyrolysis off-gas, thereby generating heat;

(d) reacting the reagent with a selected reactant, thereby generating a reducing gas;

(e) optionally, chemically reducing a selected metal oxide in the presence of the reducing gas from step (d), thereby generating a reduced form of the selected metal oxide; and (f) optionally, recovering the reagent continuously or periodically during step (d), or ultimately after step (d), wherein recovered reagent is activated carbon.

Some variations provide a process comprising:

(a) providing a solid carbonaceous feedstock;

(b) optionally, pyrolyzing the solid carbonaceous feedstock, thereby generating a reagent, wherein the biogenic reagent comprises carbon, and a pyrolysis off-gas;

(c) optionally, oxidizing the pyrolysis off-gas, thereby generating heat;

(d) reacting the reagent with a selected reactant, thereby generating a reducing gas;

(e) chemically reducing a selected metal oxide in the presence of the reducing gas from step (d), thereby generating a reduced form of the selected metal oxide; and (f) optionally, recovering the reagent continuously or periodically during step (d), or ultimately after step (d), wherein recovered reagent is activated carbon.

When the solid carbonaceous feedstock is a mixture of biomass and coal, step (b) is often conducted. When the solid carbonaceous feedstock is coal, step (b) is often not conducted, except when the coal is lignite or other low-rank coal for which pyrolysis improves the suitability for downstream processing.

Some variations provide a process comprising:

(a) providing a solid carbonaceous feedstock;

(b) optionally, pyrolyzing the solid carbonaceous feedstock, thereby generating a reagent, wherein the biogenic reagent comprises carbon, and a pyrolysis off-gas;

(c) optionally, oxidizing the pyrolysis off-gas, thereby generating heat;

(d) reacting the reagent with a selected reactant, thereby generating a reducing gas;

(e) optionally, chemically reducing a selected metal oxide in the presence of the reducing gas from step (d), thereby generating a reduced form of the selected metal oxide; and (f) recovering the reagent continuously or periodically during step (d), or ultimately after step (d), wherein recovered reagent is activated carbon.

Some variations provide a system comprising:

a first reactor configured for pyrolyzing a solid carbonaceous feedstock, thereby generating a reagent, wherein the biogenic reagent comprises carbon, and a pyrolysis off-gas;

a second reactor configured for reacting the reagent with a selected reactant, thereby generating reducing gas, wherein the second reactor is optionally configured for continuously, periodically, or ultimately removing activated carbon from the second reactor; and optionally, a third reactor configured for chemically reducing a selected metal oxide in the presence of the reducing gas, thereby generating a reduced form of the selected metal oxide, wherein optionally the system further comprises one or more heating units in thermal communication with the first reactor, the second reactor, or (if present) the third reactor, and wherein the one or more heating units are configured for oxidizing the pyrolysis off-gas, thereby generating heat.

Some variations provide metal product produced by a process comprising:

(a) providing a solid carbonaceous feedstock;

(b) optionally, pyrolyzing the solid carbonaceous feedstock, thereby generating a reagent, wherein the biogenic reagent comprises carbon, and a pyrolysis off-gas;

(c) optionally, oxidizing the pyrolysis off-gas, thereby generating heat;

(d) reacting the reagent with a selected reactant, thereby generating a reducing gas;

(e) chemically reducing a selected metal oxide in the presence of the reducing gas from step (d), thereby generating a reduced form of the selected metal oxide;

(f) recovering a metal product comprising the reduced form of the selected metal oxide; and (g) optionally, recovering the reagent continuously or periodically during step (d), or ultimately after step (d), wherein recovered reagent is activated carbon.

Some variations provide a renewable hydrogen product produced by a process comprising:

(a) providing a solid carbonaceous feedstock;

(b) optionally, pyrolyzing the solid carbonaceous feedstock, thereby generating a reagent, wherein the biogenic reagent comprises carbon, and a pyrolysis off-gas;

(c) optionally, oxidizing the pyrolysis off-gas, thereby generating heat;

(d) reacting the reagent with a selected reactant, thereby generating a reducing gas;

(e) separating hydrogen from the reducing gas, wherein optionally the hydrogen is separated via one or more separation techniques selected from pressure-swing adsorption, molecular-sieve membrane separation, or cryogenic distillation;

(f) recovering a renewable hydrogen product comprising the hydrogen; and (g) optionally, recovering the reagent continuously or periodically during step (d), or ultimately after step (d), wherein recovered reagent is activated carbon.

Some variations provide an activated carbon product produced by a process comprising:

(a) providing a solid carbonaceous feedstock;

(b) optionally, pyrolyzing the solid carbonaceous feedstock, thereby generating a reagent, wherein the biogenic reagent comprises carbon, and a pyrolysis off-gas;

(c) optionally, oxidizing the pyrolysis off-gas, thereby generating heat;

(d) reacting the reagent with a selected reactant, thereby generating a reducing gas;

(e) optionally, chemically reducing a selected metal oxide in the presence of the reducing gas from step (d), thereby generating a reduced form of the selected metal oxide; and (f) recovering the reagent continuously or periodically during step (d), or ultimately after step (d), wherein recovered reagent is activated carbon.

In this detailed description, reference has been made to multiple embodiments of the disclosure and non-limiting examples relating to how the disclosure can be understood and practiced. Other embodiments that do not provide all of the features and advantages set forth herein can be utilized, without departing from the spirit and scope of the present disclosure. This disclosure incorporates routine experimentation and optimization of the methods and systems described herein. Such modifications and variations are considered to be within the scope of the disclosure defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps can be modified and that such modifications are in accordance with the variations of the disclosure. Additionally, certain of the steps can be performed concurrently in a parallel process when possible, as well as performed sequentially.

Therefore, to the extent there are variations of the disclosure, which are within the spirit of the disclosure or equivalent to the disclosures found in the appended claims, it is the intent that this patent will cover those variations as well. The present disclosure shall only be limited by what is claimed.

EXAMPLES

Example 1: Reduction of Iron Ore Using a Reducing Gas Derived from a Biogenic Reagent Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided in the form of taconite. Taconite is a low-grade siliceous iron ore containing 20-30 wt % magnetite ($Fe_3O_4$). Taconite is mined primarily in the Mesabi Iron Range in Minnesota, USA and in the Marquette Iron Range in Michigan, USA.

The biomass feedstock is pyrolyzed in a continuous pyrolysis reactor at a pyrolysis temperature of about 600° C. and at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent comprising carbon. The vapor output is a pyrolysis off-gas that is combusted to generate heat.

The biogenic reagent is fed to a reducing-gas production reactor that is co-fed with steam. The reducing-gas production reactor is operated at a temperature of about 800° C., a pressure of about 1 bar, a gas residence time of about 5 seconds, and a solid residence time of about 30 minutes. The reducing-gas production reactor is heated using heat generated from pyrolysis off-gas combustion. The vapor output from the reducing-gas production reactor is a reducing gas.

The reducing gas and taconite are fed to a chemical reduction reactor. The particulated taconite is fed into the chemical reduction reactor using a solid inlet port. The reducing gas, containing $H_2$ and CO, is metered from the reducing-gas production reactor into the chemical reduction reactor, using a vapor inlet port. The vapor flows co-currently with the solids flow. The chemical reduction reactor is operated at a reduction temperature of about 900° C., a reduction pressure of about 5 bar (via pressurized reducing gas), and a reduction residence time of about 1 hour. In the reduction reactor, the $Fe_3O_4$ is reduced by reaction with the $H_2$ and CO to a mixture of FeO and Fe (FeO is a lower oxidation state than $Fe_3O_4$). A vapor output from the chemical reduction reactor is a reduction off-gas containing water and carbon dioxide. A solid output from the chemical reduction reactor is a metal product containing Fe and possibly FeO that is not fully reduced to iron metal.

Example 2: Reduction of Iron Ore Using a Reducing Gas Derived from a Biogenic Reagent, with Activated Carbon Production Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided in the form of taconite. Taconite is a low-grade siliceous iron ore containing 20-30 wt % magnetite ($Fe_3O_4$). Taconite is mined primarily in the Mesabi Iron Range in Minnesota, USA and in the Marquette Iron Range in Michigan, USA.

The biomass feedstock is pyrolyzed in a continuous pyrolysis reactor at a pyrolysis temperature of about 600° C. and at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent comprising carbon. The vapor output is a pyrolysis off-gas that is combusted to generate heat.

The biogenic reagent is fed to a reducing-gas production reactor that is co-fed with steam. The reducing-gas production reactor is operated at a temperature of about 800° C., a pressure of about 1 bar, a gas residence time of about 5 seconds, and a solid residence time of about 30 minutes. The reducing-gas production reactor is heated using heat generated from pyrolysis off-gas combustion. The vapor output from the reducing-gas production reactor is a reducing gas. There is a continuous bottom out-flow of solids from the reducing-gas production reactor, which solids are recovered as an activated carbon product. The reducing-gas production reactor therefore is also referred to as an activated-carbon production reactor.

The reducing gas and taconite are fed to a chemical reduction reactor. The particulated taconite is fed into the chemical reduction reactor using a solid inlet port. The reducing gas, containing $H_2$ and CO, is metered from the reducing-gas production reactor into the chemical reduction reactor, using a vapor inlet port. The vapor flows co-currently with the solids flow. The chemical reduction reactor is operated at a reduction temperature of about 900° C., a reduction pressure of about 5 bar (via pressurized reducing gas), and a reduction residence time of about 1 hour. In the reduction reactor, the $Fe_3O_4$ is reduced by reaction with the $H_2$ and CO to a mixture of FeO and Fe (FeO is a lower oxidation state than $Fe_3O_4$). A vapor output from the chemical reduction reactor is a reduction off-gas containing water and carbon dioxide. A solid output from the chemical reduction reactor is a metal product containing Fe and possibly FeO that is not fully reduced to iron metal.

Example 3: Activated Carbon Production from Wood Chips

Douglas fir (*Pseudotsuga menziesii*) in the form of wood chips is provided as a biomass feedstock. The average size of the wood chips is about 25 millimeters long, about 25 millimeters wide, and about 5 millimeters thick.

The biomass feedstock is pyrolyzed in a continuous pyrolysis reactor at a pyrolysis temperature of about 600° C. and at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent comprising carbon. The vapor output is a pyrolysis off-gas that is combusted to generate heat.

The biogenic reagent is fed to an activated-carbon production reactor that is co-fed with a mixture of steam and air. The activated-carbon production reactor is operated at a temperature of about 900° C., a pressure of about 1.5 bar, a gas residence time of about 10 seconds, and a solid residence time of about 45 minutes. The activated-carbon production reactor is heated using heat generated from pyrolysis off-gas combustion. The vapor output from the activated-carbon production reactor is a reducing gas that may be used or recovered and sold. There is a semi-continuous bottom out-flow of solids from the activated-carbon production reactor, which solids are periodically recovered as an activated carbon product.

Example 4: Production of a Reducing Gas from Wood Chips

Douglas fir (*Pseudotsuga menziesii*) in the form of wood chips is provided as a biomass feedstock. The average size of the wood chips is about 25 millimeters long, about 25 millimeters wide, and about 5 millimeters thick.

The biomass feedstock is pyrolyzed in a continuous pyrolysis reactor at a pyrolysis temperature of about 650° C. and at a pyrolysis residence time of about 40 minutes. The pyrolysis pressure is about 2 bar under an inert gas consisting essentially of $N_2$ and less than 1 vol % $O_2$. There is a solid output and a vapor output from the pyrolysis reactor. The solid output is a biogenic reagent comprising carbon. The vapor output is a pyrolysis off-gas that is combusted to generate heat.

The biogenic reagent is fed to a reducing-gas production reactor that is co-fed with a mixture of air and steam. The reducing-gas production reactor is operated at a temperature of about 900° C., a pressure of about 1 bar, a gas residence time of about 3 seconds, and a solid residence time of about 20 minutes. The reducing-gas production reactor is heated using heat generated from pyrolysis off-gas combustion. The vapor output from the reducing-gas production reactor is a reducing gas.

The reducing gas is fed to a hydrogen separation and recovery unit. In this unit, the reducing gas is separated into a hydrogen-rich stream (hydrogen product) and an off-gas containing $CO_2$, $H_2O$, $CH_4$, and other components. The reducing gas is about 50 mol % hydrogen and about 50 mol % carbon monoxide, with less than 1 mol % $N_2$. The hydrogen is fully renewable hydrogen according to a hydrogen-isotope $^2H/^1H$ analysis, which does not take into account the hydrogen derived from the steam fed to the reducing-gas production reactor. The $^2H/^1H$ analysis shows that the hydrogen in the reducing gas is enriched in $^2H$ compared to what would be expected from a product produced from a fossil feedstock rather than biomass. Also, the carbon monoxide contains fully renewable carbon determined from a measurement of the $^{14}C/^{12}C$ isotopic ratio (renewable carbon is enriched in $^{14}C$ compared to fossil carbon).

What is claimed is:
1. A process for producing a metal product, the process comprising:
(a) providing a biomass feedstock;
(b) pyrolyzing the biomass feedstock, thereby generating a biogenic reagent, wherein the biogenic reagent comprises carbon, and a pyrolysis off-gas;
(c) optionally, oxidizing the pyrolysis off-gas, thereby generating heat;
(d) reacting the biogenic reagent with a selected reactant, thereby generating a reducing gas, wherein the reducing gas comprises at least about 10 mol % hydrogen;

(e) chemically reducing a selected metal oxide in the presence of the reducing gas from step (d), wherein the reducing is achieved utilizing the hydrogen, thereby generating a reduced form of the selected metal oxide;
(f) recovering a metal product comprising the reduced form of the selected metal oxide; and
(g) recovering the biogenic reagent continuously or periodically during step (d), or ultimately after step (d), thereby generating a recovered biogenic reagent, wherein the recovered biogenic reagent is an activated carbon,
wherein the process further comprises increasing hydrogen content of the reducing gas via the water-gas shift reaction.

2. The process of claim 1, wherein step (e) is conducted at a reduction temperature of at least about 500° C. to at most about 2000° C.

3. The process of claim 1, wherein the reduction temperature of at least about 700° C. to at most about 1800° C.

4. The process of claim 1, wherein step (e) is conducted for a reduction time of at least about 30 minutes to at most about 48 hours.

5. The process of claim 1, wherein the selected metal oxide comprises iron oxide, copper oxide, nickel oxide, magnesium oxide, manganese oxide, aluminum oxide, tin oxide, zinc oxide, cobalt oxide, chromium oxide, tungsten oxide, molybdenum oxide, or a combination thereof.

6. The process of claim 1, wherein the selected metal oxide is iron ore.

7. The process of claim 6, wherein the iron ore is selected from hematite, magnetite, limonite, taconite, or a combination thereof.

8. The process of claim 1, wherein the reduced form of the selected metal oxide is a fully reduced metal.

9. The process of claim 1, wherein the reduced form of the selected metal oxide is a second metal oxide having a lower oxidation state than the selected metal oxide.

10. The process of claim 1, wherein the selected reactant in step (d) is water.

11. The process of claim 1, wherein the selected reactant in step (d) is oxygen, and wherein the oxygen is comprised within air, pure oxygen, enriched oxygen, ozone, or a combination thereof.

12. The process of claim 1, wherein the selected reactant in step (d) comprises a combination of water and oxygen.

13. The process of claim 1, wherein the reducing gas comprises at least about 25 mol % hydrogen.

14. The process of claim 1, wherein the reducing gas comprises at least about 10 mol % carbon monoxide.

15. The process of claim 1, wherein the reducing gas comprises at least about 25 mol % carbon monoxide.

16. The process of claim 1, wherein the process further comprises partially oxidizing the pyrolysis off-gas, thereby generating a second reducing gas and heat.

17. The process of claim 16, wherein step (e) further comprises chemically reducing the selected metal oxide in the presence of the additional reducing gas.

18. The process of claim 1, wherein the metal product comprises iron, copper, nickel, magnesium, manganese, aluminum, tin, zinc, cobalt, chromium, tungsten, molybdenum, or a combination thereof.

* * * * *